United States Patent
Wang et al.

(10) Patent No.: US 11,564,153 B2
(45) Date of Patent: Jan. 24, 2023

(54) APPARATUS AND METHOD FOR INITIAL ACCESS IN WIRELESS COMMUNICATION SYSTEM

(71) Applicant: SAMSUNG ELECTRONICS CO., LTD., Suwon-si (KR)

(72) Inventors: Weiwei Wang, Beijing (CN); Lixiang Xu, Beijing (CN); Xiaoning Ma, Beijing (CN); Yi Wang, Beijing (CN); Yingyang Li, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 16/713,534

(22) Filed: Dec. 13, 2019

(65) Prior Publication Data

US 2020/0196225 A1 Jun. 18, 2020

(30) Foreign Application Priority Data

Dec. 14, 2018 (CN) .......................... 201811539081.7
Jan. 15, 2019 (CN) .......................... 201910037120.1
Mar. 27, 2019 (CN) .......................... 201910239776.1

(51) Int. Cl.
*H04W 48/16* (2009.01)
*H04W 72/12* (2009.01)
(Continued)

(52) U.S. Cl.
CPC ........... *H04W 48/16* (2013.01); *H04L 5/0055* (2013.01); *H04W 8/245* (2013.01);
(Continued)

(58) Field of Classification Search
None
See application file for complete search history.

(56) References Cited

U.S. PATENT DOCUMENTS

2006/0146796 A1* 7/2006 Joseph ................... H04L 12/66
370/352
2010/0103845 A1 4/2010 Ulupinar et al.
(Continued)

FOREIGN PATENT DOCUMENTS

KR 10-2018-0011400 2/2018
WO 2018/009340 1/2018

OTHER PUBLICATIONS

International Search Report and Written Opinion dated Apr. 13, 2020 in counterpart International Patent Application No. PCT/KR2019/017729.
(Continued)

*Primary Examiner* — Adnan Baig
(74) *Attorney, Agent, or Firm* — Nixon & Vanderhye P.C.

(57) ABSTRACT

The present disclosure relates to a pre-5th-Generation (5G) or 5G communication system to be provided for supporting higher data rates Beyond 4$^{th}$-Generation (4G) communication system such as Long Term Evolution (LTE). Embodiments of the disclosure provide a method, device and apparatus for initial access, wherein a method for initial access includes: receiving a first configuration message; and establishing a connection between a relay node and an anchor node, based on the first configuration message. The method provided in this disclosure establishes a connection between the relay node and a central unit of the anchor node through the information interaction between base stations and the information interaction between base station and relay node. The present disclosure provides a scheduling method and a first node. The method includes: receiving second scheduling related information reported by at least one second node and first scheduling related information reported by at least one UE that is connected to the at least one second node; generating scheduling information used by the at least one second node for scheduling the connected (Continued)

UE; and transmitting the generated scheduling information to the at least one second node and/or the connected UE. A corresponding second node, third node, and computer readable medium are also provided.

12 Claims, 36 Drawing Sheets

(51) Int. Cl.
*H04W 76/11* (2018.01)
*H04W 28/02* (2009.01)
*H04W 80/02* (2009.01)
*H04L 5/00* (2006.01)
*H04W 8/24* (2009.01)

(52) U.S. Cl.
CPC ... *H04W 28/0278* (2013.01); *H04W 72/1268* (2013.01); *H04W 76/11* (2018.02); *H04W 80/02* (2013.01)

(56) References Cited

U.S. PATENT DOCUMENTS

| | | | | |
|---|---|---|---|---|
| 2011/0249610 | A1* | 10/2011 | Ho | H04W 28/06 370/315 |
| 2015/0010010 | A1* | 1/2015 | Xie | H04W 92/02 370/401 |
| 2018/0115990 | A1 | 4/2018 | Abedini et al. | |
| 2018/0241619 | A1 | 8/2018 | Bedekar | |
| 2018/0249461 | A1* | 8/2018 | Miao | H04W 24/02 |
| 2018/0279118 | A1 | 9/2018 | Xu et al. | |
| 2019/0053317 | A1* | 2/2019 | Hampel | H04W 28/085 |
| 2019/0349821 | A1* | 11/2019 | Kim | H04L 5/0055 |
| 2020/0084618 | A1* | 3/2020 | Teyeb | H04W 80/02 |
| 2020/0196225 | A1* | 6/2020 | Wang | H04L 5/0091 |
| 2021/0037446 | A1* | 2/2021 | Wu | H04W 40/22 |
| 2021/0160764 | A1* | 5/2021 | Wu | H04W 72/085 |

OTHER PUBLICATIONS

"3GPP; TSG RAN; Study on Integrated Access and Backhaul; (Release 15)," 3GPP TR 38.874 1.0.0, Dec. 3, 2018, section 9.7.11; and figure 9.1.11-1.

LTE et al., "$3^{rd}$ Generation Partnership Project; Technical Specification Group Radio Access Network; Evolved Universal Terrestrial Radio Access (E-UTRA) And Evolved Universal Terrestrial Radio Access Network (E-UTRAN); Overall description, Stage 2 (Release 15)", 3GPP TS 36.300 V15.7.0, Sep. 2019, 365 pages.

LTE, $3^{rd}$ Generation Partnership Project; Technical Specification Group Radio Access Network; Evolved Universal Terrestrial Radio Access Network (E-UTRAN); X2 application protocol (X2AP) (Release 15), 3GPP TS 36.423 V15.7.0, Sep. 2019, 422 pages.

LTE et al., $3^{rd}$ Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.7.0, Sep. 2019, 820 pages.

3GPP, $3^{rd}$ Generation Partnership Project; Technical Specification Group Radio Access Network; NR; Radio Resource Control (RRC) protocol specification (Release 15), 3GPP TS 38.331 V15.7.0, Sep. 2019, 527pages.

3GPP, $3^{rd}$ Generation Partnership Project; Technical Specification Group Radio Access Network; NG-RAN; Xn application protocol (XnAP) (Release 15), 3GPP TS 38.423 V15.5.0, Sep. 2019, 311 pages.

3GPP, $3^{rd}$ Generation Partnership Project; Technical Specification Group Radio Access Network; NG-RAN; F1 application protocol (F1AP) (Release 15), 3GPP TS 38.473 V15.7.0, Sep. 2019, 221 pages.

3GPP, $3^{rd}$ Generation Partnership Project; Technical Specification Group Radio Access Network; NR; NR and NG-RAN Overall Description; Stage 2 (Release 15), 3GPP TS 38.300 V15.70, Sep. 2019, 99 pages.

Extended European Search Report dated May 10, 2002 for EP Application No. 19896345.6.

$3^{rd}$ Generation Partnership Project; Technical Specification Group Radio Access Network; NG-RAN; F1 application protocol (F1AP) (Release 15) 176 pgs. 3GPP TS 38.473 V15.3.0 (Sep. 2018).

$3^{rd}$ Generation Partnership Project; Technical Specification Group Radio Access Network; Study on Integrated Access and Backhaul (Release 15) 111pgs. 3GPP TR 38.874 1.0.0 (Dec. 2018).

\* cited by examiner

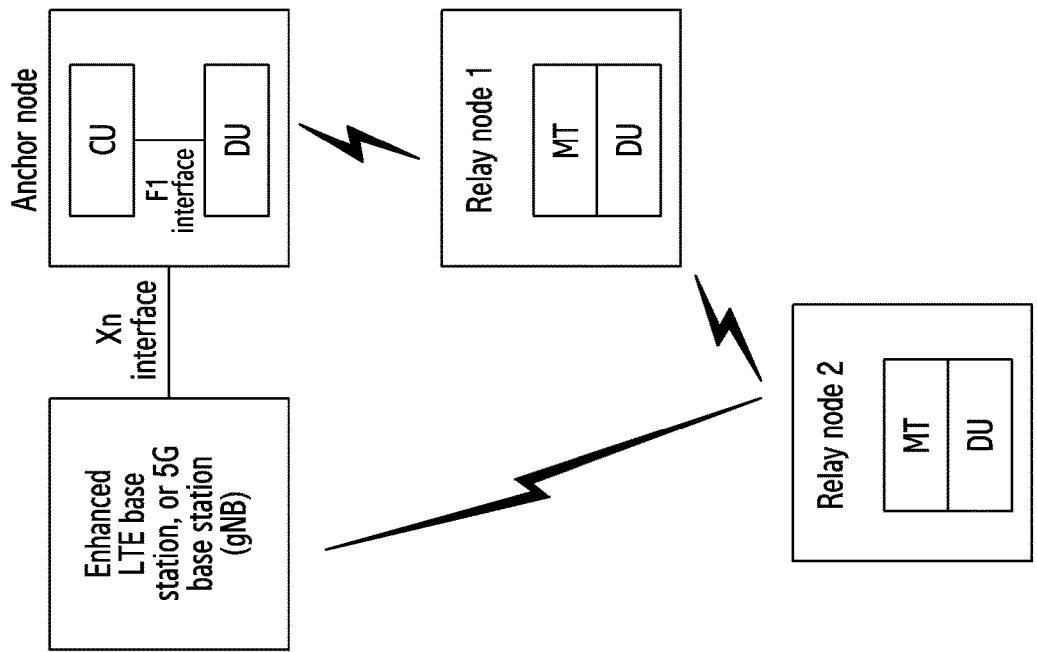
FIG.2C
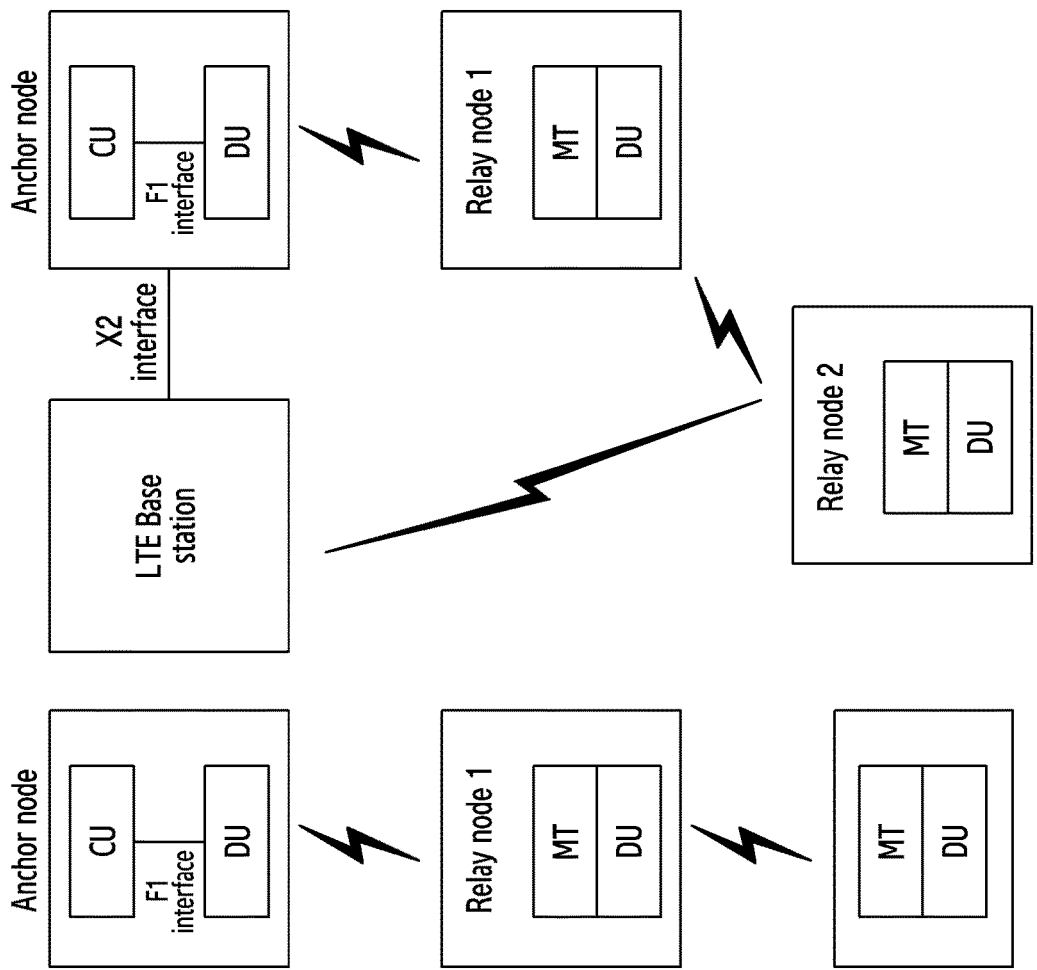
FIG.2B
(CONVENTIONAL ART)
FIG.2A

APPARATUS AND METHOD FOR INITIAL ACCESS IN WIRELESS COMMUNICATION SYSTEM

CROSS-REFERENCE TO RELATED APPLICATIONS

This application is based on and claims priority under 35 U.S.C. § 119 to Chinese Patent Application No. 201811539081.7, filed on Dec. 14, 2018, in the Chinese Patent Office, Chinese Patent Application No. 201910037120.1, filed on Jan. 15, 2019, in the Chinese Patent Office, and Chinese Patent Application No. 201910239776.1, filed on Mar. 27, 2019, in the Chinese Patent Office, the disclosures of which are incorporated herein by reference, in their entireties.

BACKGROUND

Technical Field

The disclosure relates to wireless communication, and, for example, to a method, device and apparatus for initial access. For example, the disclosure relates to the field of wireless communication technology, including, to scheduling methods in a wireless communication system, and a corresponding central scheduling node, a distributed unit (DU) node, a central unit user plane (CU-UP) node, a user equipment (UE), and a computer readable medium.

Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In 5G networks, research on Integrated Access and Backhaul (IAB) aims to build a multi-hop relay network architecture. As shown in FIG. 1, the network architecture can effectively extend the coverage of the network. As an example, the network architecture in FIG. 1 may include an anchor node (donor node) and two relay nodes, and the user (for example, the user 1) either directly communicates with the anchor node through a wireless link, or connects with relay nodes by a wireless link and communicates with the anchor node through a wireless link between the relay nodes (for example, the user 2 communicates with the anchor node through the relay node 1 and the user 3 communicates with the anchor node through the relay node 2 and the relay node 1). In this architecture, the anchor node may be a base station including a central unit (CU) and a distributed unit (DU), and the CU and the DU communicate with each other through an F1 interface. The CU may include at least a Radio Resource Control (RRC), Packet Data Convergence Protocol (PDCP) layer and the like, and may also include a Service Data Adaptation Protocol (SDAP). The DU may include a Radio Link Control Protocol (RLC), a Medium Access Control (MAC), a physical layer, etc. Between CU and DU, there may be a standardized public interface F1. The F1 interface is divided into a control plane F1-C and a user plane F1-U. The transmission network layer of F1-C is transmitted based on the internet protocol (IP). For more reliably transmitting signaling, an SCTP protocol has been added on IP. The protocol of the application layer is F1AP. The SCTP can provide reliable transmission for application layer message. The transmission layer of F1-U is UDP/IP, and GTP-U is used to carry a user plane Protocol Data Unit (PDU) over UDP/IP. Each relay node includes at least two parts: a distributed unit (DU) part and a mobile terminal (MT) part. The distributed unit part only includes a partial protocol stack, such as Radio Link Control Protocol (RLC), Medium Access Control (MAC), and physical layer. The mobile terminal part includes a complete protocol stack, for example, a control plane including RRC/PDCP/RLC/MAC/PHY, and a user plane including SDAP/PDCP/RLC/MAC/PHY. The mobile terminal part can access the network as a user. The user can access the network through any one of the relay nodes, or access the network through the anchor node.

There are generally two ways for a relay node to communicate with an anchor node: standalone networking and multi-connectivity networking, as shown in FIGS. 2A, 2B and 2C. In FIGS. 2A to 2C, the two connection ways are illustrated by taking the relay node 2 to connect to the anchor node through the relay node 1 as an example. In actual networks, the two connection ways allow the relay node 2 to directly connect to the anchor node, or to connect to the anchor node through one or more other relay nodes. FIG. 2A shows the way of standalone networking, that is, the relay node 2 accesses the anchor node through the relay node 1. FIG. 2B shows one of the ways of multi-connectivity networking, taking establishing a dual connectivity as an example, that is, the relay node communicates with the anchor node by establishing a dual connectivity with an LTE base station and an anchor node, and there is an X2 interface between the LTE base station and the anchor node. In this way, the relay node first establishes a connection with the LTE base station, and then by adding an anchor node through the LTE base station, the communication between the relay node 2 and the anchor node is implemented, wherein the relay node 2 and the anchor node may be directly connected to each other, or connected through one or more other relay nodes. The LTE base station is a master base station, and the anchor node is a secondary base station. The master base station and the secondary base station are connected to the core networks of LTE. In 5G, this way is referred to as E-UTRA-NR Connectivity (EN-DC). FIG. 2C shows another way of multi-connectivity networking, taking establishing a dual connectivity as an example, that is, the relay node communicates with the anchor node by the way of establishing a dual connectivity between an enhanced LTE base station or 5G base station (gNB) and an anchor node, wherein there is an Xn interface between the enhanced LTE base station or the 5G base station (gNB) and the anchor node. In this way, the relay node first establishes a connection with the enhanced LTE base station or 5G base station (gNB), and then the communication between the relay node 2 and the anchor node is implemented by adding an anchor node through the enhanced LTE base station or the 5G base station (gNB), wherein the relay node 2 and the anchor node may be directly connected to each other, or may be connected by one or more other relay nodes. The enhanced LTE base station or the 5G base station (gNB) is a master base station, and the anchor node is a secondary base station. The master base station and the secondary base station are connected to the core networks of 5G. In 5G, if the master base station is an enhanced LTE base station, this way is referred to as Multi-RAT Dual Connectivity (MR-DC); if the master base station is a 5G base station (gNB), this manner is referred to as New Radio-NR Dual Connectivity (NR-NR DC). In the above multiple connectivity ways, which are illustrated by taking establishing of the dual connectivity as an example, the ways of establishing multiple connectivity are similar, that is, the relay node 2 is connected to one master base station and multiple secondary base stations; in the above multiple connectivity ways, the relay node 2 and the master base station may be directly connected to each other or may be connected through one or more other relay nodes.

Each relay node accessing the anchor node can roughly include two steps:

Step 1: The mobile terminal part of the relay node accesses the anchor node, that is, the mobile terminal establishes a connection with the anchor node (or the central unit of the anchor node), wherein the mobile terminal part can directly communicate with the anchor node, or communicate with the anchor node through one or more other relay nodes.

Step 2: The distributed unit part of the relay node establishes a connection with the central unit of the anchor node, and the connection can be used to support data communication (such as F1-C, F1-U) on the F1 interface.

After completing the above two steps, the relay node can provide services for the user.

The design in the prior art does not consider whether a network accessed by a relay node has the capability of supporting a relay node, or consider how a relay node to communicate with a central unit of an anchor node after the relay node accesses the network.

Different network elements in a communication system can be classified into different types such as UE, access node, and core network (CN) functional entity according to the tasks undertaken, wherein the access node may include a central unit (CU) and a distributed unit (DU). One CU may be connected to multiple DUs in a wired way, wherein the CU may include a CU Control Plane (CU-CP) and a CU User Plane (CU-UP). A connection between a CU-CP and a CU-UP is a wired connection and uses E1 interface protocol; a connection between a CU-CP and a DU is a wired connection and uses F1-C interface protocol; and a connection between a CU-UP and a DU uses F1-U interface protocol.

FIG. 21 is a block diagram illustrating a schematic diagram of a system architecture of an existing communication system using a 5G communication system as an example.

As shown in FIG. 21, the access node gNB includes a gNB-CU and a gNB-DU. Although it is schematically shown in FIG. 21 that one gNB-DU is connected to the gNB-CU in a wired way, there may be multiple gNB-DUs that are connected to the gNB-CU in a wired way in the actual system architecture. The gNB-CU includes a gNB-CU control plane (gNB-CU-CP) and a gNB-CU user plane (gNB-CU-UP). As mentioned above, a connection between the gNB-CU-CP and the gNB-CU-UP is a wired connection and uses the E1 interface protocol; a connection between the gNB-CU-CP and the gNB-DU is a wired connection and uses the F1-C interface protocol; and a connection between the gNB-CU-UP and the gNB-DU uses the F1-U interface protocol. The UE connects to the gNB through a radio interface (Uu interface), and transmits and receives Control Plane (CP) and User Plane (UP) data.

In the existing mechanism, scheduling of radio resources is done by a DU (e.g., a gNB-DU). When the UE needs to be connected to multiple DUs at the same time, each DU can only schedule its own radio resources, and thus it cannot achieve the optimal resource utilization, which affects the service quality of the UE and the user experience.

SUMMARY

Embodiments of the disclosure provide a method, device and apparatus for initial access in a multi-hop relay network, to address the problem of how to enable a relay node to communicate with a central unit of an anchor node.

According to a first example embodiment of the disclosure, a method for initial access, which is applied to a relay node, is provided, the method comprising: receiving a first configuration message; and establishing a connection between the relay node and an anchor node, based on the first configuration message.

According to a second example embodiment of the disclosure, a method for initial access, which is applied to a first node, is provided, the method comprising: receiving a first indication message, wherein the first indication message includes indication information indicating that a node which the first indication message targets is a relay node; and transmitting a first configuration message to the relay node based on the indication information, for accessing the anchor node by the relay node, wherein the first configuration message includes at least one of: first information indicating a cell that supports the access of a relay node or a distributed unit of the relay node, second information indicating a cell that allows the access of a relay node or a distributed unit of the relay node, address information of the anchor node side, and address information of the relay node side.

According to a third example embodiment of the disclosure, a method for initial access, which is applied to a first base station is provided, the method comprising: transmitting a first request message to a second base station, wherein the first request message includes configuration information for a relay node accessing the second base station; and receiving a first response message transmitted by the second base station, to establish a connection between the relay node and the second base station.

According to a fourth example embodiment of the disclosure, a method for initial access, which is applied to a first base station, is provided, the method comprising: transmitting a third request message to a second base station, indicating whether the first base station has a capability of allowing a relay node or a distributed unit of the relay node to access the network; and receiving a third response message transmitted by the second base station, indicating whether the second base station has the capability of allowing the relay node or the distributed unit of the relay node to access the network.

According to a fifth example embodiment of the disclosure, a device for initial access, which is applied to a relay node, is provided, the device comprising:

a first receiving module comprising circuitry configured to receive a first configuration message; and an establishing comprising circuitry configured to establish a connection between the relay node and an anchor node, based on the first configuration message.

According to a sixth example embodiment of the disclosure, a device for initial access, which is applied to a first node, is provided, the device comprising:

a second receiving module comprising circuitry configured to receive a first indication message, wherein the first indication message includes indication information indicating that the node for which the first indication message targets is a relay node; and a first transmitting module comprising circuitry configured to transmit a first configuration message to the relay node based on the indication information, for accessing the anchor node by the relay node;

wherein the first configuration message includes at least one of: first information indicating a cell that supports the access of a relay node or a distributed unit of the relay node, second information indicating a cell that allows the access of a relay node or a distributed unit of the relay node, address information of the anchor node side, and address information of the relay node side.

According to a seventh example embodiment of the disclosure, a device for initial access, which is applied to a first base station, is provided, the device comprising: a second transmitting module comprising circuitry configured to transmit a first request message to a second base station, wherein the first request message includes configuration information for a relay node accessing the second base station; and a third receiving module comprising circuitry configured to receive a first response message transmitted by the second base station, to establish a connection between the relay node and the second base station.

According to an eighth example embodiment of the disclosure, a device for initial access, which is applied to a first base station, is provided, the device comprising: a third request message module comprising circuitry configured to transmit a third request message to a second base station, indicating whether the first base station has a capability of allowing a relay node or a distributed unit of the relay node to access the network;

a third response message module comprising circuitry configured to receive a third response message transmitted by the second base station, indicating whether the second base station has the capability of allowing the relay node or the distributed unit of the relay node to access the network.

According to a ninth example embodiment of the disclosure, a relay apparatus is provided, the relay apparatus comprising: a processor; and a memory, configured to store machine readable instructions that, when executed by the processor, cause the processor to perform the method of initial access according to the first example embodiment.

According to a tenth example embodiment of the disclosure, a first node apparatus is provided, the first node apparatus comprising: a processor; and a memory, configured to store machine readable instructions that, when executed by the processor, cause the processor to perform the method of initial access according to the second example embodiment.

According to an eleventh example embodiment of the disclosure, a base station apparatus is provided, the base station apparatus comprising: a processor; and a memory, configured to store machine readable instructions that, when executed by the processor, cause the processor to perform the method of initial access according to the third example embodiment.

According to a twelfth example embodiment of the disclosure, a base station apparatus is provided, the base station comprising: a processor; and a memory, configured to store machine readable instructions that, when executed by the processor, cause the processor to perform the method of initial access according to the fourth example embodiment.

The above example embodiments of the disclosure provide various advantages and address various shortcomings in the art, including, for example, and without limitation, one or more of:

1) the relay node is able to access a network that supports the access of the relay node.

2) the relay node is able to connect to an anchor node that supports the access of the relay node.

3) the distributed unit of the relay node is able to be connected to the central unit of the anchor node.

Additional aspects and advantages of the disclosure will be appreciated and will become apparent from the following detailed description.

The present disclosure provides a scheme for centrally scheduling radio resources, in which a central scheduling node centrally schedules radio resources, so that an optimal and/or improved scheduling scheme for the UE may be selected during scheduling, thereby improving the service quality of the UE and improving user experience.

According to a first example aspect of the disclosure, there is provided a scheduling method performed at a first node. The scheduling method includes: receiving second scheduling related information reported by at least one second node and first scheduling related information reported by at least one user equipment (UE) that is connected to the at least one second node; generating scheduling information used by the at least one second node for scheduling the connected UE; and transmitting the generated scheduling information to the at least one second node and/or the connected UE.

In an example embodiment, the first scheduling related information reported by the UE includes at least one of:

an ACK/NACK for downlink data transmitted to the UE from the second node connected to the UE;

channel quality related information for a downlink from the second node connected to the UE to the UE;

an uplink buffer status report (BSR) indicating a buffer status of uplink data which is to be transmitted by the UE at the UE side.

In an example embodiment, the second scheduling related information reported by the second node includes at least one of:

an ACK/NACK for uplink data transmitted to the second node from the UE connected to the second node;

channel quality related information for an uplink from the UE connected to the second node to the second node;

a downlink BSR indicating a buffer status of downlink data which is to be transmitted from the second node to the connected UE at the second node side.

In an example embodiment, the scheduling information includes at least one of:

a time-frequency resource location where the second node and/or the UE connected to the second node receives or transmits data;

a time-frequency resource range in which the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data; indication information of a receiving antenna of the second node and/or the UE connected to the second node;

indication information of a transmitting antenna of the second node and/or the UE connected to the second node.

In an example embodiment, prior to receiving the second scheduling related information reported by the at least one second node and the first scheduling related information reported by the at least one UE that is connected to the at least one second node, the method further includes: transmitting the first configuration information to the at least one second node, wherein the first configuration information includes at least one of:

configuration information of a second node group, configuration information of the cell group, configuration information of a reference signal, and configuration information of a wireless connection between the first node and the second node, wherein the configuration information of the second node group includes at least one of:

identification information of the second node itself, identification information of the second node group to which the second node belongs, identification information of the UE served by the second node, first indication information indicating that the second node joins a second node group, wherein the first indication information further indicates identification information of the second node group that the second node joins, second indication information indicating that the second node leaves a second node group, wherein the second indication information further indicates identification information of the second node group that the second node leaves, first identification information of a group to which a cell of the second node belongs, wherein the first identification information further includes identification information of the cell, second identification information of a user served by a cell of the second node, wherein the second identification information further includes identification information of the cell;

the configuration information of the cell group includes at least one of:

identification information of the cell group, identification information of the user served by the cell group, identification information of a cell added to the cell group, identification information of a cell removed from the cell group;

the configuration information of the reference signal includes at least one of:

an indication of a time-frequency resource location where the second node transmits the reference signal, an indication of a precoding mechanism used by the second node to transmit the reference signal, an indication of an antenna used by the second node to transmit a reference signal; and the configuration information of the wireless connection between the first node and the second node includes at least one of:

configuration information of a downlink synchronization signal, configuration information of an uplink synchronization signal, system information for access, configuration information of a physical layer, configuration information of a media access control (MAC) layer.

In an example embodiment, the first node receives the first scheduling related information via a first connection and receives the second scheduling related information via a second connection with the second node, and said transmitting the generated scheduling information includes:

transmitting the generated scheduling information to the UE and the second node via the first connection and the second connection, respectively.

In an exemplary embodiment, the first scheduling related information is forwarded to the first node via the second node, and said transmitting the generated scheduling information includes:

transmitting the generated scheduling information to the second node via the second connection between the first node and the second node.

In an exemplary embodiment, the method further includes: receiving third scheduling related information reported by at least one third node; generating second configuration information related to the at least one third node according to the received third scheduling related information; and transmitting the second configuration information to the at least one third node.

In an example embodiment, the third scheduling related information reported by the third node includes at least one of:

data amount information on data of a UE buffered at the third node;

information on a user bearer to which the data of the UE buffered at the third node belongs;

information on a user to which the data of the UE buffered at the third node belongs.

In an exemplary embodiment, the second configuration information includes at least one of:

identification information of a target second node to receive data transmitted by the third node;

address information of a target second node to receive data transmitted by the third node;

identification information of a UE to which the data transmitted by the third node belongs;

identification information of a bearer of a UE to which the data transmitted by the third node belongs;

indication information of an amount of data transmitted by the third node.

In an example embodiment, the first connection is a wireless connection, the second connection is at least one of a wired connection and a wireless connection, a third connection between the second node and the UE is a wireless connection, and a fourth connection between the first node and the third node is a wired connection.

In an example embodiment, the second connection uses F1-C interface protocol.

In an example embodiment, the first, second and third connections that are wireless connections use the same frequency band or different frequency bands.

According to a second example aspect of the present disclosure, there is provided a scheduling method performed at a second node. The scheduling method includes: reporting second scheduling related information to a first node; and receiving scheduling information for scheduling a UE connected to the second node from the first node.

In an example embodiment, the second scheduling related information reported by the second node includes at least one of:

an ACK/NACK for uplink data transmitted to the second node from the UE connected to the second node;

channel quality related information for an uplink from the UE connected to the second node to the second node;

a downlink BSR indicating a buffer status of downlink data which is to be transmitted from the second node to the connected UE at the second node side.

In an example embodiment, the scheduling information includes at least one of:

a time-frequency resource location where the second node and/or the UE connected to the second node receives or transmits data;

a time-frequency resource range in which the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data; indication information of a receiving antenna of the second node and/or the UE connected to the second node;

indication information of a transmitting antenna of the second node and/or the UE connected to the second node.

In an example embodiment, the method further includes: receiving first configuration information from the first node prior to reporting the second scheduling related information to the first node, wherein the first configuration information includes at least one of:

configuration information of a second node group, configuration information of the cell group, configuration information of a reference signal, and configuration information of a wireless connection between the first node and the second node, wherein the configuration information of the second node group includes at least one of:

identification information of the second node itself,
identification information of the second node group to which the second node belongs,
identification information of the UE served by the second node, first indication information indicating that the second node joins a second node group, wherein the first indication information further indicates identification information of the second node group that the second node joins, second indication information indicating that the second node leaves a second node group, wherein the second indication information further indicates identification information of the second node group that the second node leaves, first identification information of a group to which a cell of the second node belongs, wherein the first identification information further includes identification information of the cell, second identification information of a user served by a cell of the second node, wherein the second identification information further includes identification information of the cell;

the configuration information of the cell group includes at least one of:

identification information of the cell group,
identification information of the user served by the cell group,
identification information of a cell added to the cell group,
identification information of a cell removed from the cell group;

the configuration information of the reference signal includes at least one of:

an indication of a time-frequency resource location where the second node transmits the reference signal,
an indication of a precoding mechanism used by the second node to transmit the reference signal,
an indication of an antenna used by the second node to transmit a reference signal; and the configuration information of the wireless connection between the first node and the second node includes at least one of:

configuration information of a downlink synchronization signal,
configuration information of an uplink synchronization signal,
system information for access,
configuration information of a physical layer,
configuration information of a MAC layer.

In an example embodiment, the scheduling method further includes: receiving the first scheduling related information reported by the connected UE; and forwarding the first scheduling related information to the first node via a second connection between the first node and the second node In an example embodiment, the scheduling method further includes: forwarding the received scheduling information to the UE, or generating scheduling information for the connected UE according to the received scheduling information, and transmitting the generated scheduling information to the connected UE In an example embodiment, in a case that the scheduling information includes at least a time-frequency resource range in which the second node and/or the UE connected to the second node receives or transmits data, the method further includes: determining, from the time-frequency resource range, scheduling information used by the second node for scheduling the connected UE; and transmitting the determined scheduling information to the UE.

In an example embodiment, the method further includes: receiving, from a third node, data transmitted by the third node according to second configuration information, wherein the second configuration information includes at least one of:

identification information of a target second node to receive data transmitted by the third node;

address information of a target second node to receive data transmitted by the third node;

identification information of a UE to which the data transmitted by the third node belongs;

identification information of a bearer of a UE to which the data transmitted by the third node belongs;

indication information of an amount of data transmitted by the third node.

In an exemplary embodiment, the first connection is a wireless connection, the second connection is at least one of a wired connection and a wireless connection, a third connection between the second node and the UE is a wireless connection, and a fourth connection between the first node and the third node is a wired connection.

In an example embodiment, the second connection uses an F1-C interface protocol.

In an example embodiment, the first, second and third connections that are wireless connections use the same frequency band or different frequency bands.

According to a third example aspect of the present disclosure, there is provided a scheduling method performed at a third node. The scheduling method includes:

reporting third scheduling related information to a first node, wherein the third scheduling related information includes at least one of:
      data amount information on data of a UE buffered at the third node;
      information on a user bearer to which the data of the UE buffered at the third node belongs;
      information on a user to which the data of the UE buffered at the third node belongs;
   receiving second configuration information related to the third node from the first node; and
   transmitting data to the second node according to the second configuration information.

In an example embodiment, the second configuration information includes at least one of:
   identification information of a target second node to receive data transmitted by the third node;
   address information of a target second node to receive data transmitted by the third node;
   identification information of a UE to which the data transmitted by the third node belongs;
   identification information of a bearer of a UE to which the data transmitted by the third node belongs;
   indication information of an amount of data transmitted by the third node.

In an example embodiment, a fourth connection between the first node and the third node is a wired connection.

According to a fourth example aspect of the present disclosure, there is provided a scheduling method performed at a UE. The method includes: reporting first scheduling related information to a first node; and receiving, from the first node, scheduling information used by a second node connected to the first node for scheduling the UE.

In an example embodiment, the first scheduling related information includes at least one of:
   an ACK/NACK for downlink data transmitted to the UE from the second node;
   channel quality related information for a downlink from the second node to the UE;
   a BSR indicating a buffer status of uplink data which is to be transmitted from the UE to the second node at the UE side.

In an exemplary embodiment, the second scheduling related information includes at least one of:
   an ACK/NACK for uplink data transmitted from the UE to the second node;
   channel quality related information for an uplink from the UE to the second node;
   a downlink BSR indicating a buffer status of downlink data which is to be transmitted from the second node to the connected UE at the second node side.

In an exemplary embodiment, the scheduling information includes at least one of:
   a time-frequency resource location where the second node and/or the UE connected to the second node receives or transmits data;
   a modulation and coding scheme used by the second node and/or the UE connected to the second node to receive or transmit data;
   a precoding mechanism used by the second node and/or the UE connected to the second node to receive or transmit data;
   identification information of a cell where the second node and/or the UE connected to the second node receives or transmits data;
   identification information of a cell group where the second node and/or the UE connected to the second node receives or transmits data;
   identification information of the second node used in receiving or transmitting data; indication information of a receiving antenna of the second node and/or the UE connected to the second node;
   indication information of a transmitting antenna of the second node and/or the UE connected to the second node.

In an example embodiment, said reporting the first scheduling related information to the first node includes: transmitting, to a second node, the first scheduling related information to be reported to the first node, and forwarding, by the second node, the first scheduling related information to the first node via a second connection between the second node and the first node.

In an example embodiment, said receiving the scheduling information includes: receiving, from the second node, scheduling information transmitted by the first node.

In an example embodiment, in a case that the scheduling information includes at least a time-frequency resource range in which the second node and/or the UE connected to the second node receives or transmits data, the scheduling method further includes: receiving, from the second node, scheduling information that is determined by the second node, for scheduling the UE connected to the second node, from the time-frequency resource range.

In an example embodiment, the first connection is a wireless connection, the second connection is at least one of a wired connection and a wireless connection, and a third connection between the second node and the UE is a wireless connection, In an example embodiment, the second connection uses an F1-C interface protocol.

In an example embodiment, the first, second and third connections that are wireless connections use the same frequency band or different frequency bands.

According to a fifth example aspect of the present disclosure, there is provided a first node. The first node includes: a processor; and a memory having computer executable instructions stored thereon, which instructions, when executed by the processor, cause the first node to perform the method of the first example aspect of the present disclosure.

According to a sixth example aspect of the present disclosure, there is provided a second node. The second node includes: a processor; and a memory having computer executable instructions stored thereon, which instructions, when executed by the processor, cause the second node to perform the method of the second example aspect of the present disclosure.

According to a seventh example aspect of the present disclosure, there is provided a third node. The third node includes: a processor; and a memory having computer executable instructions stored thereon, which instructions, when executed by the processor, cause the third node to perform the method of the third example aspect of the present disclosure.

According to an eighth example aspect of the present disclosure, there is provided a UE. The UE includes: a processor; and a memory having computer executable instructions stored thereon, which instructions, when executed by the processor, cause the third node to perform the method of the fourth example aspect of the present disclosure.

According to a ninth example aspect of the present disclosure, there is provided a computer readable medium having stored thereon instructions that, when executed by a processor, cause the processor to perform the method of the first, second, third or fourth example aspect of the present disclosure.

According to the present disclosure, the radio resource is centrally scheduled by the first node, so that when the second node schedules the UE, an optimal and/or improved scheduling mode for the UE can be selected, thereby improving the service quality of the UE and improving the user experience. In addition, in the case where the second connection between the first node and the second node is a wireless connection, the transmission delay can be reduced compared to a wired connection, and the transmission speed is improved.

BRIEF DESCRIPTION OF THE DRAWINGS

The above and other aspects, features and advantages of certain embodiments of the present disclosure will be more apparent and appreciated from the following detailed description, taken in conjunction with the accompanying drawings, in which:

FIGS. 2A-2C are a diagram illustrating that conventional relay nodes are connected to anchor nodes;

DETAILED DESCRIPTION

Figure 1:
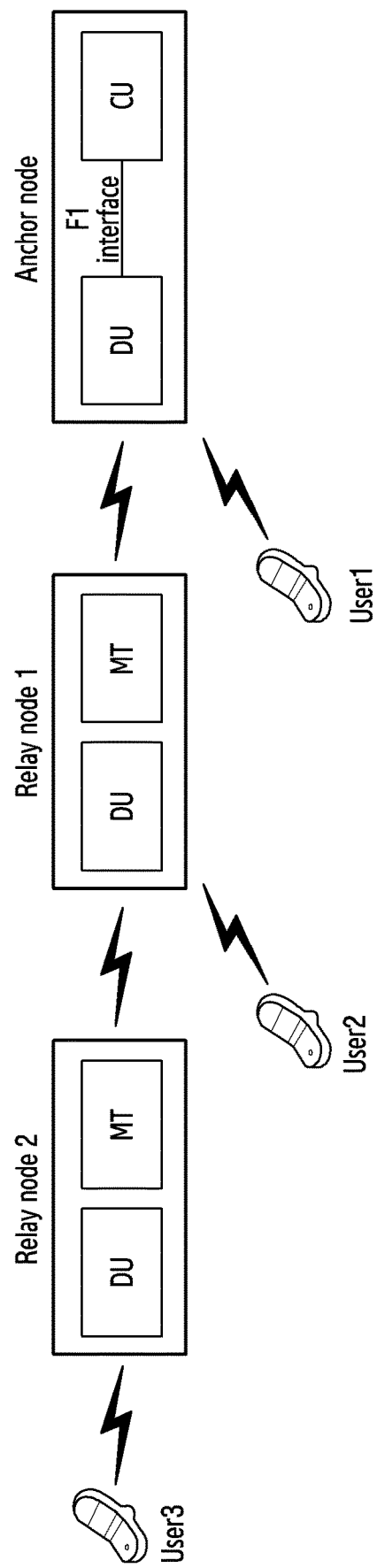
FIG. 1 is a diagram illustrating a conventional multi-hop relay network architecture.

Various example of the disclosure will be described in greater detail below. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the disclosure and should not be regarded as any limitations thereto.

It should be understood that singular forms "a", "an", "the", and "said" may be intended to include plural forms as well, unless otherwise stated. It should be further understood that terms "include/including" used in this disclosure specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can include wireless connection or coupling. As used herein, the term "and/or" includes all or any of one or more associated listed items or combinations thereof.

Example embodiments of the disclosure will be described in greater detail below with reference to the accompanying drawings.

Figure 3:
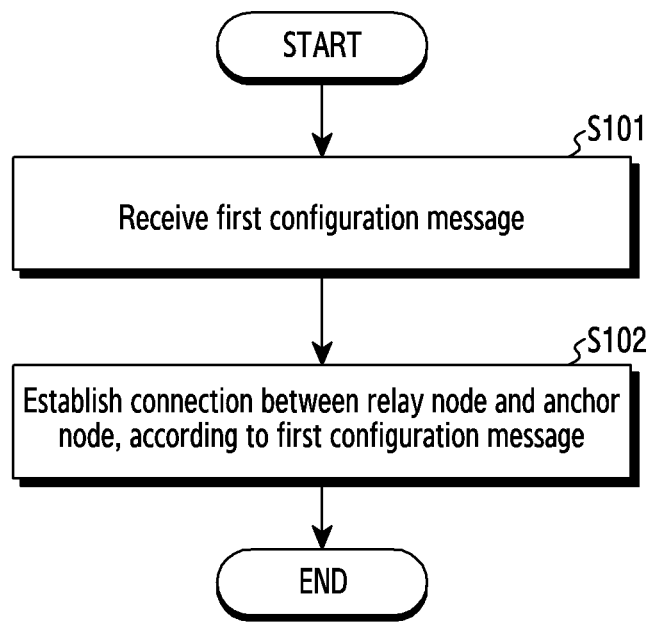
FIG. 3 is a flowchart illustrating an example method for initial access according to an embodiment of the disclosure.

The disclosure provides a method for initial access, applied to a relay node, and a flowchart illustrating an example of this method is shown in FIG. 3, including, for example:

Step S101, receiving a first configuration message.

Step S102, establishing a connection between the relay node and an anchor node, according to the first configuration message.

In an embodiment of the disclosure, the relay node receives a first configuration message; the relay node establishes a connection between the relay node and an anchor node according to the first configuration message. Accordingly, the distributed unit of the relay node can be connected to the central unit of the anchor node.

For example, the first configuration message may include, for example, and without limitation, any one of the following:

first information indicating a cell that supports the access of a relay node or a distributed unit of the relay node, second information indicating a cell that allows the access of a relay node or a distributed unit of the relay node, address information of the anchor node side, and address information of the relay node side.

For example, anchor nodes can be, for example, and without limitation, any of the following types:

a base station, a base station including a central unit and a distributed unit, and a central unit of a base station.

Establishing of a connection between the relay node and the anchor node may include, for example, and without limitation, at least one of the following processes:

selecting the cell supporting the access of the relay node, and establishing a connection with the anchor node serving the cell, according to at least one of the first information indicating the cell that supports the access of distributed unit of the relay node or relay node and the second information indicating the cell that allows the access of the distributed unit of the relay node or relay node;

establishing a connection with the anchor node according to at least one of the address information of the anchor node side and the address information of the relay node side.

Further, in the above two processes, the former may be used to establish a connection (e.g., RRC connection) between the mobile terminal of the relay node and the anchor node, and the latter may be used to establish a connection (e.g., an F1 interface) between distributed unit of the relay node and an anchor node (or a central unit of the anchor node).

For example, the address information of the anchor side may include, for example, and without limitation, at least one of the following:

identification information of the anchor node, identification information of the cell served by the anchor node, IP address of the anchor node side, Media Access Control (MAC) address of the anchor node side, and Stream Control Transmission Protocol (SCTP) steam identifier information.

For example, the address information of the relay node side may include, for example, and without limitation, at least one of the following:

identification information of the relay node, identification information of the cell served by the anchor node, IP address of the relay node side, MAC address of the relay node side, and SCTP stream identifier information.

Figure 4:
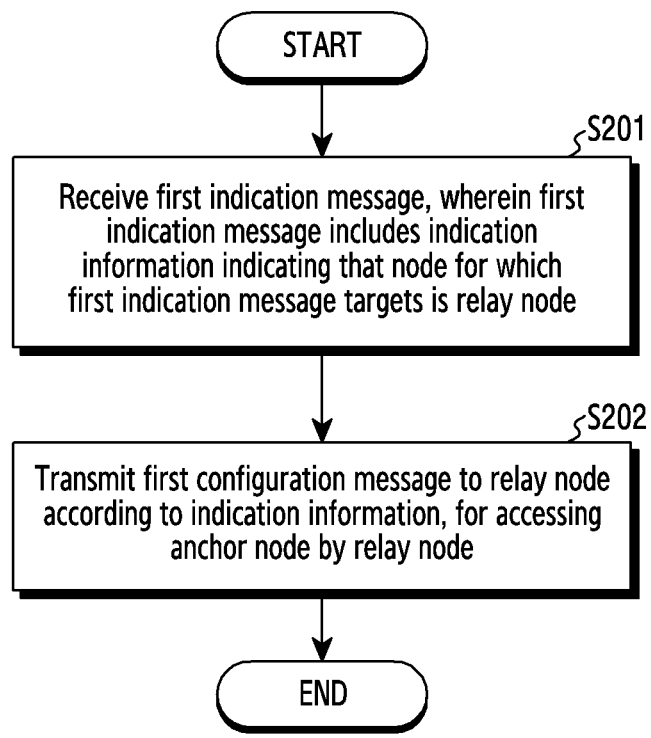
FIG. 4 is a flowchart illustrating another example method for initial access according to an embodiment of the disclosure.

The disclosure provides another example method for initial access, applied to a first node. A flowchart illustrating an example of this method is shown in FIG. 4, and the method includes, for example:

Step S201, receiving a first indication message, wherein the first indication message includes indication information indicating that the node for which the first indication message targets is a relay node;

Step S202, transmitting a first configuration message to the relay node according to the indication information, for accessing the anchor node by the relay node.

The first configuration message may include, for example, and without limitation, at least one of the following: first information indicating a cell that supports the access of a relay node or a distributed unit of the relay node, second information indicating a cell that allows the access of a relay node or a distributed unit of the relay node, address information of the anchor node side, and address information of the relay node side.

For example, the first node may, for example, and without limitation, include any of the following types:

an Operation Administration and Maintenance (OAM) system, a base station, a central unit of a base station, an anchor node, and a central unit of an anchor node.

For example, the indication information indicating that the node for which the first indication message targets is a relay node may include, for example, and without limitation, at least one of the following:

the indication information indicating that the node for which the first indication message targets is a node supporting relay function, and indication information indicating that the node for which the first indication message targets is an Integrated Access and Backhaul (IAB) node.

In this example embodiment of the disclosure, the first node may receive the first indication message, wherein the first indication message includes the indication information indicating that the node for which the first indication message targets is a relay node; and the first node transmits the first configuration message to the relay node according to the indication information, for accessing the anchor node by the relay node. Accordingly, the relay node is a node that supports the relay function, or the relay node is an IAB node, thereby enabling the relay node to establish a connection with the central unit of the anchor node.

Figure 5A:
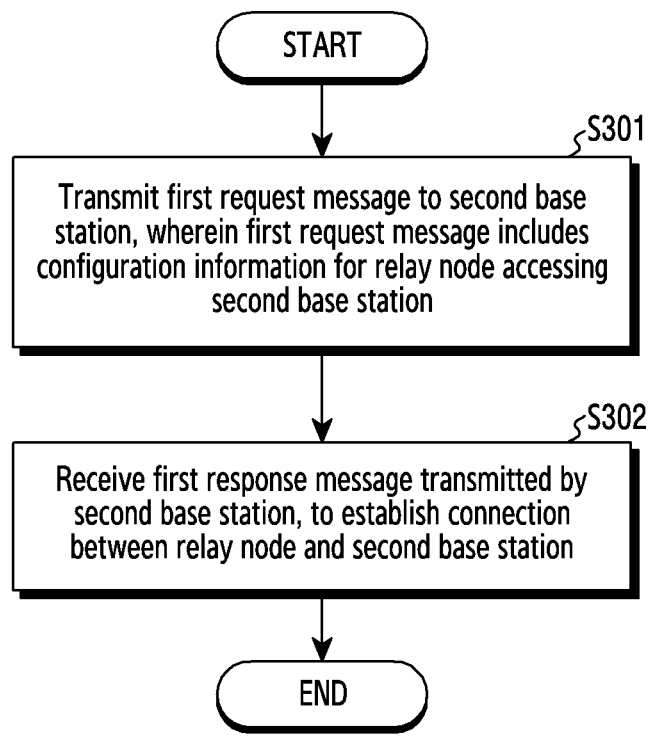
FIG. 5A is a flowchart illustrating another example method for initial access according an embodiment of the disclosure.

The disclosure further provides a method for initial access in a multi-hop relay network, applied to a first base station. A flowchart illustrating an example of this method is shown in FIG. 5A, and the method includes, for example:

Step S301, transmitting a first request message to a second base station, wherein the first request message includes configuration information for a relay node accessing the second base station;

Step S302, receiving a first response message transmitted by the second base station, to establish a connection between the relay node and the second base station.

For example, information carried in the configuration information may include, for example, and without limitation, at least one of the following:

identification information of the relay node, indication information indicating the relay node (the indication information indicating that the node for which the message targets is a relay node), identification information of a cell that supports the access of the relay node or a distributed unit of the relay node, identification information of a cell that allows the access of a relay node or a distributed unit of the relay node, a request message (e.g., an F1 Setup Request) generated by the relay node for establishing a connection between the relay node (or the distributed unit of the relay node) and the anchor node (or the central unit of the anchor node), address information of the anchor node side, address information of the relay node side, address information of the anchor node side and/or address information of the relay node side which is used to establish a connection between the relay node and the anchor node, wherein the anchor node being the second base station.

For example, information carried in the first response message may include, for example, and without limitation, at least one of the following:

identification information of the relay node, a response message (e.g., an F1 Setup Response/Failure) generated by the anchor node for establishing the connection between the anchor node (or the central unit of the anchor node) and the relay node (or the distributed unit of the relay node), address information of the anchor node side, address information of the relay node side, address information of the anchor node side and/or address information of the relay node side which is used to establish a connection between the relay node and the anchor node, and cause information.

Before transmitting the first request message to the second base station, the method may further include:

receiving a second request message transmitted by the relay node.

For example, the second request message may include, for example, and without limitation, at least one of the following:

indication information indicating the relay node (the indication information indicating that the node for which the message targets is a relay node), identification information of a cell that supports the access of the relay node or a distributed unit of the relay node, identification information of a cell that allows the access of a relay node or a distributed unit of the relay node, a request message (e.g., an F1 Setup Request) generated by the relay node for establishing a connection between the relay node (or the distributed unit of the relay node) and the anchor node (or the central unit of the anchor node), address information of the anchor node side, address information of the relay node side, address information of the anchor node side and/or address information of the relay node side which is used to establish a connection between the relay node and the anchor node.

After receiving the first response message transmitted by the second base station, the method may further include:

transmitting a second configuration message to the relay node for establishing, by the relay node, a transport network layer association with the second base station.

For example, the second configuration message may include, for example, and without limitation, at least one of the following:

a response message (e.g., an F1 Setup Response/Failure) generated by the anchor node for establishing the connection between the anchor node (or the central unit of the anchor node) and the relay node (or the distributed unit of the relay node), address information of the anchor node side, address information of the relay node side, address information of the anchor node side and/or address information of the relay node side which is used to establish a connection between the relay node and the anchor node.

Before the receiving the second request message transmitted by the relay node, the method may further include:

receiving the assistant information transmitted by the relay node for selecting, the first base station, the base station (or anchor node) to which the relay node is connected.

For example, the assistant information may include, for example, and without limitation, at least one of the following:

indication information indicating the relay node (the indication information indicating that the node for which the message targets is a relay node), third information indicating a cell that supports the access of the relay node or a distributed unit of the relay node, fourth information indicating a cell that allows the access of a relay node or a distributed unit of the relay node, address information of the anchor node side, and address information of the relay node.

Figure 5B:
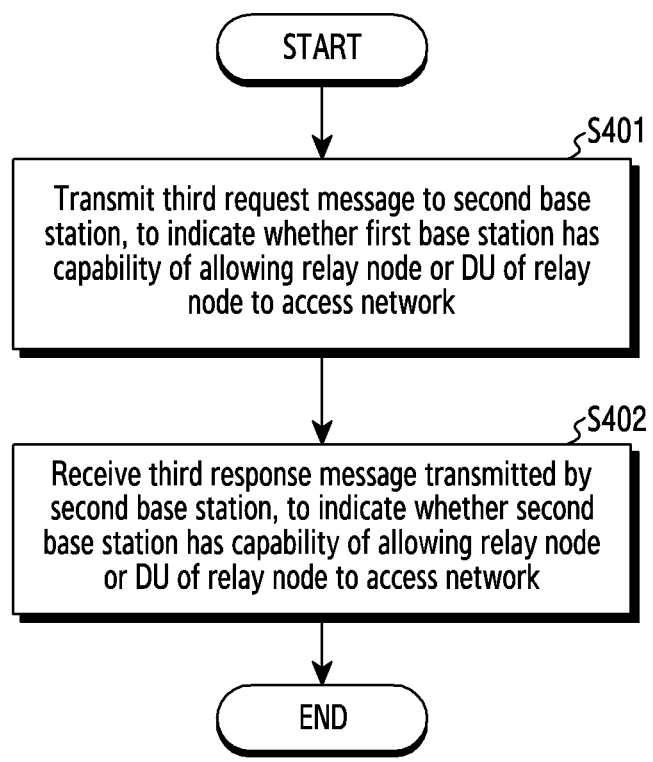
FIG. 5B is a flowchart illustrating a further example method for initial access according to an embodiment of the disclosure.

The disclosure provides a further method for initial access, applied to a first base station. The flowchart illustrating an example of this method is shown in FIG. 5B, and the method includes:

Step S401, transmitting a third request message to a second base station, to indicate whether the first base station has the capability of allowing a relay node or a distributed unit of the relay node to access the network.

Step S402, receiving a third response message transmitted by the second base station, to indicate whether the second base station has the capability of allowing the relay node or the distributed unit of the relay node to access the network.

It should be noted that, in an implementation manner, steps S401 and S402 may be performed before receiving the request message transmitted by the relay node for establishing a connection between the relay node and the anchor node.

For example, the third request message may include, for example, and without limitation, the at least one of the following:

indication information indicating whether the first base station supports the access of distributed unit of the relay node or the relay node, address information of a first base station side used when the relay node establishes a connection with the first base station, address information of a relay node side used when the relay node establishes a connection with the first base station, indication information of whether a serving cell of the first base station supports the access of relay node or the distributed unit of the relay node, and indication information of whether a neighbor serving cell of the first base station supports the access of relay node or the distributed unit of the relay node.

For example, the third response message may include, for example, and without limitation, at least one of the following:

indication information indicating whether the second base station supports the access of distributed unit of the relay node or the relay node, address information of a second base station side used when the relay node establishes a connection with the second base station, address information of a relay node side used when the relay node establishes a connection with the second base station, indication information of whether a serving cell of the second base station supports the access of relay node or the distributed unit of the relay node, and indication information of whether a neighbor serving cell of the second base station supports the access of relay node or the distributed unit of the relay node.

The methods for initial access in the various example embodiments of the disclosure described above will be described in greater detail below:

In the disclosure, an anchor node may represent, for example, a 5G base station, or a 5G base station including a central unit and a distributed unit, or a central unit of a 5G base station.

Various embodiments of the disclosure achieve an establishment of connection between a relay node and an anchor node, mainly for establishing a connection (e.g., an F1 interface) between a central unit in the anchor node and the distributed unit part of the relay node.

In the disclosure, a message transmitted between two nodes, or a process performed between two nodes, may be performed through a link directly connected between two nodes, or may be performed through one or more other nodes between two nodes.

The message names in the disclosure are merely examples, and other names may also be applied.

The following address information may be used by way of example in the disclosure:

Address information of the anchor node side, which is the address information of the anchor node side (or the central unit side of the anchor node) used by the relay node to access the anchor node (or the central unit of the anchor node). The address information may be address information representing an address, or may be a list of address information representing a plurality of addresses. In an embodiment, for address information of an address, the address information is the information of the anchor node side (or a central unit of the anchor node) for establishing transport network layer association (TNLA). The address information includes at least one of the following information:

Identification information of the anchor node, e.g., a base station ID, a central unit ID of the base station, an anchor node ID, a central unit ID of the anchor node, and the like;

Identification information of the cell, wherein a relay node accessing the cell may establish a connection with the anchor node;

IP address of the anchor node (or the central unit of the anchor node) side;

SCTP stream identifier information (SCTP stream identifier); and

MAC address of the anchor node (or the central unit of the anchor node) side.

Address information of the relay node side, which is the address information of the relay node side used by the relay node to access the anchor node (or the central unit of the anchor node). The address information may be address information used by the relay node, or address information used by the mobile terminal part of the relay node, or address information used by the distributed unit part of the relay node. The address information may be address information representing an address, or may be a list of address information representing a plurality of addresses. In an embodiment, for the address information of an address, the address information is the information of a relay node side for establishing TNLA. The address information includes at least one of the following information:

IP address of the relay node side;

SCTP stream identifier information;

MAC address of the relay node side;

Identification information of the accessed anchor node, e.g., a base station ID, a central unit ID of the base station, an anchor node ID, a central unit ID of the anchor node; and Identification information of the cell, wherein a relay node accessing the cell may establish a connection with the anchor node.

In the following description, "address information of the anchor node side" and "address information of the relay node side" may be used to represent the above two pieces of address information, respectively.

In example embodiment, the first node may configure the relevant information of the relay node to access the anchor node. The first node may be an Operation Administration and Maintenance (OAM) system, or may be a central unit of a base station or a base station serving a relay node. The base station may be directly connected to the relay node, or may be connected to the relay node through one or more other nodes (e.g., the relay node is connected to the first node through a distributed unit of the base station, or through one or more other relay nodes, or through a distributed unit of the base station and one or more other relay nodes).

Figure 6:
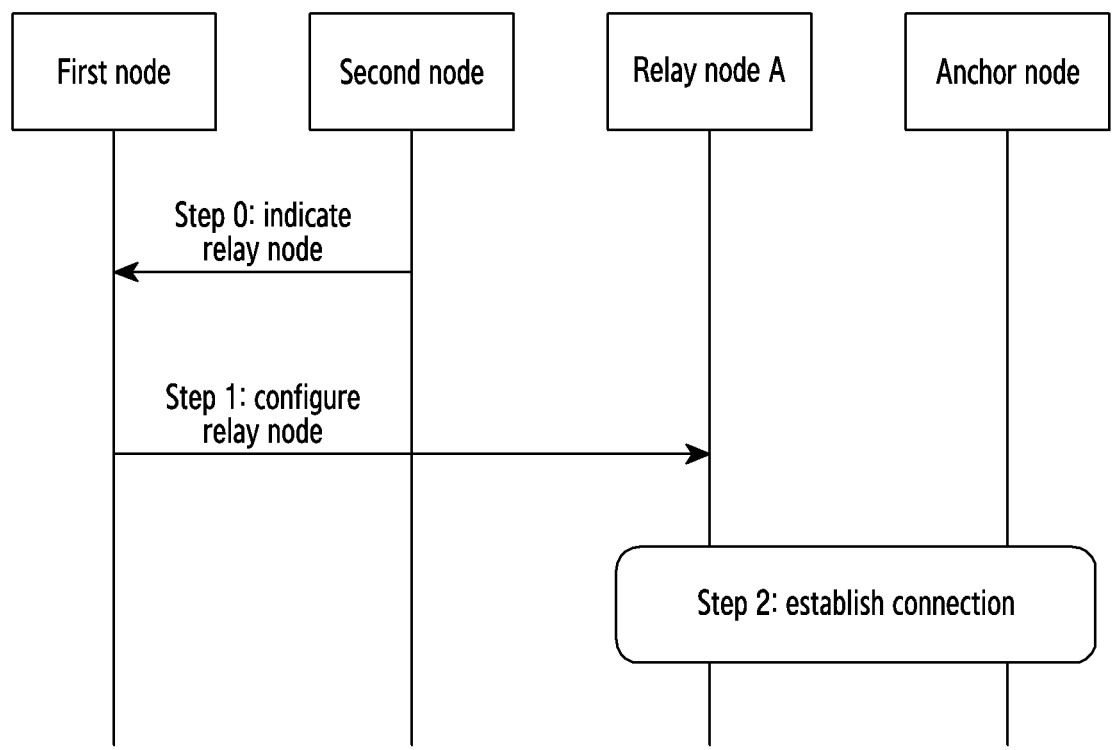
FIG. 6 is a flowchart illustrating an example of a first node configuring relevant information of a relay node accessing an anchor node according to an embodiment of the disclosure.

The procedure of the first node configuring the relevant information of the relay node to access the anchor node is described in greater detail below, and the procedure includes the following steps, as illustrated, for example, in FIG. 6:

Step 1 (configuring a relay node): transmitting, by the first node, a configuration message to the relay node A for configuring the relay node to access the anchor node, wherein the message may, for example, be an RRC message or other types of messages.

It should be noted that the configuration message in this description is a first configuration message.

For example, the configuration message may include, for example, and without limitation, at least one of the following information:

Configuration information of an air interface when the relay node communicates with the first node, e.g., configuration information of the cell, configuration information of a bearer, configuration information of a physical layer, configuration information of a MAC layer, configuration information of an RLC layer, configuration information of a PDCP layer, and configuration information of an SDAP layer, which may refer to the content in the RRCReconfiguration message in TS38.331.

Information about a cell that supports the access of the relay node or the distributed unit of the relay node, e.g., identification information of the cell (NR CGI: NR Cell Global Identifier, ECGI: E-UTRAN Cell Global Identifier, PCI: Physical Cell Identifier, etc.). When there are multiple cells that support the access of the relay node or the distributed unit of the relay node, the information provides the above information about each cell;

Information about the cell that allows the access of the relay node or the distributed unit of the relay node, e.g., the identification information of cell (NR CGI: NR Cell Global Identifier, ECGI: E-UTRAN Cell Global Identifier, PCI: Physical Cell Identifier, etc.). When there are multiple cells that allow the access of the relay node, the information provides the above information about each cell;

Address information of the anchor node side. In the above configuration message, the first node can also provide the relay node with multiple address information of the anchor node side, and the multiple address information may belong to the same anchor node or may belong to different anchor nodes. The address information indicates that address information of the anchor node side may be used when the relay node establishes a connection with the anchor node, and the relay node can select at least one of them to establish a connection with the anchor node;

Address information of the relay node side. In the above configuration message, the first node can also provide the relay node with multiple address information of the relay node side. The address information indicates that address information of the relay node side may be used when the relay node establishes a connection with the anchor node, and the relay node can select at least one of them to establish a connection with the anchor node.

The information of the above configuration message may also be used to indicate the association relationship between the information, for example, the accessed cell of the relay node, the address information of the relay node side used when establishing the connection between the relay node and the anchor node, the address information of the anchor node side used when establishing the connection between the relay node and the anchor node, and the correlation between any two or three of the above three. When the relay node accesses the cell A, the address information of the anchor node side used by the relay node is the address information B, and/or the address information of the relay node side used by the relay node is the address information C. When the address information of the anchor node side used by the relay node is the address information B, the address information of the relay node side used by the relay node is the address information C. When the address information of the relay node side used by the relay node is the address information C, the address information of the anchor node side used by the relay node is the address information B.

It should be noted that the information indicating the cell that supports the access of the relay node or the distributed unit of the relay node is the first information indicating the cell that supports the access of the relay node or the distribution node of the relay node, and the information indicating the cell that allows the access of the relay node or the distributed unit of the relay node is the second information indicating the cell that allows the access of the relay node or the distributed unit of the relay node.

Step 2 (establishing a connection): establishing, by the relay node A, a connection with the anchor node, wherein the anchor node may be a node different from the first node, or may be the first node. The process may include, for example, and without limitation, at least one of the following process:

Process 1: the relay node selects to access a cell that supports the access of the relay node or the distributed unit of the relay node according to the configuration message in Step 1, thereby establishing a connection between the relay node and the anchor node serving this cell; in an embodiment, the process may refer to a process in which a user accesses a network in an LTE or 5G network (e.g., TS38.300, TS38.331, TS36.300, TS36.331, etc.).

Process 2: the relay node establishes a connection between the relay node and the anchor node according to the address information of the anchor node side and/or the relay node side included in the configuration message in Step 1; in an embodiment, the established connection is the F1 interface between the distributed unit of the relay node and the central unit of the anchor node. This process can refer to the establishment process of the F1 interface (e.g., TS38.473).

Further, in the above two processes, the former may be used to establish a connection between the mobile terminal of the relay node and the anchor node (e.g., an RRC connection), and the latter may be used to establish a connection (e.g., an F1 interface) between the distributed unit of the relay node and the anchor node (or a central unit of the anchor node).

Before Step 1, the method may further include:

Step 0 (indicating a relay node): transmitting, by the second node, an indication message indicating the relay node to the first node, wherein the indication message at least includes indication information indicating that the relay node A is a node supporting the relay function (IAB function), or indication information indicating that the relay node A is an IAB node. The indication information may be explicit information or implicit information.

It should be noted that the indication message indicating the relay node is a first indication message.

The second node may be the above-mentioned relay node A, or may be one node (e.g., another relay node) accessed by the above-mentioned relay node A.

For example, based on the second node being the above-mentioned relay node A, the indication message may be an RRC message (e.g., RRCSetupComplete, RRCReestablishmentComplete, RRCResumeComplete, RRCReconfigurationComplete, e.g., TS38.331; such as RRCConnectionSetupComplete, RRCConnectionReestablishmentComplete, RRCConnectionResumeComplete, RRCConnectionReconfigurationComplete, e.g., TS36.331).

For example, when the second node is a node accessed by the relay node A, the indication message may be an F1AP message (such as INITIAL UL RRC Message Transfer, e.g., TS38.473). Further, before the second node transmits the indication message indicating the relay node, there is also a procedure of obtaining the indication information. In an embodiment of the procedure, whether the relay node is a relay node that supports relay function (IAB function) is determined based on resources (such as a random access resource, a configuration of a random access preamble) used when the relay node accesses the second node.

Figure 7:
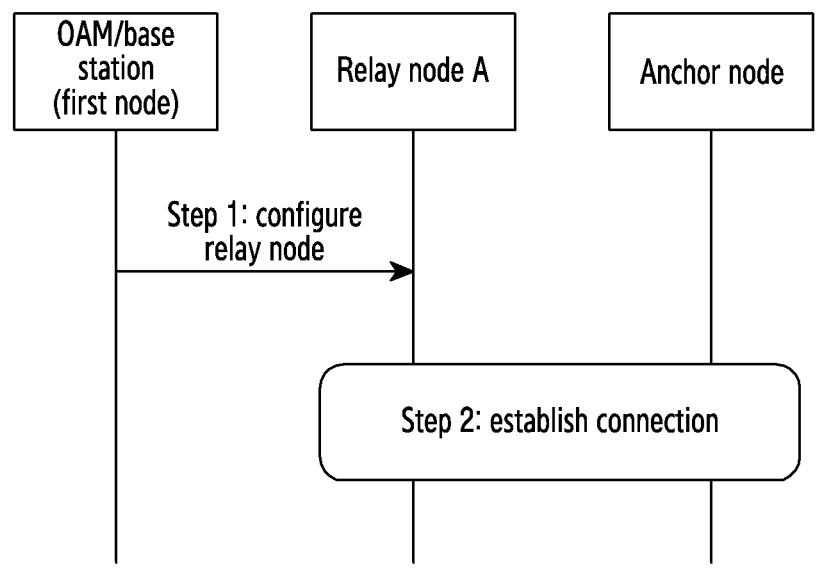
FIG. 7 is a flowchart illustrating an example of configuring a relay node to establish a connection with an anchor node according to an embodiment of the disclosure.

When the first node is the OAM or the base station serving for the relay node A, the procedure of configuring the relay node to establish a connection with the anchor node in the first aspect is provided in the embodiment of the disclosure (the first node and the anchor node are different nodes). The procedure may include, for example, and without limitation, the following steps, as illustrated, for example, in FIG. 7:

Step 1: The OAM/base station (e.g., first node) transmits a configuration message to the relay node A to configure the relay node to access the anchor node, as shown, for example, in step 1 in FIG. 6.

Step 2: The relay node A establishes a connection with the anchor node, as shown, for example, in step 2 in FIG. 6.

Figure 8:
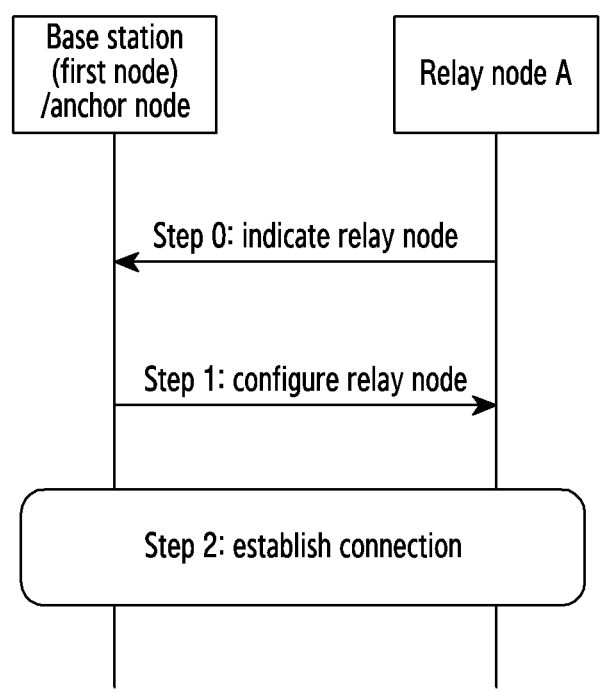
FIG. 8 is another flowchart illustrating an example of configuring a relay node to establish a connection with an anchor node according to an embodiment of the disclosure.

When the first node and the anchor node are the same node, another procedure of configuring the relay node to establish a connection with the anchor node is provided in an embodiment of the disclosure. The procedure includes, for example, and without limitation, the following steps, as illustrated, for example, in FIG. 8:

Step 0: The relay node A transmits a message indicating the relay node to the base station/anchor node, as shown, for example, in step 0 in FIG. 6.

Step 1: The base station/anchor node transmits a configuration message to the relay node A to configure the relay node to access the anchor node, as shown, for example, in step 1 in FIG. 6.

Step 2: The relay node A establishes a connection with the base station/anchor node, as shown, for example, in step 2 in FIG. 6.

Figure 9:
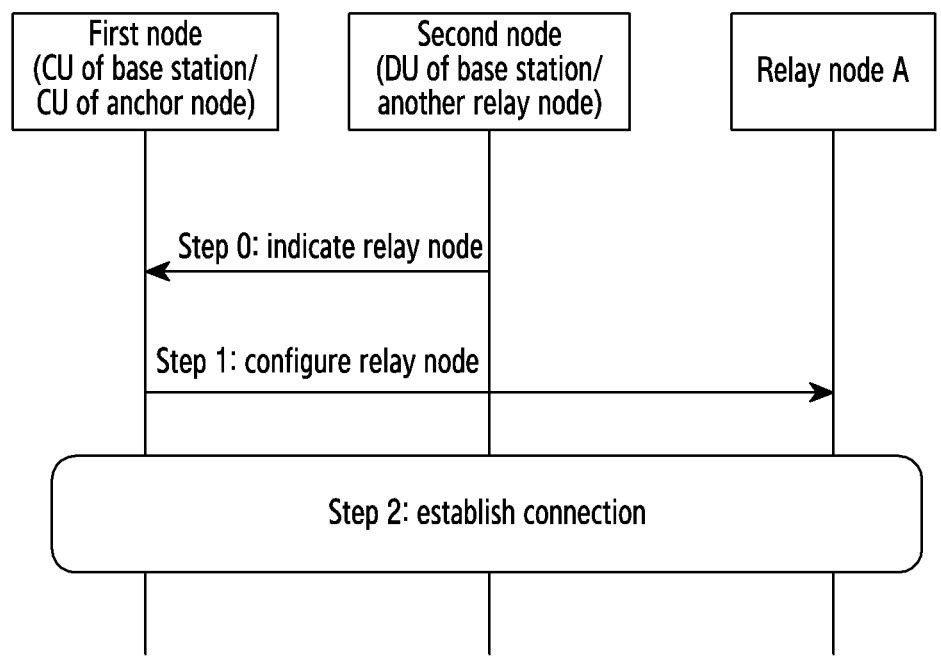
FIG. 9 is a further flowchart illustrating an example of configuring a relay node to establish a connection with an anchor node according to an embodiment of the disclosure.

The first node is a central unit of the base station and the base station is an anchor node, the second node is a distributed unit of the base station or another relay node, and the relay node A accesses the first node through a distributed unit of the base station or another relay node. Another procedure of configuring the relay node to establish a connection with the anchor node in the first aspect is provided in the embodiment of the disclosure. The procedure may include, for example, and without limitation, the following steps, as illustrated, for example, in FIG. 9:

Step 0: The distributed unit of the base station or another relay node (e.g., the second node) transmits a message indicating the relay node to the central unit of base station, as shown, for example, in step 0 in FIG. 6.

Step 1: The central unit of base station (e.g., the central unit of anchor node) transmits a configuration message for configuring the relay node to access the anchor node to the relay node A, as shown, for example, in step 1 in FIG. 6.

Step 2: The relay node A establishes a connection with the central unit of base station (the central unit of anchor node), as shown, for example, in step 2 in FIG. 6.

Figure 10:
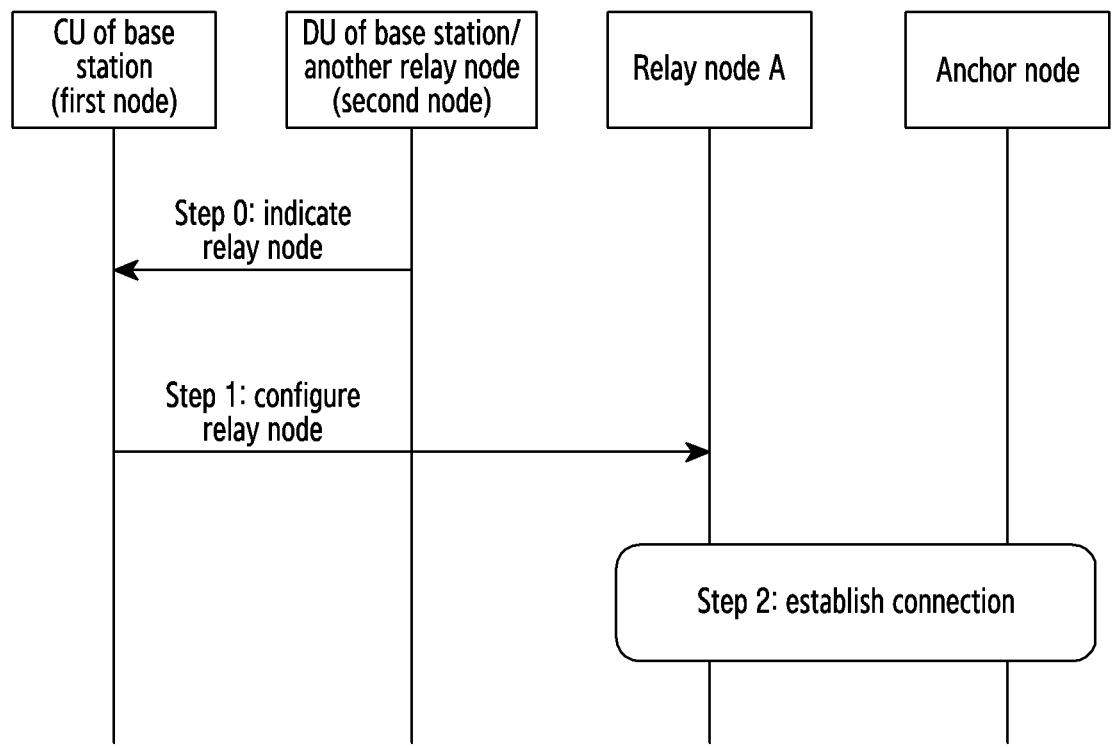
FIG. 10 is yet another flowchart illustrating an example of configuring a relay node to establish a connection with an anchor node according to an embodiment of the disclosure.

The first node is a central unit of the base station and the base station is not an anchor node, the second node is a distributed unit of the base station or another relay node, and the relay node A accesses the first node through a distributed unit of the base station or another relay node (the second node). A further procedure of configuring the relay node to establish a connection with the anchor node in the first aspect is provided in the embodiment of the disclosure. The procedure may include, for example, and without limitation, the following steps, as shown, for example, in FIG. 10:

Step 0: The distributed unit of base station or another relay node transmits a message indicating the relay node to the central unit of base station, as shown, for example, in step 0 in FIG. 6.

Step 1: The central unit of base station transmits a configuration message for configuring the relay node to access the anchor node to the relay node A, as shown, for example, in step 1 in FIG. 6.

Step 2: The relay node A establishes a connection with the anchor node, as shown, for example, in step 2 in FIG. 6.

An effect of the above steps is that the relay node can access the anchor node according to the obtained configuration information.

In an example embodiment of the disclosure, the relay node may establish a connection with another base station (the other base station is an anchor node to which the relay node needs to access). A possible scenario is that the relay node establishes multiple connectivity with at least two base stations, one base station is the master base station, the other one or more base stations are secondary base stations, and the anchor node is (at least) one of the secondary base stations. The relay node establishes a connection with the anchor node by performing information interaction between the master base station and the secondary base station and information interaction between the master base station and the relay node. Another scenario is that the relay node is handed over to another base station (the other base station is the anchor node that the relay node needs to access) and establishes a connection with the anchor node of another base station.

This example embodiment may include, for example, the following procedures:

1. A procedure of configuring a relay node between base stations.

It should be noted that the base station 1 is the first base station, and the base station 2 is the second base station.

The procedure of configuring the relay node between the base stations may be used for the procedure in which the master base station adds a secondary base station to the relay node, or may be used for the procedure in which the source base station hands over the relay node to a target base station.

Figure 11:
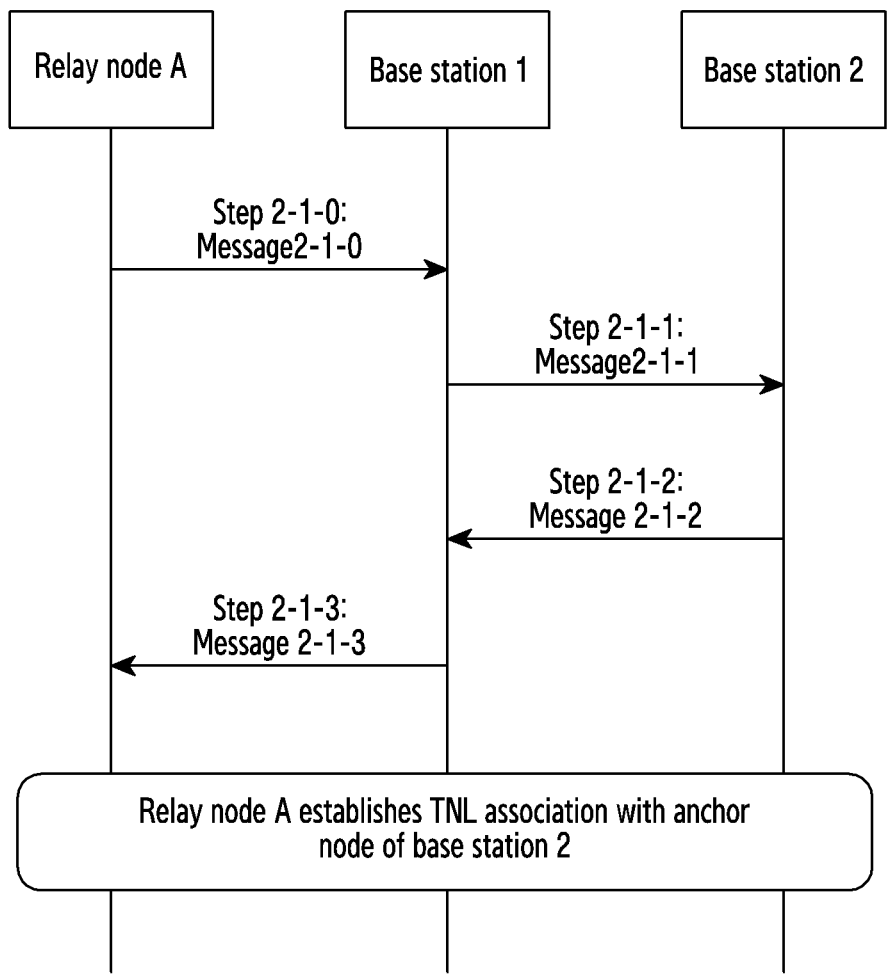
FIG. 11 is a flowchart illustrating an example of configuring a relay node between base stations according to an embodiment of the disclosure.

As shown, for example, in FIG. 11, the procedure of configuring a relay node between base stations may include, for example, and without limitation, the following steps:

step 2-1-1, base station 1 (e.g., the master base station or a source base station) transmits a request message 2-1-1 to base station 2 (e.g., secondary base station or target base station). The message is intended to provide relevant configuration information to the base station 2 for providing service to the relay node A. The configuration information provided by the message may include, for example, and without limitation, at least one of the following information:

identification information of the relay node A.

Indication information indicating the relay node, wherein the indication information indicates that the user (e.g., relay node A) for which the request message 2-1-1 targets is a relay node, or a node supporting the relay function, or a node that allows other users to access, such as IAB node Indication.

Identification information of the cell that supports the access of the relay node A or the distributed unit of the relay node A.

Identification information of the cell that allows the access of the relay node A or the distributed unit of the relay node A.

A request message for establishing a connection with the anchor node (or the central unit of the anchor node) by the relay node A (or the distributed unit of the relay node). The message may be generated by the base station 1 itself, or may be generated by receiving the information transmitted by relay node A. The message includes configuration information related to the relay node A, for example, identification information of one or more cells served by the relay node A, frequency point information of the cell, bandwidth information of the cell, system information of the cell generated by the relay node A, relevant information for measuring the cell, and RRC version information of the distributed unit of the relay node A and/or the mobile terminal, wherein detail content may be referred to an F1 Setup Request message in TS38.473, and the request message may be an F1 Setup Request. The F1 Setup Request message may be included in the message 2-1-1 in form of a container, or information elements (IE) in the F1 Setup Request message are included in the message 2-1-1 respectively.

Address information of the anchor node side, wherein the address information may be address information of the base station 2, or may be address information of the base station 1 or other base stations. In an example embodiment, the address information indicates that the relay node only establishes connection(s) with one or more addresses indicated by the address information. In another embodiment, the address information may also be one or more candidate address information of the anchor node side (if the address information is candidate information, it indicates that the relay node can establish a connection with any one address of the address information).

Address information of the relay node side. In an example embodiment, the address information indicates that the anchor node only establishes connection(s) with one or more addresses indicated by the address information. In another embodiment, the address information may also be one or more candidate address information of relay node side (if the address information is candidate information, it indicates that the anchor node can establish a connection with any one address of the address information).

The address information of the anchor node side and/or the address information of the relay node side used when the relay node A establishes a connection with the anchor node, and the contents of the "address information of the anchor node side" and the "address information of the relay node side" may be referred to the above-mentioned description. This information reflects the corresponding relationship of the address information used in establishing the connection, that is, the connection can only be established by using two addresses in the address information.

It should be noted that the message 2-1-1 is the first request message.

Other contents included in the message 2-1-1, may be referred to the SgNB Addition/Modification Request and Handover Request message in TS36.423, or the S-Node Addition/Modification Request and Handover Request message in TS38.423.

In addition, the above-mentioned "address information of the anchor node side" and "address information of the relay node side" may be included in the message 2-1-1 as a separate IE, or may be included in an RRC container in the message 2-1-1, or may be included in message 2-1-1 as an IE in "the Request Message for establishing a connection with the anchor node by the relay node A" (as contained in the F1 Setup Request message).

Step 2-1-2: The base station 2 transmits a response message 2-1-2 to the base station 1, which is a response message for the message 2-1-1. The message may include, for example, and without limitation, at least one of the following information:

Identification information of the relay node A.

Identification information of the base station 2, such as a Global en-gNB ID, an IAB donor ID, which may be included in the message 2-1-2 as an IE, or may be included in an RRC container transmitted to the relay node A.

A response message for establishing a connection with the anchor node (the central unit of the anchor node) by the relay node A (or the distributed unit of the relay node A). The message includes configuration information related to the anchor node, for example, information of a cell which the anchor node requests the relay node A to activate (such as the identification information, the system information of the anchor node side, and supportable PLMN list information), which detail contents may be referred to an F1 Setup Response message in TS38.473. The request message may be an F1 Setup Response message. The F1 Setup Response message may be included in the message 2-1-2 in form of a container, or IEs in the F1 Setup Response message may be included in the message 2-1-2 respectively. In another embodiment, the response message may include a message indicating that the relay node A has failed to establish a connection with the anchor node, such as an F1 Setup Failure message in TS38.473. The F1 Setup Failure message may be included in the message 2-1-2 in form of a container, or IEs in the F1 Setup Failure message may be included in the message 2-1-2 respectively.

Address information of the anchor node side wherein, the address information is address information of the base station 2. In an example embodiment, the address information indicates that the relay node only establishes connection(s) with one or more addresses indicated by the address information. In another embodiment, the address information may also be one or more candidate address information of the anchor node side (if the address information is candidate information, it indicates that the relay node can establish a connection with any one address of the address information).

Address information of the relay node side. In an example embodiment, the address information indicates that the anchor node only establishes connection(s) with one or more addresses indicated by the address information. In another embodiment, the address information may also be one or more candidate address information of the relay node side (if the address information is candidate information, it indicates that the anchor node can establish a connection with any one address of the address information).

The address information of the anchor node side and/or the address information of the relay node side used when the relay node A establishes a connection with the anchor node. The contents of the "address information of the anchor node side" and the "address information of the relay node side" may be referred to the description above. This information reflects the corresponding relationship of the address information used in establishing the connection, that is, the connection can only be established by using two addresses in the address information.

Cause information, which is the reason why the base station 2 replies the message 2-1-2, for example, a failure of establishing a connection between the relay node A and the anchor node, a failure to establish the F1 interface, cannot establish an F1 interface with the relay node A, and the like. Further, the cause information can indicate the specific cause of failure, such as a hardware error, a software error, an unpredictable error, insufficient resources to serve the new relay node, a link for servicing the relay node going wrong (such as wireless link failure), and a link for serving the relay node being recovering; further, the base station 2 can also provide waiting time information when sending the message 2-1-2, which can inform the base station 1 of the minimum waiting time before initiating a new message 2-1-1.

It should be noted that the message 2-1-2 is the first response message.

Other contents included in the message 2-1-2 can be referred to the SgNB Addition/Modification Response and Handover Request Acknowledge message in TS36.423, or the S-Node Addition/Modification Response and Handover Request Acknowledge message in TS38.423. In another embodiment, if the relay node A fails to establish a connection with the anchor node, or the base station 2 learns that the relay node cannot establish an F1 interface with it, the other contents included in the message 2-1-2 can be referred to the SgNB Addition/Modification Request Reject and Handover Preparation Failure message, or S-Node Addition/Modification Request Reject and Handover Preparation Failure message in TS38.423.

In addition, the above-mentioned "address information of the anchor node side" and "address information of the relay node side" may be included in the message 2-1-2 as a separate IE, or may be included in an RRC container in the message 2-1-2, or may be included in message 2-1-2 as an IE in "the Request Message for establishing a connection with the anchor node by the relay node A", as included in the F1 Setup Response message.

Before step 2-1-1, the method may further include: step 2-1-0: the relay node A transmits a message 2-1-0 to the base station 1. This message is used for the relay node A to provide base station 1 with information related to serve relay node A, and the message may include, for example, and without limitation, at least one of the following information:

Identification information of the cell that supports the access of the relay node A or the distributed unit of the relay node A.

Identification information of the cell that allows the access of the relay node A or the distributed unit of the relay node A.

A request message generated by the relay node A for establishing a connection with the anchor node (or the central unit of the anchor node) by the relay node (or the distributed unit of the relay node A), for example, an F1 Setup Request message (e.g., TS38.473). The message may be included in the message 2-1-0 in form of a container, or IEs in the F1 Setup Request message may be included in the message 2-1-0, respectively.

Address information of the anchor node side. In an example embodiment, the address information indicates that the relay node only establishes connection(s) with one or more addresses indicated by the address information. In another embodiment, the address information may also be one or more candidate address information of the anchor node side (if the address information is candidate information, it indicates that the relay node can establish a connection with any one address of the address information). The anchor node represented by the address information may belong to the base station 1, may belong to the base station 2, or may belong to other base stations.

Address information of the relay node side. In an example embodiment, the address information indicates that the anchor node only establishes connection(s) with one or more addresses indicated by the address information. In another embodiment, the address information may also be one or more candidate address information of the relay node side (if the address information is candidate information, it indicates that the anchor node can establish a connection with any one address of the address information).

The address information of the anchor node side and/or the address information of the relay node side used by the relay node A to establish a connection with the anchor node. The contents of the "address information of the anchor node side" and the "address information of the relay node side" may be referred to the description above. This information reflects the corresponding relationship of the address information used in establishing the connection, that is, the connection can only be established by using two addresses in the address information.

It should be noted that the message 2-1-0 is the second request message.

The message may be an existing RRC message (for example, a Measurement Report, UEAssistantceInformation, ULInformationTransfer, etc.), or may be a new RRC message (for example, F1MessageTransfer), and the message may also be an F1 Setup Request message.

In addition, the above-mentioned "address information of the anchor node side" and "address information of the side of the relay node" may be included in the message 2-1-0 as a separate IE, included in the F1 Setup Request message.

After step 2-1-2, the method may further include:

Step 2-1-3: The base station 1 transmits a message 2-1-3 to the relay node A, wherein the message is used to configure the relay node A, and the message may include, for example, and without limitation, at least one of the following information:

A response message generated by the anchor node for establishing a connection with the relay node (or the distributed unit of the relay node A) by the anchor node (or the central unit of the anchor node). The anchor node is an anchor node of the base station 2, for example, an F1 Setup Response/Failure (e.g., TS38.473). The message may be included in the message 2-1-3 in the form of a container, or IEs in the F1 Setup Response/Failure message may be included in the message 2-1-3, respectively; the message may be received from base station 2 by the base station 1, or may be generated by the base station 1.

Address information of the anchor node side. The address information is address information of the base station 2. In an example embodiment, the address information indicates that the relay node only establishes connection(s) with one or more addresses indicated by the address information. In another embodiment, the address information may also be one or more candidate address information of the anchor node side (if the address information is candidate information, it indicates that the relay node can establish a connection with any one address of the address information).

Address information of the relay node side. In an example embodiment, the address information indicates that the anchor node only establishes connection(s) with one or more addresses indicated by the address information. In another embodiment, the address information may also be one or more candidate address information of the relay node side (if the address information is candidate information, it indicates that the anchor node can establish a connection with any one address of the address information).

The address information of the anchor node side and/or the address information of the relay node side used when the relay node A establishes a connection with the anchor node, and the contents of the "address information of the anchor node side" and the "address information of the relay node side" may be referred to the description above. This information reflects the corresponding relationship of the address information used in establishing the connection, that is, the connection can only be established by using two addresses in the address information.

Identification information of the base station 2, such as a Global en-gNB ID, an IAB donor ID, which may be included in the message 2-1-3 as an IE, or may be included in an RRC container transmitted to the relay node A.

Waiting time information, which informs the relay node A of the time that it needs to wait before initiating a connection with the base station 2, or the minimum time that it needs to wait before initiating a connection with the central unit of the base station 2 to establish an F1 interface. Further, the waiting time may be received by the base station 1 in the step 2-1-2.

The message may be an existing RRC message (for example, RRCReconfiguration, DLInformationTransfer, etc.) or a new RRC message (for example, F1 MessageTransfer), and the message may also be an F1 Setup Response/Failure message.

It should be noted that the message 2-1-3 is the second configuration message.

Further, in the above steps (steps 2-1-0, 2-1-1, 2-1-2, and 2-1-3), the above-mentioned "address information of the anchor node side" and/or "address information of the relay node side" can be included in the message (such as message 2-1-0, 2-1-1, 2-1-2, and 2-1-3) of each step as a separate IE, or can be included in the F1 Setup Request/Response/Failure message, that is, the F1 Setup Request/Response/Failure message may also include "address information of the anchor node side" and/or "address information of the relay node side", in addition to the contents defined in TS38.473.

After step 2-1-3, the method may further include that the relay node A establishes a connection with the anchor node according to the address information ("address information of the anchor node side" and/or "address information of the relay node side") obtained in the above processes, for example, establishing a TNL association according to the SCTP protocol.

After the above steps, the relay node A can establish a dual connectivity with the base station 1 and the base station 2, or the relay node A can be handed over from the base station 1 to the base station 2, and the relay node A interacts the relevant information required to establish an F1 interface (e.g., information related to establishment of F1 interface) with the base station 2 (anchor node), and establishes a connection between the distributed unit of relay node A and base station 2 (anchor node), for example, an F1 interface is established.

2. A procedure of interacting information between base stations. The procedure of interacting information between base stations may mainly be used to interact relevant information about whether relay node is supported to access the network between two base stations. The relay node accessing to the network requires the base station to be able to establish a connection with the relay node (for example, the distributed unit of the relay node establishes a connection with the central unit of the base station, e.g., the F1 interface), so that the relay node can serve other users. In actual networks, not every base station supports the access of the relay node, since some base stations cannot establish a connection with the distributed unit of the relay node. The procedure is used to indicate whether the base station has the capability of allowing the relay node to access the network (or the capability of allowing the distributed unit of the relay node to access the base station).

Figure 12:
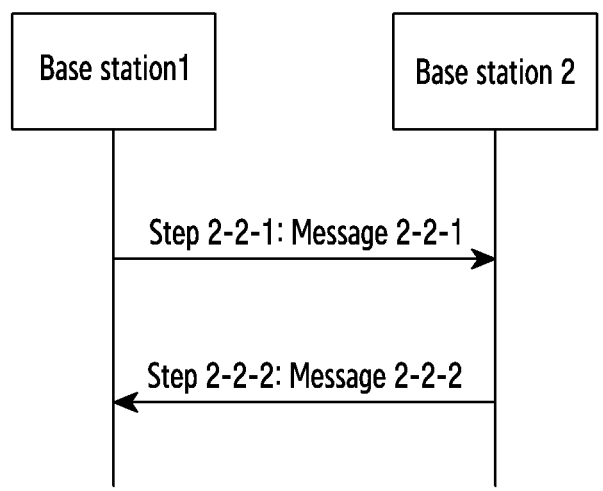
FIG. 12 is a flowchart illustrating an example of interacting information between base stations according to an embodiment of the disclosure.

Taking base station 1 and base station 2 as an example, as shown, for example, in FIG. 12, the procedure of interacting information between base stations may include, for example, the following two steps:

Step 2-2-1: The base station 1 transmits a message 2-2-1 to the base station 2, which the message may include, for example, and without limitation, at least one of the following information:

Indication information indicating whether the base station 1 supports or allows the access of the relay node (or the distributed unit of the relay node), for example, supporting or allowing the access of the relay node, and not supporting or allowing the access of the relay node.

Address information of the anchor node side used when the relay node establishes a connection with the base station 1. The connection is a connection established between the relay node (or the distributed unit of the relay node) and the base station 1 (or the central unit of the base station 1), e.g., the F1 interface.

Address information of the relay node side used when the relay node establishes a connection with the base station 1. The connection is established between the relay node (or the distributed unit of the relay node) and the base station 1 (or the central unit of the base station 1), e.g., the F1 interface.

Indication information of whether the serving cell of the base station 1 supports or allows the access of the relay node (or the distributed unit of the relay node), and for one serving cell or a group of cells of the base station 1, the indication information includes at least one of the following information:

Identification information of the cell. If it is a group of cells, the identification information of the cell includes the identification information of each cell in the group of cells;

Indication information of whether the cell supports or allows the access of the relay node.

Configuration information used by the relay node to access the cell, such as the RACH configuration information used by the relay node to access the cell (e.g., RACH-ConfigCommon, RACH-ConfigDedicated in TS38.331), configuration information of a synchronization signal used by the relay node to access the cell (for example, configuration information of SSB), and configuration information used by the relay node for measuring the cell (for example, Measurement Timing Configuration, which can be used to indicate the configuration information used when measuring the cell). In this configuration information, the configuration information used by the relay node is included. According to the configuration information, the base station 2 can learn that the cell of the base station 1 can support or allow the access of relay node.

Address information of the anchor node side used when the relay node accessing the cell establishes a connection with the base station 1. The connection is a connection established between a relay node (or the distributed unit of the relay node) and the base station 1 (or the central unit of the base station 1), e.g., the F1 interface.

Address information of the relay node side used when the relay node accessing the cell establishes a connection with the anchor node of the base station 1. The connection is a connection established between a relay node (or the distributed unit of the relay node) and the base station 1 (or the central unit of the base station 1), e.g., the F1 interface.

Indication information of whether the neighbor serving cell of base station 1 supports or allows the access of the relay node (or the distributed unit of the relay node). For a neighbor serving cell or a group of neighbor cells of base station 1, the indication information may include, for example, and without limitation, at least one of the following information:

Identification information of the cell. If it is a group of cells, the identification information of the cell includes the identification information of each cell in the group of cells;

Indication information of whether the cell supports or allows the access of the relay node.

Configuration information used by the relay node to access the cell, such as the RACH configuration information used by the relay node to access the cell (e.g., RACH-ConfigCommon, RACH-ConfigDedicated in TS38.331), configuration information of a synchronization signal used by the relay node to access the cell (for example, configuration information of SSB), and configuration information used by the relay node for measuring the cell (for example, Measurement Timing Configuration, which can be used to indicate the configuration information used when measuring the cell). In this configuration information, the configuration information used by the relay node is included. According to the configuration information, the base station 2 can learn that the cell of the base station 1 can support or allow the access of relay node.

Address information of the anchor node side used when the relay node accessing the cell establishes a connection with the base station serving the cell. The connection is a connection established between a relay node (or the distributed unit of the relay node) and the base station (or the central unit of the base station) serving the cell, e.g., the F1 interface.

Address information of the relay node side used when the relay node accessing the cell establishes a connection with the base station serving the cell. The connection is a connection established between a relay node (or the distributed unit of the relay node) and the base station (or the central unit of the base station) serving the cell, e.g., the F1 interface.

It is noted that message 2-2-1 is the third request message.

Step 2-2-2: base station 2 transmits a message 2-2-2 to the base station 1, which may include, for example, and without limitation, at least one of the following information:

Indication information indicating whether the base station 2 supports or allows the access of the relay node (or the distributed unit of the relay node), e.g., supporting or allowing the access of the relay node, and not supporting or allowing the access of the relay node.

Address information of the anchor node side used when the relay node establishes a connection with the base station 2. The connection is a connection established between the relay node (or the distributed unit of the relay node) and the base station 2 (or the central unit of the base station 2), e.g., the F1 interface.

Address information of the relay node side used when the relay node establishes a connection with the base station 2. The connection is established between the relay node (or the distributed unit of the relay node) and the base station 2 (or the central unit of the base station 2), e.g., the F1 interface.

Indication information of whether the serving cell of the base station 2 supports or allows the access of the relay node, and for one serving cell or a group of cells of the base station 2, the indication information may include, for example, and without limitation, at least one of the following information:

Identification information of the cell. If it is a group of cells, the identification information of the cell includes the identification information of each cell in the group of cells.

Indication information of whether the cell supports or allows the access of the relay node;

Configuration information used by the relay node to access the cell, such as the RACH configuration information used by the relay node to access the cell (e.g., RACH-ConfigCommon, RACH-ConfigDedicated in TS38.331), configuration information of a synchronization signal used by the relay node to access the cell (for example, configuration information of SSB), and configuration information used by the relay node for measuring the cell (for example, Measurement Timing Configuration, which can be used to indicate the configuration information used when measuring the cell). In this configuration information, the configuration information used by the relay node is included. According to the configuration information, the base station 2 can learn that the cell of the base station 1 can support or allow the access of the relay node;

Address information of the anchor node side used when the relay node accessing the cell establishes a connection with the base station 2. The connection is a connection established between a relay node (or the distributed unit of the relay node) and the base station 2 (or the central unit of the base station 2), e.g., the F1 interface;

Address information of the relay node side used when the relay node accessing the cell establishes a connection with the base station 2. The connection is a connection established between a relay node (or the distributed unit of the relay node) and the base station 2 (or the central unit of the base station 2), e.g., the F1 interface.

Indication information of whether the neighbor serving cell of base station 2 supports the access of the relay node. For a neighbor serving cell or a group of neighbor cells of base station 2, the indication information may include, for example, and without limitation, at least one of the following information:

Identification information of the cell. If it is a group of cells, the identification information of the cell includes the identification information of each cell in the group of cells;

Indication information of whether the cell supports or allows the access of the relay node;

Configuration information used by the relay node to access the cell, such as the RACH configuration information used by the relay node to access the cell (e.g., RACH-ConfigCommon, RACH-ConfigDedicated in TS38.331), configuration information of a synchronization signal used by the relay node to access the cell (for example, configuration information of SSB), and configuration information used by the relay node for measuring the cell (for example, Measurement Timing Configuration, which can be used to indicate the configuration information used when measuring the cell). In this configuration information, the configuration information used by the relay node is included. According to the configuration information, the base station 2 can learn that the cell of the base station 1 can support or allow the access of the relay node;

Address information of the anchor node side used when the relay node accessing the cell establishes a connection with the base station serving the cell. The connection is a connection established between a relay node (or the distributed unit of the relay node) and the base station (or the central unit of the base station) serving the neighbor cell, e.g., the F1 interface;

Address information of the relay node side used when the relay node accessing the cell establishes a connection with the base station serving the cell. The connection is a connection established between a relay node (or the distributed unit of the relay node) and the base station (or the central unit of the base station) serving the neighbor cell, e.g., the F1 interface.

It is noted that, the message 2-2-2 is a third response message.

The above procedure can refer to relevant procedures in X2/Xn, e.g., an X2/Xn Setup procedure, an EN-DC/NG-RAN Node Configuration Update procedure, which are referred to TS36.423, and TS38.423.

Figure 13:
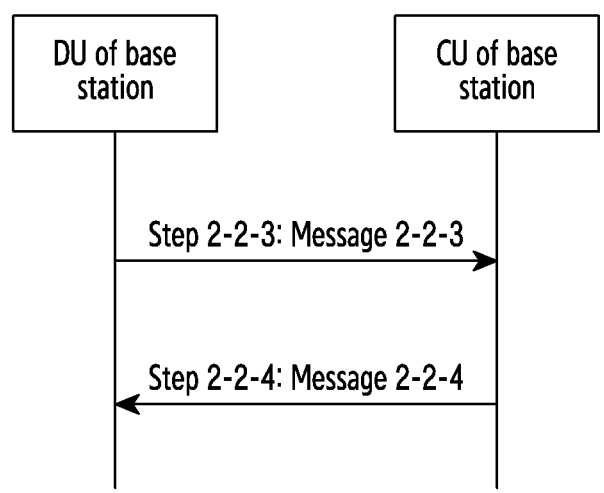
FIG. 13 is a flowchart illustrating an example of interacting information between a distributed unit of a base station and a central unit of a base station according to an embodiment of the disclosure.

In addition, when a base station includes a central unit and a distributed unit, the interaction process between the central unit and the distributed unit can also be used to indicate whether the access of relay node is supported. As shown, for example, in FIG. 13, the procedure of interacting information between the distributed unit of the base station and the central unit of the base station may include, for example, the following steps:

Step 2-2-3: the distributed unit of the base station transmits the message 2-2-3 to the central unit of the base station, and the message may include, for example, and without limitation, at least one of the following information:

Indication information indicating whether the distributed unit of the base station supports or allows the access of the relay node (or the distributed unit of the relay node), for example, supporting or allowing the access of the relay node, and not supporting or allowing the access of the relay node.

Indication information of whether the serving cell of the distributed unit of the base station supports or allows the access of the relay node (or the distributed unit of the relay node), wherein for a cell or a group of cells served by the distributed unit, the indication information may include, for example, and without limitation, at least one of the following information:

Identification information of the cell. If it is a group of cells, the identification information of the cell includes the identification information of each cell in the group of cells.

Indication information of whether the cell supports or allows the access of the relay node.

Configuration information used by the relay node to access the cell, such as the RACH configuration information used by the relay node to access the cell (e.g., RACH-ConfigCommon, RACH-ConfigDedicated in TS38.331), configuration information of a synchronization signal used by the relay node to access the cell (for example, configuration information of SSB), and configuration information used by the relay node for measuring the cell (for example, Measurement Timing Configuration, which can be used to indicate the configuration information used when measuring the cell). In this configuration information, the configuration information used by the relay node is included. According to the configuration information, the base station 2 can learn that the cell of the base station 1 can support or allow the access of the relay node.

Indication information of whether the neighbor serving cell of the distributed unit of the base station supports or allows the access of the relay node (or the distributed unit of the relay node), and for a neighbor cell or a group of neighbor cells of the distributed unit of the base station, the indication information may include, for example, and without limitation, at least one of the following information:

Identification information of the cell. If it is a group of cells, the identification information of the cell includes the identification information of each cell in the group of cells.

Indication information of whether the cell supports or allows the access of the relay node.

Configuration information used by the relay node to access the cell, such as the RACH configuration information used by the relay node to access the cell (e.g., RACH-ConfigCommon, RACH-ConfigDedicated in TS38.331), configuration information of a synchronization signal used by the relay node to access the cell (for example, configuration information of SSB), and configuration information used by the relay node for measuring the cell (for example, Measurement Timing Configuration, which can be used to indicate the configuration information used when measuring the cell). In this configuration information, the configuration information used by the relay node is included. According to the configuration information, the base station 2 can learn that the cell of the base station 1 can support or allow the access of the relay node.

Step 2-2-4: the central unit of the base station transmits the response message 2-2-4 to the distributed unit of the base station, wherein the message may include, for example, and without limitation, at least one of the following information:

Indication information indicating whether the central unit of the base station supports or allows the access of the relay node (or the distributed unit of the relay node), for example, supporting or allowing the access of the relay node, and not supporting or allowing the access of the relay node.

Indication information of whether other serving cells (that are not the cell served by the distributed unit of the base station which transmits the message 2-2-3) of the central unit of the base station support the access of the relay node, wherein for a cell or a group of cells, the indication information may include, for example, and without limitation, at least one of the following information:

Identification information of the cell. If it is a group of cells, the identification information of the cell includes the identification information of each cell in the group of cells.

Indication information of whether the cell supports or allows the access of the relay node.

Configuration information used by the relay node to access the cell, such as the RACH configuration information used by the relay node to access the cell (e.g., RACH-ConfigCommon, RACH-ConfigDedicated in TS38.331), configuration information of a synchronization signal used by the relay node to access the cell (for example, configuration information of SSB), and configuration information used by the relay node for measuring the cell (for example, Measurement Timing Configuration, which can be used to indicate the configuration information used when measuring the cell). In this configuration information, the configuration information used by the relay node is included. According to the configuration information, the base station 2 can learn that the cell of the base station 1 can support or allow the access of the relay node.

Indication information of whether the neighbor cell of the central unit of the base station supports or allows the access of the relay node (or the distributed unit of the relay node), and for a neighbor cell or a group of neighbor cells, the indication information may include, for example, and without limitation, at least one of the following information:

Identification information of the cell. If it is a group of cells, the identification information of the cell includes the identification information of each cell in the group of cells.

Indication information of whether the cell supports or allows the access of the relay node.

Configuration information used by the relay node to access the cell, such as the RACH configuration information used by the relay node to access the cell (e.g., RACH-ConfigCommon, RACH-ConfigDedicated in TS38.331), configuration information of a synchronization signal used by the relay node to access the cell (for example, configuration information of SSB), and configuration information used by the relay node for measuring the cell (for example, Measurement Timing Configuration, which can be used to indicate the configuration information used when measuring the cell). In this configuration information, the configuration information used by the relay node is included. According to the configuration information, the base station 2 can learn that the cell of the base station 1 can support or allow the access of the relay node.

The above procedure can be referred to relevant procedures in F1, e.g., an F1 Setup procedure, and a gNB-CU/gNB-DU Configuration Update procedure, e.g., TS38.473.

Through the above procedure, it can be determined whether the serving cell of the base station supports or allows the access of the relay node (or the distributed unit of the relay node), thereby helping the base station select another suitable base station to serve the relay node, and guaranteeing the establishment of a connection (e.g., an F1 connection) between the relay node (or the distributed unit of the relay node) and the base station (e.g., the anchor node), so as to allow the relay node to serve other users.

3. The procedure of the relay node providing assistant information to the base station.

Figure 14A:
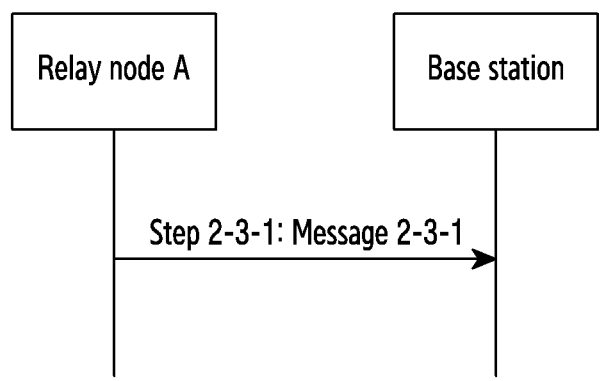
FIG. 14A is a flowchart illustrating an example of a relay node providing assistant information to a base station according to an embodiment of the disclosure.
Figure 14B:
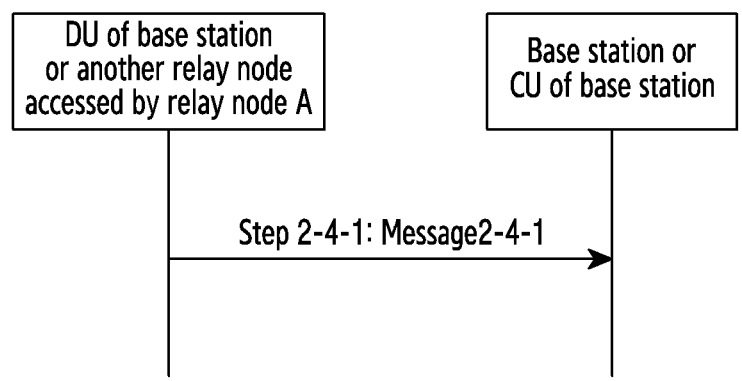
FIG. 14B is a flowchart illustrating an example of providing assistant information by a distributed unit of a base station accessed by a relay node or other relay nodes to a central unit of a base station or a base station.

In the procedure of relay node providing assistant information to base station, the assistant information provided by relay node to base station can help base station to select other base stations serving for the relay node. This procedure can help the base station to select the appropriate secondary base station, so as to establish dual or multiple connectivity for the relay node, and enable the relay node (or the distributed unit of the relay node) establish a connection (e.g., an F1 connection) with the secondary base station (e.g., the anchor node). The procedure can also help the base station to hand over the relay node to the appropriate target base station, so that the base station can serve the relay node, and the relay node can establish a connection (e.g., an F1 connection) with the base station (e.g., anchor node), as shown, for example, in FIGS. 14A and 14B. The procedure of relay node providing assistant information to the base station may include the following steps:

Step 2-3-1, the relay node A transmits message 2-3-1 to the base station, which the message may include, for example, and without limitation, at least one of the following information:

Indication information indicating the relay node, which indicates that the relay node A is a node supporting the relay function (IAB function), or indicates that the relay node A is an IAB node.

Information related to the cell that supports the access of the relay node (or the distributed unit of the relay node), e.g., the identification information of cell (NR CGI: NR Cell Global Identifier, ECGI: E-UTRAN Cell Global Identifier, PCI: Physical Cell Identifier, etc.). When there are multiple cells supporting the access of the relay node (or the distributed unit of the relay node), the information can provide the above information about each cell.

Information related to the cell that allows the access of the relay node (or the distributed unit of the relay node), e.g., the identification information of the cell (NR CGI: NR Cell Global Identifier, ECGI: E-UTRAN Cell Global Identifier, PCI: Physical Cell Identifier, etc.). When there are multiple cells that allow the access of relay node (or the distributed unit of the relay node), this information can provide the above information about each cell.

Address information of the anchor node side, which indicates the address information of the anchor node side used when the relay node A accesses the anchor node. The information may include one or more address information of anchor node sides, and such multiple address information may belong to the same anchor node or may belong to different anchor nodes.

Address information of the relay node side, which the information indicates the address information of the relay node side used when the relay node A accesses the anchor node.

The above message 2-3-1 may be an existing RRC message, e.g., UEAssistantceInformation and ULInformationTransfer, or may be a new RRC message.

It should be noted that the information related to the cell that supports the access of the relay node (or the distributed unit of the relay node) is the third information of the cell that supports the access of the relay node (or the distributed unit of the relay node), and the information related to the cell that allows the access of the relay node (or the distributed unit of the relay node) is the fourth information of the cell that allows the access of the relay node (or the distributed unit of the relay node).

Through the procedure, the base station can obtain relevant information of the relay node, help the base station to configure the relay node to discover the accessible anchor node, or configure the relay node to access the anchor node.

4. A procedure of providing assisting information to the base station (the central unit of the base station) by the distributed unit of the base station or another relay node accessed by the relay node.

In the procedure of providing assistant information to the base station (the central unit of the base station) by the distributed unit of the base station or another relay node accessed by the relay node, the assistant information provided by the distributed unit of the base station or another relay node to the base station (a central unit of the base station) can help the base station select other base stations for serving the relay node. The procedure may help the base station select a suitable secondary base station to establish a dual or multiple connectivity for the relay node, and establish a connection (such as F1 connection) between the relay node (or the distributed unit of the relay node) with the secondary base station (e.g., the anchor node). The procedure may also help the base station to hand over the relay node to a suitable target base station, so that the target base station serves the relay node, and the relay node establish a connection (such as F1 connection) with the target base station (e.g., the anchor node), as shown, for example, in FIG. 14B. The procedure of providing the assistant information to the base station by the distributed unit of the base station or another relay node accessed by the relay node may include, for example, the following steps:

Step 2-4-1: the distributed unit of the base station or another relay node accessed by the relay node A transmits message 2-4-1 to the base station, which the message may include, for example, and without limitation, at least one of the following information:

Indication information indicating the relay node, which indicates that the relay node A is a node supporting the relay function (IAB function), or indicates that the relay node A is an IAB node.

Information related to the cell that supports the access of the relay node (or the distributed unit of the relay node), e.g., the identification information of cell (NR CGI: NR Cell Global Identifier, ECGI: E-UTRAN Cell Global Identifier, PCI: Physical Cell Identifier, etc.). When there are multiple cells supporting the access of the relay node (or the distributed unit of the relay node), the information can provide the above information about each cell.

Information related to the cell that allows the access of the relay node (or the distributed unit of the relay node), e.g., the identification information of the cell (NR CGI: NR Cell Global Identifier, ECGI: E-UTRAN Cell Global Identifier, PCI: Physical Cell Identifier, etc.). When there are multiple cells that allow the access of relay node (or the distributed unit of the relay node), this information can provide the above information about each cell.

Address information of the anchor node side, which indicates the address information of the anchor node side used when the relay node A accesses the anchor node. The information may include one or more address information of anchor node sides, and such multiple address information may belong to the same anchor node or may belong to different anchor nodes.

Address information of the relay node side, which indicates the address information of the relay node side used when the relay node A accesses the anchor node.

The above message 2-4-1 may be an existing F1AP message, e.g., Initial UL RRC Message Transfer, or may be a new F1AP message.

Further, before transmitting the message 2-4-1 to the base station by the distributed unit of the base station or another relay node accessed by the relay node A, the method also has a procedure of obtaining information related to the message 2-4-1. An embodiment of the process is to determine whether the relay node A is a node that supports a relay function (IAB function), according to resources (e.g., a random access resource, a configuration of a random access preamble, and the like) used by the relay node A to access the distributed unit of the base station or another relay node.

The above-described procedures illustrated in the disclosure may be performed independently, or together.

Figure 15:
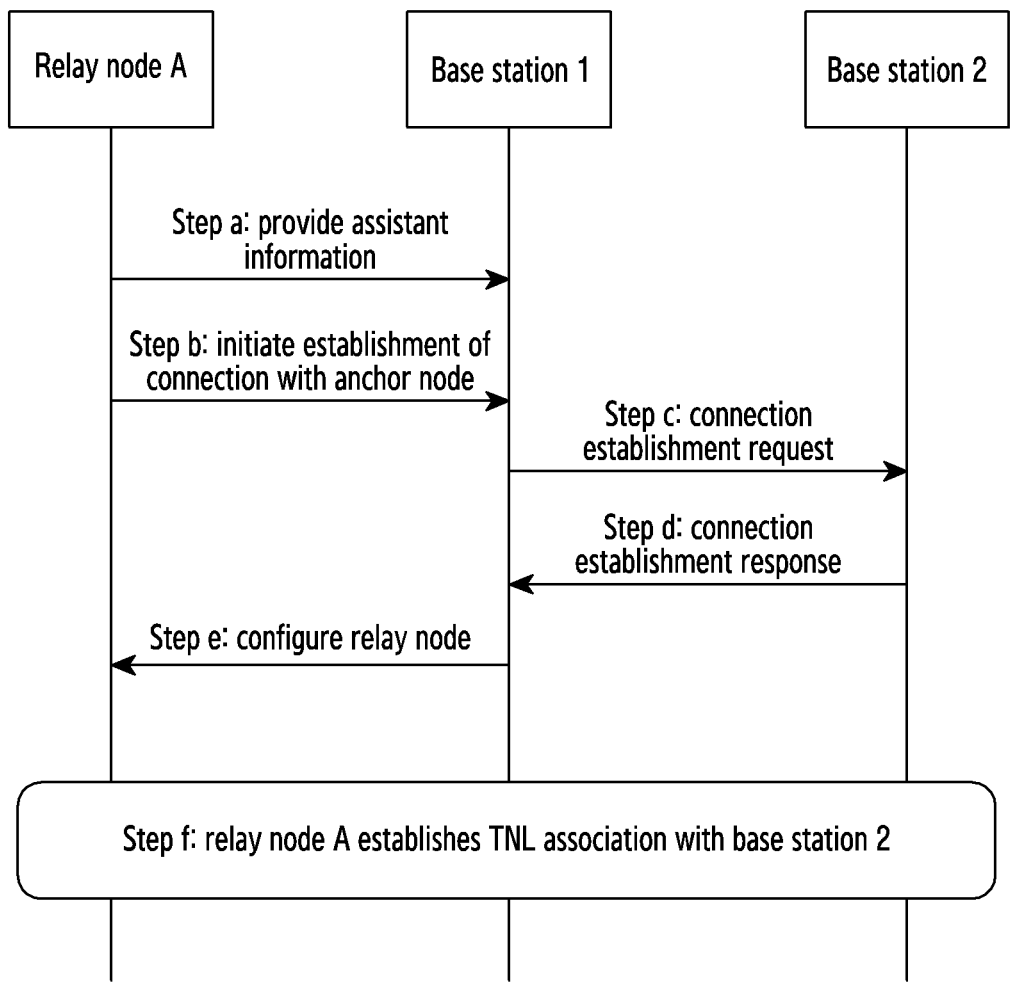
FIG. 15 is a flowchart illustrating an example of configuring a relay node to establish a connection with an anchor node according to an embodiment of the disclosure.

In an embodiment, the base station 1 selects a suitable base station 2 according to the assistant information provided by the relay node A, and interacts with the selected base station 2, thereby configuring the relay node A to establish a connection with the base station 2 (e.g., the anchor node), as shown, for example, in FIG. 15.

Step a: the relay node A provides the assistant information to the base station 1, which is referred to step 2-3-1 of the disclosure.

Step b: the relay node A transmits information for establishing a connection with the anchor node to the base station 1, which is referred to step 2-1-0 of the disclosure.

Step c: according to the assistant information received in steps a and/or b, the base station 1 can select a suitable base station, e.g., the base station 2, and the base station 1 transmits a connection establishment request to the base station 2, which is referred to step 2-1-1 of the disclosure.

Step d: the base station 2 transmits a connection establishment response to the base station 1, which is referred to step 2-1-2 of the disclosure.

Step e: the base station 1 configures a relay node, which is referred to step 2-1-3 of the disclosure.

Step f: the relay node A establishes a TNL association with the anchor node of the base station 2.

Figure 16:
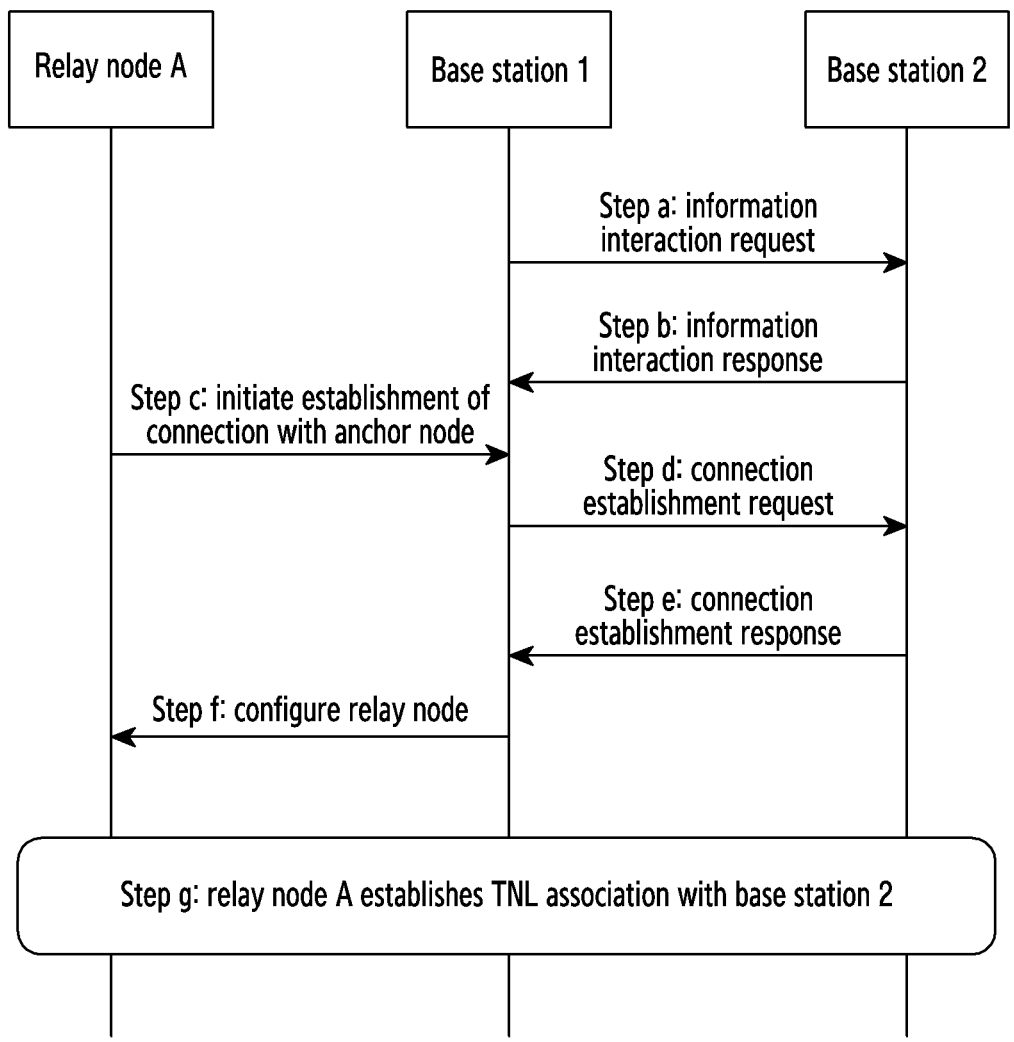
FIG. 16 is another flowchart illustrating an example of configuring a relay node to establish a connection with an anchor node according to an embodiment of the disclosure.

In another embodiment, the base station 1 and the base station 2 interact the information related to supporting of the access of the relay node, then the base station 1 selects the appropriate base station 2 based on the information and the information transmitted by the relay node, and interacts with the selected base station 2 to configure the relay node A to establish a connection with the anchor node of the base station 2, as shown, for example, in FIG. 16.

Step a: the base station 1 transmits an information interaction request message to the base station 2, which is referred to see step 2-2-1 of the disclosure.

Step b: the base station 2 transmits an information interaction response message to the base station 1, which is referred to step 2-2-2 of the disclosure.

Step c: the relay node A transmits information about the establishment of a connection with the anchor node to the base station 1, which is referred to step 2-1-0 of the disclosure.

Step d: according to the information received in steps a and/or b and/or c, the base station 1 can select a suitable base station, e.g., the base station 2, and the base station 1 transmits a connection establishment request to the base station 2, which is referred to step 2-1-1 of the disclosure.

Step e: the base station 2 transmits a connection establishment response to the base station 1, which is referred to step 2-1-2 of the disclosure.

Step f: the base station 1 configures a relay node, which is referred to steps 2-1-3 of the disclosure.

Step g: the relay node A establishes a TNL association with the anchor node of the base station 2.

Figure 17:
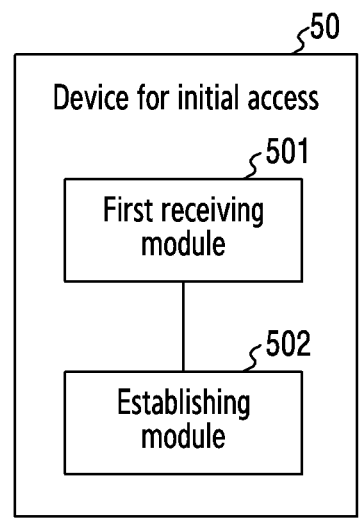
FIG. 17 is a block diagram illustrating an example device for initial access according to an embodiment of the disclosure.

An example embodiment of the disclosure further provides a device for initial access, which is applied to a relay node. A block diagram of the device is illustrated, for example, in FIG. 17, and the device 50 for initial access includes a first receiving module (e.g., including circuitry for receiving a configuration message) 501 and an establishing module (e.g., including circuitry for establishing a connection between the relay node and an anchor node) 502.

The first receiving module 501 may include various circuitry configured to receive a first configuration message.

The establishing module 502 may include various circuitry configured to establish a connection between the relay node and an anchor node, according to the first configuration message.

For example, the first configuration message may include, for example, and without limitation, at least one of the following:

first information indicating a cell that supports the access of a relay node (or a distributed unit of the relay node), second information indicating a cell that allows the access of a relay node (or a distributed unit of the relay node), address information of the anchor node side, and address information of the relay node side.

For example, the anchor node may be any one of the following types:

a base station, a base station including a central unit and a distributed unit, and a central unit of the base station.

The establishing module 502 may be configured to select a cell supporting the access of the relay node and establish a connection with the anchor node serving the cell, according to at least one of the first information of the cell that supports the access of the relay node (or the distributed unit of the relay node) and the second information indicating the cell that allows the access of the relay node (or the distributed unit of the relay node).

The establishing module 502 may be configured to establish a connection with the anchor node according to at least one of the address information of the anchor node side and address information of the relay node side.

For example, the address information of the anchor node side may include, for example, and without limitation, at least one of the following:

identification information of the anchor node, identification information of the cell served by the anchor node, IP address of the anchor node side, MAC address of the anchor node side, and the SCTP stream identifier information.

For example, the address information of the relay node side may include, for example, and without limitation, at least one of the following:

identification information of the accessed anchor node, identification information of the cell served by the accessed anchor node, IP address of the relay node side, MAC address of the relay node side, and SCTP stream identifier information.

Figure 18:
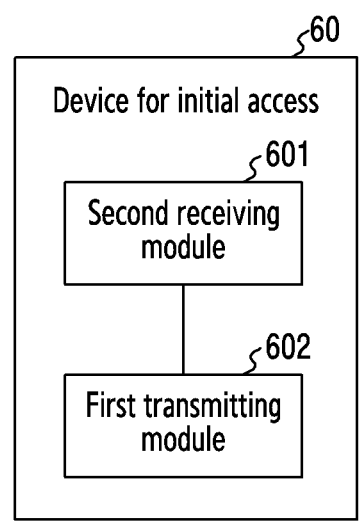
FIG. 18 is a block diagram illustrating another example device for initial access according to an embodiment of the disclosure.

An example embodiment of the disclosure further provides another device for initial access, which is applied to a first node. A block diagram of the device is as illustrated, for example, in FIG. 18, and the device 60 for initial access includes a second receiving module (e.g., including circuitry for receiving an indication message) 601 and a first transmitting module (e.g., including circuitry for transmitting a configuration message) 602.

The second receiving module 601 may include various circuitry configured to receive a first indication message, wherein the first indication message includes indication information indicating that the node for which the first indication message targets is a relay node.

The first transmitting module 602 may include various circuitry configured to transmit a first configuration message to the relay node according to the indication information, for accessing the anchor node by the relay node.

The first configuration message may include, for example, and without limitation, at least one of the following: first information indicating a cell that supports the access of a relay node or a distributed unit of the relay node, second information indicating a cell that allows the access of a relay node or a distributed unit of the relay node, address information of the anchor node side, and address information of the relay node side.

For example, the first node may be any of the following types:
an Operation Administration and Maintenance (OAM) system, a base station, a central unit of a base station, an anchor node, and a central unit of an anchor node.

For example, the indication information indicating that the node for which the first indication message targets is a relay node may include, for example, and without limitation, at least one of the following:
the indication information indicating that the node for which the first indication message targets is a node supporting relay function, and indication information indicating that the node for which the first indication message targets is an Integrated Access and Backhaul (IAB) node.

Figure 19:
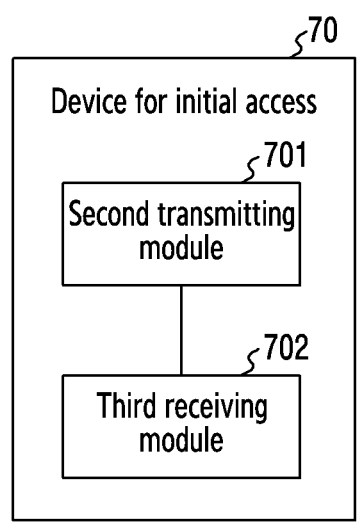
FIG. 19 is a block diagram illustrating an example further device for initial access according to an embodiment of the disclosure.

An example embodiment of the disclosure further provides a further device for initial access, which is applied to a first base station. A block diagram of the device is illustrated, for example, in FIG. 19, and the device 70 for initial access includes a second transmitting module (e.g., including circuitry for transmitting) 701 and a third receiving module (e.g., including receiving circuitry) 702.

The second transmitting module 701 may include various circuitry configured to transmit a first request message to a second base station, wherein the first request message includes configuration information for a relay node accessing the second base station.

The third receiving module 702 may include various circuitry configured to receive a first response message transmitted by the second base station, to establish a connection between the relay node and the second base station.

For example, the configuration information may include, for example, and without limitation, at least one of the following:
identification information of the relay node, indication information indicating the relay node, identification information of a cell that supports the access of the relay node or a distributed unit of the relay node, identification information of a cell that allows the access of a relay node or a distributed unit of the relay node, a request message for establishing a connection between the relay node or the distributed unit of the relay node and the anchor node or the central unit of the anchor node generated by the relay node, address information of the anchor node side, address information of the relay node side, address information of the anchor node side and/or address information of the relay node side which is used to establish a connection between the relay node and the anchor node, wherein the anchor node being the second base station.

For example, information carried in the first response message may include, for example, and without limitation, at least one of the following:
identification information of the relay node, a response message for establishing the connection between the anchor node or the central unit of the anchor node and the relay node or the distributed unit of the relay node, address information of the anchor node side, address information of the relay node side, address information of the anchor node side and/or address information of the relay node side which is used to establish a connection between the relay node and the anchor node, and cause information.

Figure 20:
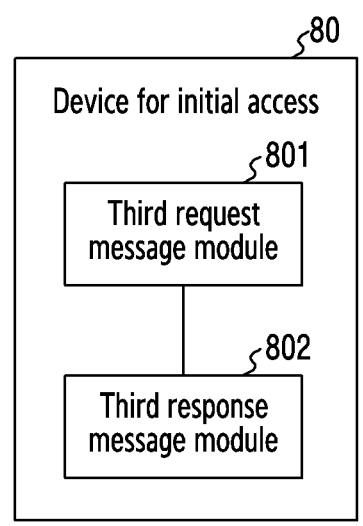
FIG. 20 is a block diagram illustrating an example further device for initial access according to an embodiment of the disclosure.
Figure 21:
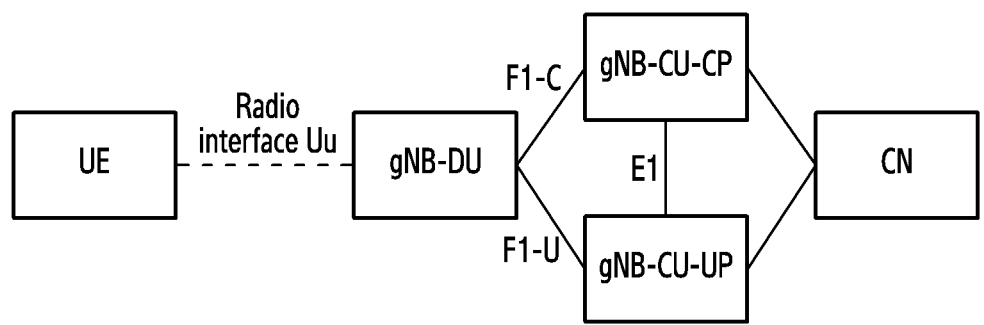
FIG. 21 is a diagram illustrating a system architecture of an existing communication system.

An example embodiment of the disclosure further provides a device for initial access, which is applied to the first base station. A block diagram of the device is illustrated, for example, in FIG. 20, and the device 80 for initial access includes a third request message module (e.g., including circuitry for transmitting a message) 801 and a third response message module (e.g., including receiving circuitry) 802.

a third request message module 801 may include various circuitry configured to transmit a third request message to a second base station, to indicate whether the first base station has the capability of allowing a relay node or a distributed unit of the relay node to access the network;

a third response message module 802 may include various circuitry configured to receive a third response message transmitted by the second base station, to indicate whether the second base station has the capability of allowing the relay node or the distributed unit of the relay node to access the network.

For example, the third request message may include, for example, and without limitation, the at least one of the following:
indication information indicating whether the first base station supports the access of the relay node or distributed unit of the relay node, address information of a first base station side used when the relay node establishes a connection with the first base station, address information of a relay node side used when the relay node establishes a connection with the first base station, indication information of whether a serving cell of the first base station supports the access of relay node or the distributed unit of the relay node, and indication information of whether a neighbor serving cell of the first base station supports the access of relay node or the distributed unit of the relay node.

For example, the third response message may include, for example, and without limitation, at least one of the following:
indication information indicating whether the second base station supports the access of distributed unit of the relay node or the relay node, address information of a second base station side used when the relay node establishes a connection with the second base station, address information of a relay node side used when the relay node establishes a connection with the second base station, indication information of whether a serving cell of the second base station supports the access of relay node or the distributed unit of the relay node, and indication information of whether a neighbor serving cell of the second base station supports the access of relay node or the distributed unit of the relay node.

The contents not detailed in the devices for initial access provided in the embodiments of this disclosure can be referred to the above-mentioned methods for initial access. The beneficial effects of the devices for initial access provided in the embodiments of this disclosure are consistent with these of the above-mentioned methods for initial access, which will not be repeated herein.

An example embodiment of the disclosure provides a relay apparatus, including: a processor; and a memory configured to store machine readable instructions that, when executed by the processor, cause the processor to perform the above-mentioned methods for initial access.

An example embodiment of the disclosure provides a first node apparatus, including: a processor; and a memory configured to store machine readable instructions that, when executed by the processor, cause the processor to perform the above-mentioned method for initial access.

It should be noted that the first node apparatus may, for example, and without limitation, include any one of the following types: an Operation Administration and Maintenance (OAM) system, a base station, a central unit of a base station, an anchor node, and a central unit of an anchor node.

An example embodiment of the disclosure provides a base station apparatus, including: a processor; and a memory configured to store machine readable instructions that, when executed by the processor, cause the processor to perform the above-mentioned method for initial access.

Example embodiments of the disclosure have at least one or more of the following beneficial effects:

1) the relay node is able to access a network that supports the access of the relay node.

2) the relay node is able to connect to an anchor node that supports the access of the relay node.

3) the distributed unit of the relay node is able to be connected to the central unit of the anchor node.

It should be understood that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the disclosure can be alternated, changed, combined or deleted. Further, other steps, measures and solutions in the operations, methods and flows already discussed in the disclosure can also be alternated, changed, rearranged, decomposed, combined or deleted. Further, the steps, measures and solutions of the prior art in the operations, methods and operations disclosed in the disclosure can also be alternated, changed, rearranged, decomposed, combined or deleted.

The mentioned-above descriptions are merely example implementations of the disclosure. It should be noted that, to a person of ordinary skill in the art, various improvements and modifications can be made without departing from the principle of the disclosure, and these improvements and modifications shall be regarded as falling into the protection scope of the disclosure.

In the description and the claims and the flowcharts of the figures of the present disclosure, a plurality of operations in a particular order are included, but it should be clearly understood that these operations may not follow the order in which they appear herein. The reference numbers of operations such as 2701, 2702, 2703, etc., are simply used to distinguish different operations, and the serial numbers themselves do not represent any execution order. Additionally, these operations may include more or fewer operations, and these operations may be performed sequentially or in parallel. It should be noted that the references to "first" and "second" herein are used to distinguish different messages, devices, modules, etc., and neither represent the specific order, nor different types.

The technical features illustrated in the example embodiments of the present disclosure are described in the following with reference to the accompanying drawings in the embodiments of the present disclosure. It will be apparent that the described embodiments are only a part of the embodiments of the present disclosure, and not all of the embodiments. All other embodiments obtained by those skilled in the art based on the embodiments of the present disclosure without creative efforts are within the scope of the present disclosure.

In the following description, a 5G communication system will be described as an example of a communication system, but those skilled in the art will understand that the technical features of the present disclosure are not limited to a 5G communication system, and can be applied to any suitable communication system.

A node (referred to herein as a "first node") in a communication system, such as a Control Plane-Center Scheduling (CP-CS) node, is created, which may centrally schedule radio resources of connected DU nodes (referred to herein as "second nodes", e.g., gNB-DUs), in addition to having all functions of a gNB-CU-CP node. The first node may generate scheduling information according to received information, and the received information may be from, but not limited to, different UEs, different CU-UP nodes (referred to herein as "third nodes", e.g., gNB-CU-UPs), different DU nodes and CNs.

If the first node needs to establish a wireless connection with other nodes, the first node further needs to support the wireless connection capability. At this time, the first node may have a complete wireless protocol stack, including but not limited to a Radio Resource Control (RRC) protocol layer, a Packet Data Convergence Protocol (PDCP) protocol layer, a Radio Link Control (RLC) protocol layer, a MAC protocol layer, and a Physical (PHY) protocol layer.

If the second node needs to establish a wireless connection with other nodes, the second node further needs to support the function of a wireless terminal, and the wireless protocol stack of the wireless terminal may be an incomplete wireless protocol stack, including but not limited to a MAC protocol layer and a PHY protocol layer, and may also be a complete wireless protocol stack, including but not limited to a RRC protocol layer, a PDCP protocol layer, a RLC protocol layer, a MAC protocol layer, and a PHY protocol layer.

Figure 22:
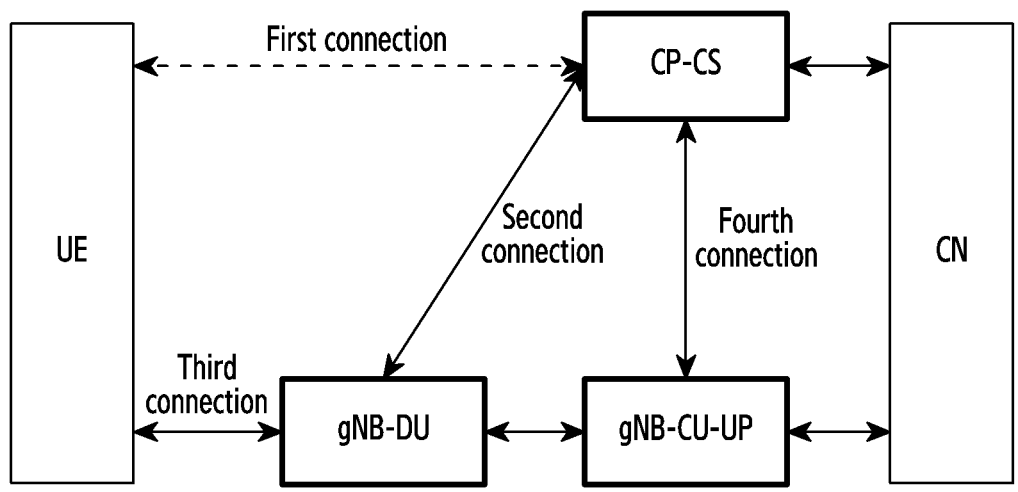
FIG. 22 is a diagram illustrating an example system architecture of a communication system according to an embodiment of the disclosure.

FIG. 22 is a block diagram illustrating an example system architecture of a communication system according to an embodiment of the disclosure. In the system architecture illustrated in FIG. 22, a CP-CS node which is an example of a first node may be connected to a UE, which connection may be referred to herein as a "first connection." In another embodiment, there may be or may not be the first connection, and thus the first connection is shown in dashed lines; the CP-CS node is connected to a gNB-DU node which is an example of a second node, which connection is referred to herein as a "second connection"; the gNB-DU node is connected to a UE, which connection is referred to herein as a "third connection"; a gNB-CU-UP node which is an example of a third node is connected to the CP-CS node, which connection is referred to herein as a "fourth connection." It should be noted that although FIG. 22 shows only one UE, one gNB-DU node, and one gNB-CU-UP node, this is merely illustrative and not limiting. In an actual system architecture, one CP-CS may be connected to multiple UEs, multiple gNB-DU nodes, and multiple gNB-CU-UP nodes.

A scheduling method performed at a first node (e.g., CP-CS node) side according to an example embodiment of the present disclosure will be described in greater detail below with reference to FIG. 23.

Figure 23:
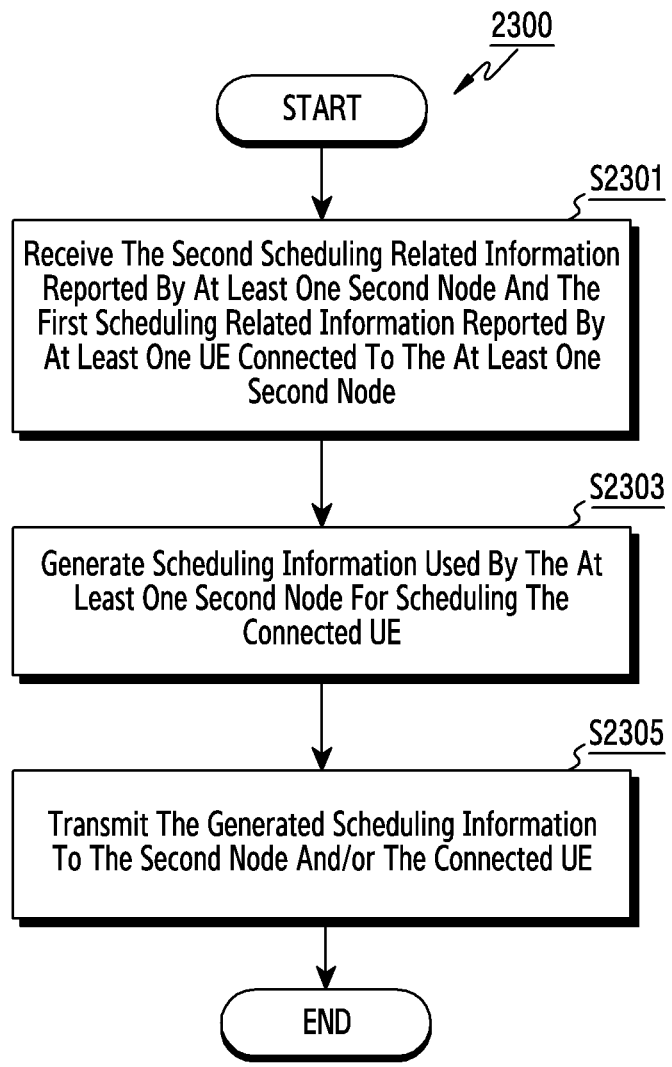
FIG. 23 is a flowchart illustrating an example of a scheduling method performed at a central scheduling node according to an embodiment of the disclosure.

FIG. 23 is a flowchart illustrating an example scheduling method 2300 performed at a first node side according to an embodiment of the disclosure.

As shown in FIG. 23, the method 2300 includes steps S2301, S2303, and S2305.

In step S2301, the first node receives the second scheduling related information reported by at least one second node (for example, the gNB-DU) and the first scheduling related information reported by at least one UE connected to the at least one second node.

In an example embodiment, the first scheduling related information reported by the UE may include, for example, and without limitation, at least one of:

an ACK/NACK for downlink data transmitted to the UE from the second node connected to the UE;

channel quality related information (e.g., channel quality indication information (CQI)) for a downlink from the second node connected to the UE to the UE;

an uplink BSR indicating a buffer status of uplink data which is to be transmitted by the UE at the UE side.

In an example embodiment, the second scheduling related information reported by the second node may include, for example, and without limitation, at least one of:

an ACK/NACK for uplink data transmitted to the second node from the UE connected to the second node;

channel quality related information (e.g., CQI) for an uplink from the UE connected to the second node to the second node;

a downlink BSR indicating a buffer status of downlink data which is to be transmitted from the second node to the connected UE at the second node side.

In step S2303, the first node generates scheduling information used by one of the at least one second node for scheduling the connected UE.

In an example embodiment, the scheduling information may be generated according to at least the first scheduling related information reported by the at least one UE and the second scheduling related information reported by the at least one second node.

The scheduling information may include, for example, and without limitation, at least one of:

a time-frequency resource location where the second node and/or the UE connected to the second node receives or transmits data;

a time-frequency resource range in which the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data; indication information of a receiving antenna of the second node and/or the UE connected to the second node;

indication information of a transmitting antenna of the second node and/or the UE connected to the second node.

In another example embodiment, the first node may further receive third scheduling related information reported by at least one third node (for example, gNB-CU-UP) in step S2301. In an example embodiment, the first node may generate scheduling information used by the second node for scheduling the connected UE according to at least the first scheduling related information, the second scheduling related information and the third scheduling related information.

In still another embodiment, the first node may also receive information from other network nodes in step S2301. In an example embodiment, the first node may generate scheduling information used by the second node for scheduling the connected UE according to at least the first scheduling related information, the second scheduling related information, the third scheduling related information, and information from other network nodes.

In step S2305, the first node transmits the generated scheduling information to the second node and/or the connected UE.

In an example embodiment, step S2301 may include: receiving, by the first node, the first scheduling related information reported by the UE via a first connection, and receiving the second scheduling related information reported by the second node via a second connection with the second node. Thus, step S2305 may include: transmitting, by the first node, the generated scheduling information to the UE and the second node via the first connection and the second connection, respectively.

In another example embodiment, step S2301 may include: receiving the first scheduling related information from at least one UE connected to at least one second node forwarded from the at least one second node. Thus, step S2305 may include: transmitting, by the first node, the generated scheduling information to the second node via a second connection with the second node. Accordingly, the second node may forward the received scheduling information to the connected UE, or the second node may generate scheduling information for the UE connected to the second node according to the received scheduling information, and transmit the generated scheduling information to the UE connected to the second node.

In the above example embodiments, the scheduling information may include, for example, and without limitation, at least one of:

a time-frequency resource location where the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data; indication information of a receiving antenna of the second node and/or the UE connected to the second node;

indication information of a transmitting antenna of the second node and/or the UE connected to the second node.

In this case, the method 2300 may further include: generating configuration information related to a third node (referred to herein as "second configuration information") according to received third scheduling related information, and transmitting the second configuration information to the third node.

The third scheduling related information reported by the third node may include, for example, and without limitation, at least one of:

data amount information on data of a UE buffered at the third node; information on a user bearer to which the data of the UE buffered at the third node belongs;

information on a user to which the data of the UE buffered at the third node belongs.

In an example embodiment, the second configuration information may include, for example, and without limitation, at least one of:

identification information of a target second node to receive data transmitted by the third node;

address information of a target second node to receive data transmitted by the third node;

identification information of a UE to which the data transmitted by the third node belongs;

identification information of a bearer of a UE to which the data transmitted by the third node belongs;

indication information of an amount of data transmitted by the third node.

In still another example embodiment, step S2301 may include: receiving, by the first node from at least one UE connected to at least one second node, the first scheduling related information which is forwarded from the at least one second node. In the exemplary embodiment, the scheduling information generated in step S2303 may include, for example, and without limitation, at least one of:

a time-frequency resource range in which the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data;

indication information of a receiving antenna of the second node and/or the UE connected to the second node;

indication information of a transmitting antenna of the second node and/or the UE connected to the second node.

Step S2305 may include: transmitting, by the first node, the generated scheduling information to the second node via a second connection with the second node.

If the scheduling information includes the time-frequency resource range in which the data is received or transmitted, the second node may determine the scheduling information for scheduling the UE connected to the second node from the time-frequency resource range, and transmit the determined scheduling information to the UE.

The first connection may be a wireless connection. The second connection may be a wired connection, or a wireless connection, or a part of data of the second connection is transmitted by using a wired connection and a part of the data of the second connection is transmitted by using a wireless connection. The third connection between the second node and the UE may be a wireless connection. The fourth connection between the first node and the third node may be a wired connection.

In an example embodiment, the second connection using at least one of a wired connection and a wireless connection may use an F1-C interface protocol (see, e.g., TS 38.473), and also may use any other suitable interface protocol. The present disclosure is not intended to limit this.

In an example embodiment, the first, second and third connections that are wireless connections may use the same frequency bands, or may use different frequency bands, and may use an existing Uu interface protocol, or may use any other suitable interface protocols. The present disclosure is not intended to limit this.

In an example embodiment, prior to step S2301, the method 2300 may further include the following steps:

establishing, by the first node, a second connection with the second node; as described above, the second connection may be a wired connection or a wireless connection; and transmitting, by the first node, configuration information related to the second node (referred to herein as "first configuration information") to the second node.

The first configuration information may include at least one of:

configuration information of a second node group,
configuration information of the cell group,
configuration information of a reference signal, and
configuration information of a wireless connection between the first node and the second node.

The configuration information of the second node group may include at least one of:

identification information of the second node itself,
identification information of the second node group to which the second node belongs,
identification information of the UE served by the second node,
first indication information indicating that the second node joins a second node group, wherein the first indication information further indicates identification information of the second node group that the second node joins,
second indication information indicating that the second node leaves a second node group, wherein the second indication information further indicates identification information of the second node group that the second node leaves, first identification information of a group to which a cell of the second node belongs, wherein the first identification information further includes identification information of the cell, second identification information of a user served by a cell of the second node, wherein the second identification information further includes identification information of the cell.

The configuration information of the cell group may include at least one of:

identification information of the cell group, identification information of the user served by the cell group, identification information of a cell added to the cell group, identification information of a cell removed from the cell group.

The configuration information of the reference signal may include at least one of:

an indication of a time-frequency resource location where the second node transmits the reference signal, an indication of a precoding mechanism used by the second node to transmit the reference signal, an indication of an antenna used by the second node to transmit a reference signal.

In the case that the second connection is a wireless connection, in addition to at least one of those listed above, the configuration information related to the second node may include:

configuration information of the wireless connection between the first node and the second node, which may include at least one of:

configuration information of a downlink synchronization signal, configuration information of an uplink synchronization signal, system information for access, configuration information of the physical layer, configuration information of the MAC layer.

A scheduling method performed at a second node (e.g., gNB-DU node) side according to an example embodiment of the present disclosure will be described in greater detail below with reference to FIG. 24.

Figure 24:
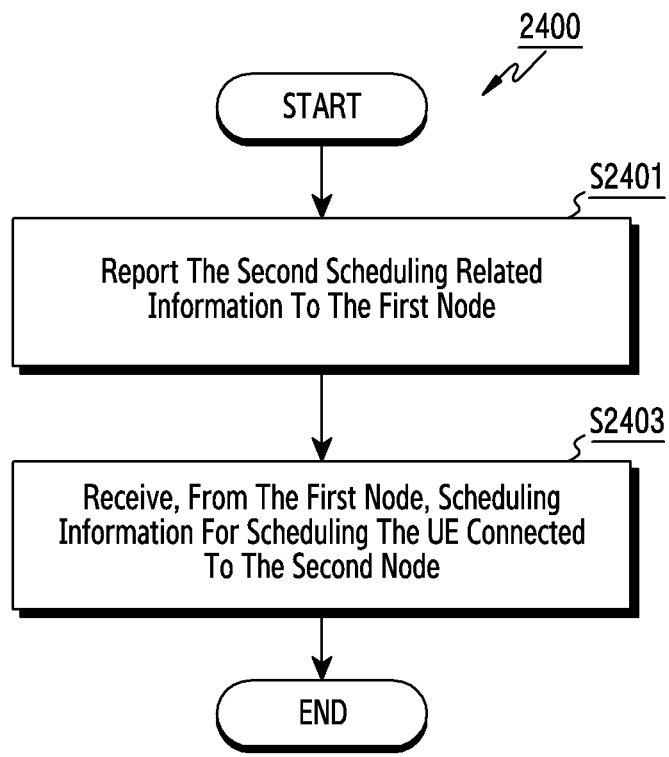
FIG. 24 is a flowchart illustrating an example of a scheduling method performed at a DU node according to an embodiment of the disclosure.

FIG. 24 is a flowchart illustrating an example scheduling method 2400 performed at a second node side in accordance with an example embodiment of the present disclosure.

As shown in FIG. 24, method 2400 includes steps S2401 and S2403.

In step S2401, the second node reports the second scheduling related information to the first node.

In an example embodiment, the second scheduling related information reported by the second node may include, for example, and without limitation, at least one of:

an ACK/NACK for uplink data transmitted from the UE connected to the second node to the second node;

channel quality related information (e.g., CQI) for the uplink from the UE connected to the second node to the second node;

a downlink BSR indicating a buffer status of downlink data which is to be transmitted from the second node to the connected UE at the second node side.

In step S2403, the second node receives, from the first node, scheduling information for scheduling the UE connected to the second node.

The scheduling information includes at least one of:

a time-frequency resource location where the second node and/or the UE connected to the second node receives or transmits data;

a time-frequency resource range in which the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data; indication information of a receiving antenna of the second node and/or the UE connected to the second node;

indication information of a transmitting antenna of the second node and/or the UE connected to the second node.

In an example embodiment, the method 2400 further includes: receiving the first scheduling related information reported by the connected UE, and transmitting the first scheduling related information to the first node via a second connection between the first node and the second node. After step S2403, the method 2400 further includes: transmitting, by the second node, scheduling information received from the first node to the UE, or transmitting scheduling information generated according to the scheduling information received from the first node.

In this example embodiment, the scheduling information may include, for example, and without limitation, at least one of:

a time-frequency resource location where the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data; indication information of a receiving antenna of the second node and/or the UE connected to the second node;

indication information of a transmitting antenna of the second node and/or the UE connected to the second node.

In this case, the method 2400 may further include: receiving, from a third node, data that is transmitted by the third node according to the second configuration information, wherein the second configuration information may include, for example, and without limitation, at least one of:

identification information of a target second node to receive data transmitted by the third node;

address information of a target second node to receive data transmitted by the third node;

identification information of a UE to which the data transmitted by the third node belongs;

identification information of a bearer of a UE to which the data transmitted by the third node belongs;

indication information of an amount of data transmitted by the third node.

In another example embodiment, in the case where the first connection between the UE and the first node has not been established, and the scheduling information includes the time-frequency resource range in which the data is received or transmitted, the method 2400 further includes: determining, by the second node, the scheduling information used by the second node for scheduling the connected UE from the time-frequency resource range; and transmitting the determined scheduling information to the UE.

In an example embodiment, before step S2401, the method 2400 may further include:

establishing, by the second node, a second connection with the first node, wherein the second connection may be a wired connection or a wireless connection as described above; and receiving, by the second node, the first configuration information related to the second node from the first node.

The first configuration information may include, for example, and without limitation, at least one of:

configuration information of a second node group,
configuration information of the cell group,
configuration information of a reference signal, and
configuration information of a wireless connection between the first node and the second node.

The configuration information of the second node group may include, for example, and without limitation, at least one of:

identification information of the second node itself,
identification information of the second node group to which the second node belongs,
identification information of the UE served by the second node,
first indication information indicating that the second node joins a second node group, wherein the first indication information further indicates identification information of the second node group that the second node joins,
second indication information indicating that the second node leaves a second node group, wherein the second indication information further indicates identification information of the second node group that the second node leaves,
first identification information of a group to which a cell of the second node belongs, wherein the first identification information further includes identification information of the cell,
second identification information of a user served by the cell of the second node, wherein the second identification information further includes identification information of the cell.

The configuration information of the cell group may include, for example, and without limitation, at least one of:

identification information of the cell group,
identification information of the user served by the cell group,
identification information of a cell added to the cell group,
identification information of a cell removed from the cell group.

the configuration information of the reference signal may include at least one of:

an indication of a time-frequency resource location where the second node transmits the reference signal,
an indication of a precoding mechanism used by the second node to transmit the reference signal,
an indication of an antenna used by the second node to transmit a reference signal.

In the case that the second connection is a wireless connection, in addition to at least one of those listed above, the configuration information related to the second node may include, for example, and without limitation:

configuration information of the wireless connection between the first node and the second node, which may include, for example, and without limitation, at least one of:

configuration information of a downlink synchronization signal,
configuration information of an uplink synchronization signal,
system information for access,
configuration information of the physical layer,
configuration information of the MAC layer.

A scheduling method performed at a third node (e.g., gNB-CU-UP node) side according to an example embodiment of the present disclosure will be described in greater detail below with reference to FIG. 25.

Figure 25:
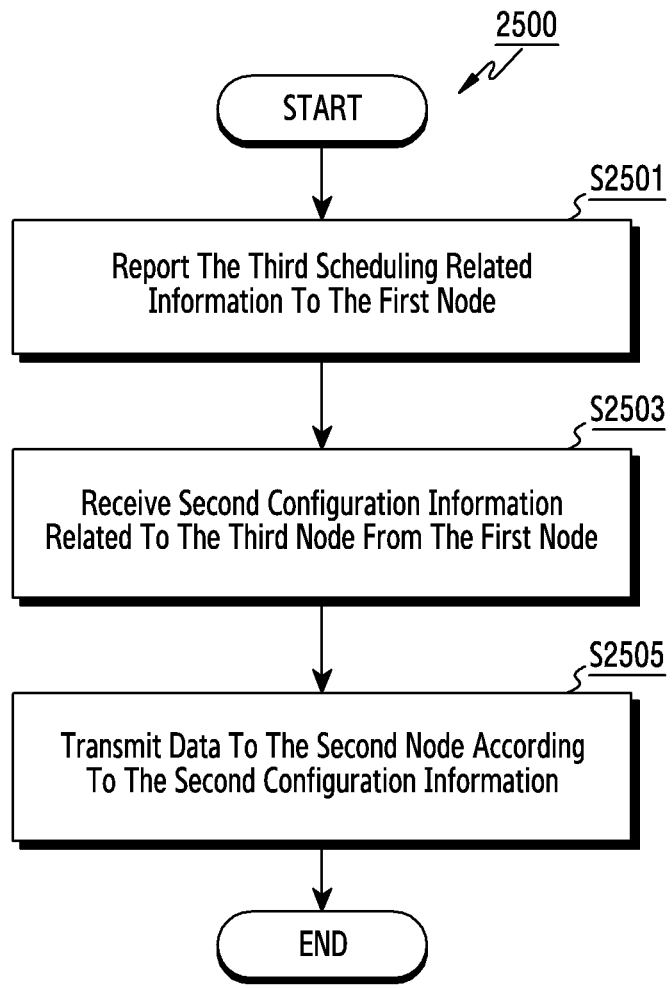
FIG. 25 is a flowchart illustrating an example of a scheduling method performed at a CU-UP node according to an embodiment of the disclosure.

FIG. 25 is a flowchart illustrating an example scheduling method 2500 performed at a third node side in accordance with an example embodiment of the present disclosure.

As shown in FIG. 25, method 2500 includes steps S2501, S2503 and S2505.

In step S2501, the third node reports the third scheduling related information to the first node.

In an example embodiment, the third scheduling related information may include, for example, and without limitation, at least one of:

data amount information on data of a UE buffered at the third node;
information on a user bearer to which the data of the UE buffered at the third node belongs;
information on a user to which the data of the UE buffered at the third node belongs.

As described above, in an example embodiment, the third scheduling related information may be used by the first node for generating the scheduling information.

In step S2503, the third node receives second configuration information related to the third node from the first node.

In an example embodiment, the second configuration information may include, for example, and without limitation, at least one of:

identification information of a target second node to receive data transmitted by the third node;
address information of a target second node to receive data transmitted by the third node;
identification information of a UE to which the data transmitted by the third node belongs;
identification information of a bearer of a UE to which the data transmitted by the third node belongs;
indication information of the amount of data transmitted by the third node.

In step S2503, the third node transmits data to the second node according to the second configuration information.

A scheduling method performed at the UE side according to an example embodiment of the present disclosure will be described in greater detail below with reference to FIG. 26.

Figure 26:
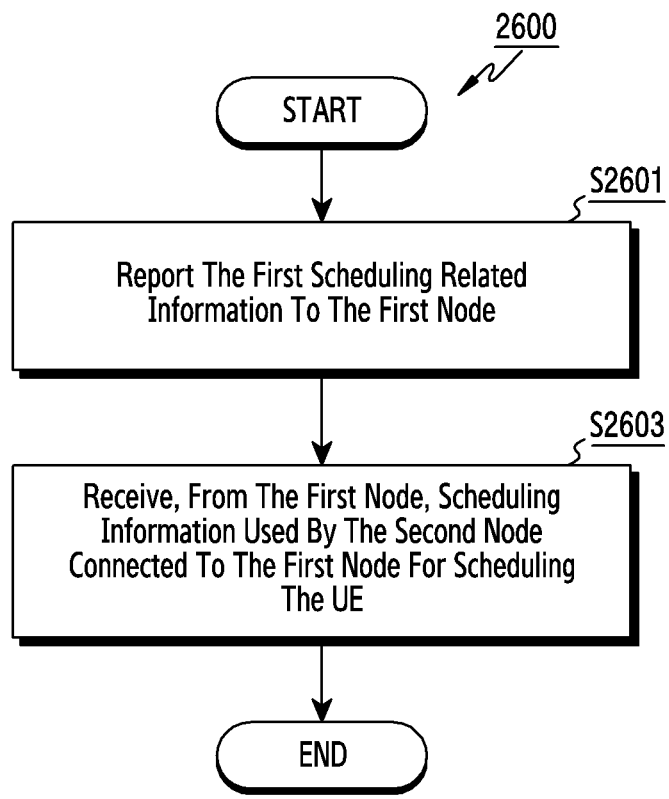
FIG. 26 is a flowchart illustrating an example of a scheduling method performed at a UE according to an embodiment of the disclosure.

FIG. 26 is a flowchart illustrating an example scheduling method 2600 performed at a UE side in accordance with an example embodiment of the present disclosure.

As shown in FIG. 26, method 2600 includes steps S2601 and S2603.

In step S2601, the UE reports the first scheduling related information to the first node.

In an example embodiment, the first scheduling related information reported by the UE may include, for example, and without limitation, at least one of:

an ACK/NACK for downlink data transmitted to the UE from the second node connected to the UE;

channel quality related information (e.g., CQI) for a downlink from the second node connected to the UE to the UE;

an uplink BSR indicating a buffer status of uplink data which is to be transmitted by the UE at the UE side.

In step S2603, the UE receives, from the first node, scheduling information used by the second node connected to the first node for scheduling the UE.

As described above, the scheduling information may be generated according to at least the first scheduling related information reported by the at least one UE and the second scheduling related information reported by the at least one second node.

The scheduling information may include, for example, and without limitation, at least one of:

a time-frequency resource location where the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data; indication information of a receiving antenna of the second node and/or the UE connected to the second node;

indication information of a transmitting antenna of the second node and/or the UE connected to the second node.

In an example embodiment, step S2601 includes: reporting, by the UE, the first scheduling related information to the first node via the first connection; and step S2603 includes: receiving, by the UE from the first node, scheduling information used by the second node connected to the first node for scheduling the UE.

In an example embodiment, step S2601 includes: transmitting, by the UE, the first scheduling related information to the second node, so that the second node transmits the first scheduling related information to the first node via the second connection between the second node and the first node; and step S2603 includes: receiving, from the second node, the scheduling information transmitted by the first node.

In the above example embodiment, the scheduling information may include, for example, and without limitation, at least one of:

a time-frequency resource location where the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data; indication information of a receiving antenna of the second node and/or the UE connected to the second node;

indication information of a transmitting antenna of the second node and/or the UE connected to the second node.

In another example embodiment, in the case where the scheduling information includes the time-frequency resource range in which the second node and/or the UE connected to the second node receives or transmits data, the method 2600 further includes: receiving, from the second node, scheduling information that is determined by the second node, for scheduling the UE connected to the second node, from the time-frequency resource range.

The technical features according to an example embodiment of the present disclosure has been described above from the perspective of respective nodes and UEs, respectively. In order to make the technical features according to an example embodiment of the present disclosure more understandable, a scheduling method according to an example embodiment of the present disclosure will be described in greater detail below with reference to FIG. 27 to FIG. 30 with further reference to the signaling interaction among respective nodes and UEs.

Figure 27:
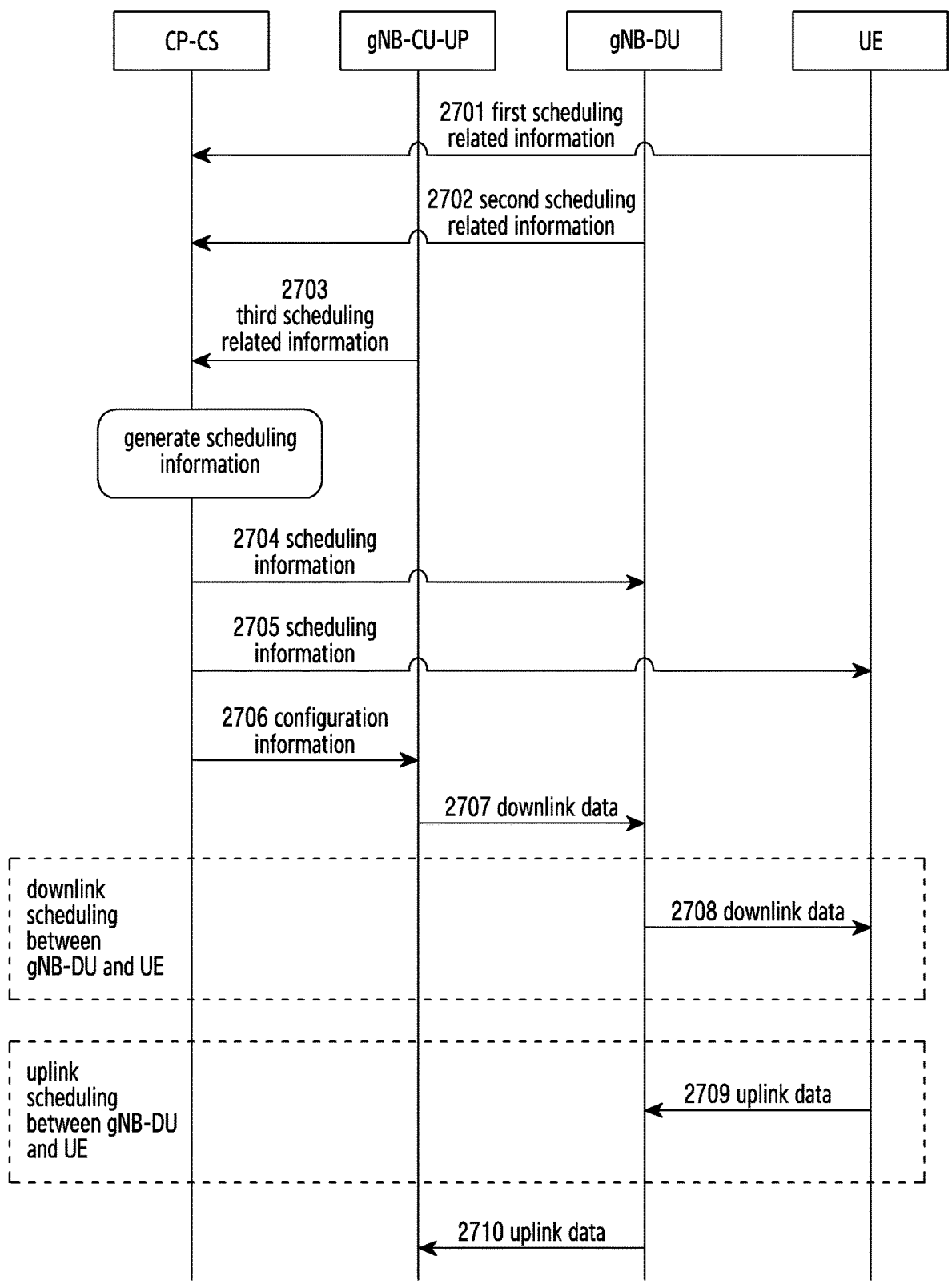
FIG. 27 is a signal flow diagram illustrating an example of scheduling in a communication system according to an embodiment of the disclosure.

FIG. 27 is a a signal flow diagram illustrating example scheduling in a communication system according to an example embodiment of the present disclosure, wherein a CP-CS node which is an example of a first node generates scheduling information according to scheduling related information reported by respective nodes and UEs, and transmitted to the UE and a gNB-DU node which is an example of a second node, and the UE and the gNB-DU node may transmit and receive data according to the scheduling information.

In this example, the first connection between the UE and the CP-CS node is a wireless connection, a part of the second connection between the CP-CS node and the gNB-DU node is a wireless connection and a part thereof is a wired connection, and the third connection between the UE and the gNB-DU is a wireless connection. It should be understood that the above-described connections are merely illustrative and not limiting.

In this example, RRC signaling is transmitted between the UE and the CP-CS node. When the signaling is on a downlink, it may be transmitted via the wireless first connection, or may be transmitted from the CP-CS node to the gNB-DU node via the wireless or wired second connection, and forwarded by the gNB-DU node to the UE via the wireless third connection. The transmission path of an uplink signaling is opposite to that of the downlink signaling.

As shown in FIG. 27, in process 2702, the gNB-DU node may report the second scheduling related information to the CP-CS node via the wireless second connection. Reference may be made to the corresponding description in the foregoing methods 2300 and 2400 for details.

In process 2701, the UE reports the first scheduling related information to the CP-CS node via the wireless first connection. Reference may be made to the corresponding description made with relation to the foregoing methods 2300 and 2600 for details.

In process 2703, the gNB-CU-UP node transmits the third scheduling related information to the CP-CS node. Reference may be made to the corresponding description made with relation to the foregoing methods 2300 and 2500 for details.

It should be noted that the processes 2701, 2702 and 2703 may be performed in any order or may be performed simultaneously.

As described above, the CP-CS node may generate scheduling information based on information from different UEs, different gNB-DU nodes, different gNB-CU-UP nodes, and other network nodes.

In process 2704, the CP-CS node may transmit the scheduling information to the gNB-DU node via the wireless second connection. Reference may be made to the corresponding description made with relation to the foregoing methods 2300, 2400, and 2600 for details.

In process 2705, the CP-CS node may transmit the scheduling information to the UE via the wireless first connection. Reference may be made to the corresponding description made with relation to the foregoing methods 2300 and 2600 for details.

In process 2706, the CP-CS node may transmit the second configuration information related to the gNB-CU-UP node to the gNB-CU-UP node. Reference may be made to the corresponding description made with relation to the foregoing methods 2300, 2400 and 2500 for details. The gNB-CU-UP node may or may not transmit feedback on the configuration information.

It should be noted that the processes 2704, 2705, 2706 and 2707 may be performed in any order or may be performed simultaneously.

In process 2707, the gNB-CU-UP node may transmit downlink data to the gNB-DU node according to the configuration of the CP-CS node.

When the scheduling information is downlink scheduling information:

In process 2708, the gNB-DU node may schedule the radio resource between the gNB-DU node and the UE to transmit downlink data according to the scheduling information, and the UE may receive data from the gNB-DU node according to the scheduling information.

When the scheduling information is uplink scheduling information:

In process 2709, the UE may use the radio resource between the gNB-DU node and the UE to transmit uplink data according to the scheduling information, and the gNB-DU node receives data from the UE according to the scheduling information.

In process 2710, the gNB-DU node may forward the uplink data to the gNB-CU-UP node.

Figure 28:
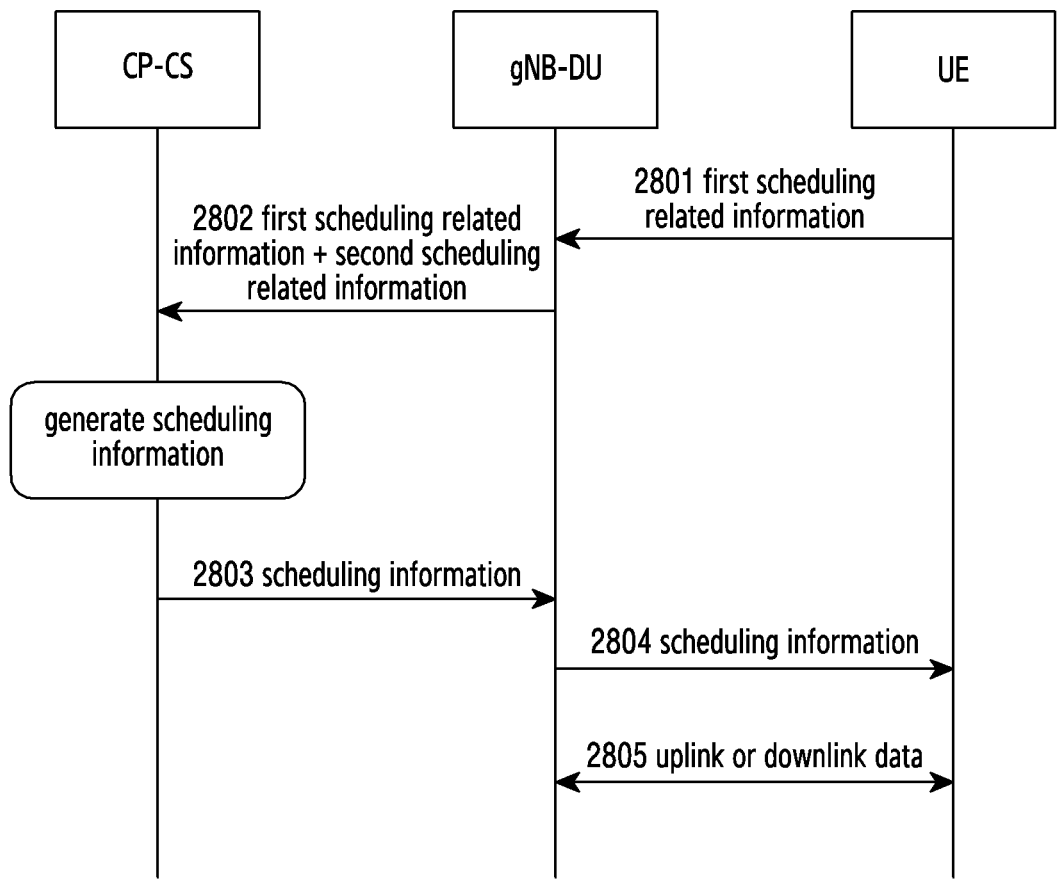
FIG. 28 is a signal flow diagram illustrating an example of scheduling in a communication system according to another embodiment of the disclosure.

FIG. 28 is a signal flow diagram illustrating example scheduling in a communication system according to another example embodiment of the present disclosure, wherein a CP-CS node which is an example of a first node generates scheduling information according to scheduling related information reported by respective nodes and UEs, and transmits it to the UE and a gNB-DU node which is as an example of a second node. The gNB-DU node transmits the scheduling information to the UE, or the gNB-DU node generates scheduling information for the UE according to the scheduling information received from the CP-CS node and transmits it to the UE. The UE and the gNB-DU node transmit and receive data according to the scheduling information.

In this example, no connection is established between the UE and the CP-CS node, and the second connection between the CP-CS node and the gNB-DU node may be a wired connection or a wireless connection, or both, and the third connection between the UE and the gNB-DU node is a wireless connection. This example implements a centralized scheduling method according to an exemplary embodiment of the present disclosure by an improvement on signaling transmitted on an existing connection mode.

As shown in FIG. 28, in process 2801, the UE may report the first scheduling related information to the gNB-DU node via the wireless third connection. Reference may be made to the corresponding description made with reference to the foregoing methods 2300, 2400, and 2600 for details.

In process 2802, the gNB-DU node reports the second scheduling related information to the CP-CS node via the wired connection, and forwards the first scheduling related information. Reference may be made to the corresponding description made with reference to the foregoing methods 2300, 2400, and 2600 for details.

The CP-CS node may generate the scheduling information based on information from different UEs, different gNB-DU nodes, and other network nodes.

In process 2803, the CP-CS node may transmit the scheduling information to the gNB-DU node. Reference may be made to the corresponding description made with reference to the foregoing methods 2300 and 2400 for details.

In process 2804, after receiving the configuration information, the gNB-DU node may decide how to schedule the data of the UE within the resource range. The gNB-DU indicates scheduling information to the UE via the wireless third connection. The scheduling information may be the same as the scheduling information transmitted from the CP-CS to the gNB-DU, or may be different. Reference may be made to the corresponding description made with reference to the foregoing methods 2300, 2400, and 2600 for details.

In process 2805, the gNB-DU node may transmit or receive data according to scheduling information transmitted from the gNB-DU node to the UE, and the UE may receive or transmit data according to scheduling information transmitted from the gNB-DU node to the UE.

Figure 29:
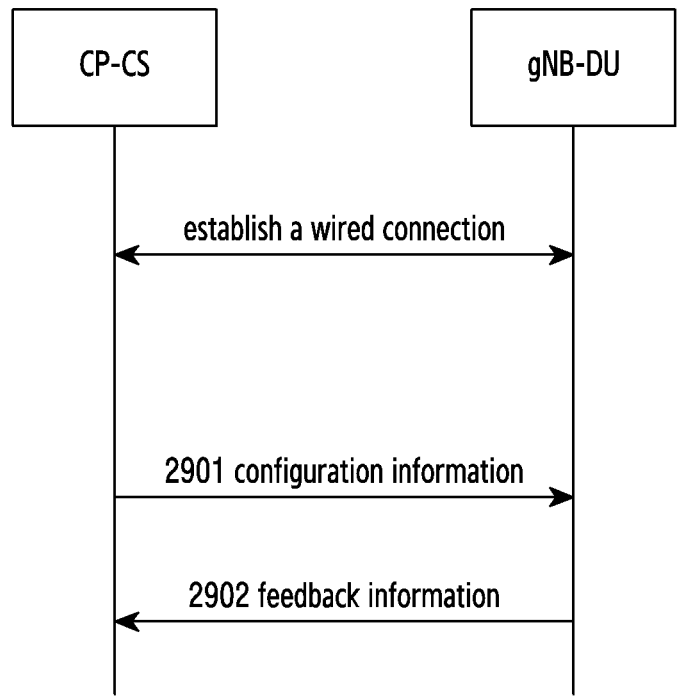
FIG. 29 is a signal flow diagram illustrating an example of configuring a DU node in a communication system according to an embodiment of the disclosure.

FIG. 29 is a signal flow diagram illustrating an example of configuring a DU node in a communication system according to an example embodiment of the present disclosure, in which a CP-CS node may transmit configuration information to a gNB-DU node via a wired second connection, and the gNB-DU node may transmit feedback information to the CP-CS node via the wired second connection.

As shown in FIG. 29, a wired connection needs to be established in advance between the CP-CS and the gNB-DU.

In process 2901, the CP-CS node transmits the configuration information to the gNB-DU node via the wired connection. Reference may be made to the corresponding description made with reference to the foregoing methods 2300 and 2400 for details.

In process 2902, the gNB-DU node transmits feedback information to the CP-CS node via the wired connection.

Figure 30:
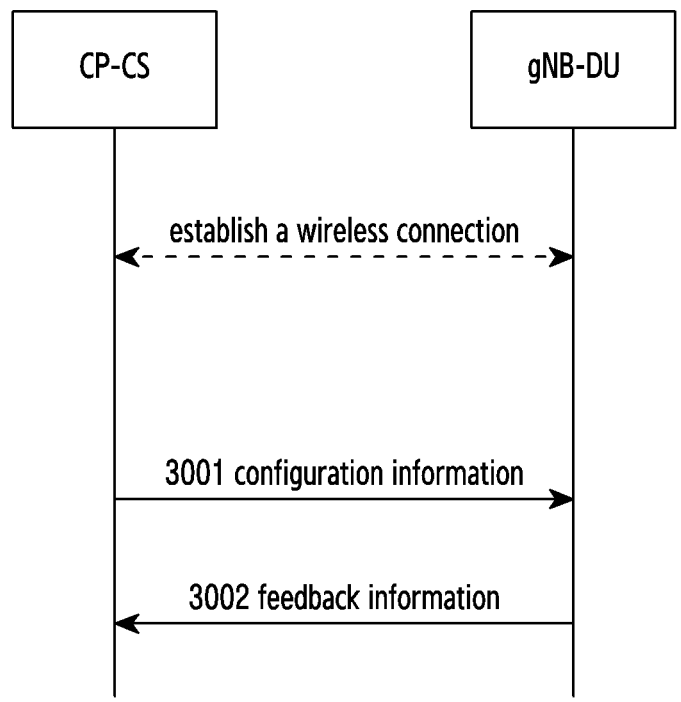
FIG. 30 is a signal flow diagram illustrating an example of configuring a DU node in a communication system according to another embodiment of the disclosure.

FIG. 30 is a signal flow diagram illustrating an example of configuring a DU node in a communication system according to an example embodiment of the present disclosure, in which a CP-CS node may transmit configuration information to a gNB-DU node via a wireless second connection, and the gNB-DU node may transmit feedback information to the CP-CS node via the wireless second connection.

As shown in FIG. 30, a wireless connection needs to be established in advance between the CP-CS and the gNB-DU.

In process 3001, the CP-CS node transmits the configuration information to the gNB-DU node via the wireless connection. Reference may be made to the corresponding description made with reference to the foregoing methods 2300 and 2400 for details.

In process 3002, the gNB-DU node transmits feedback information to the CP-CS node via the wireless connection.

Figure 31:
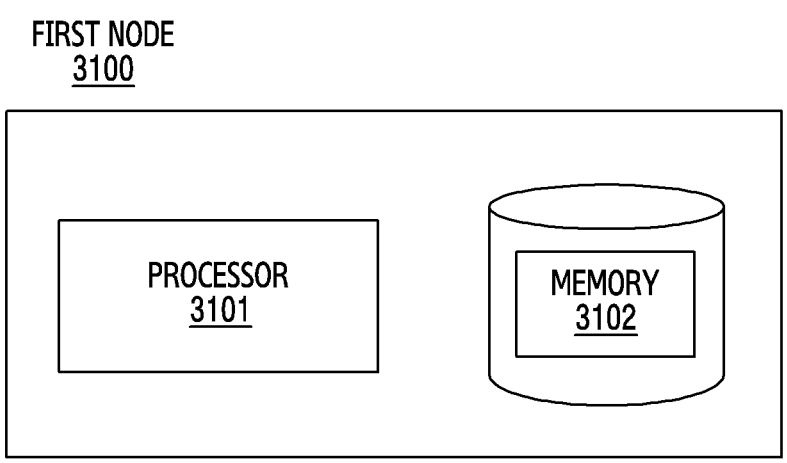
FIG. 31 is a block diagram illustrating an example central scheduling node according to an embodiment of the disclosure.

FIG. 31 is a block diagram illustrating an example central scheduling node (described herein as a "first node") in accordance with an example embodiment of the present disclosure.

The first node 2100 can be used to perform the method 2300 as previously described with reference to FIG. 23.

As shown in FIG. 31, the first node 3100 includes a processing unit or processor (e.g., including processing circuitry) 3101, which may be a single unit or a combination of a plurality of units for performing different steps of the method; a memory 3102 in which computer executable instructions are stored, which computer executable instructions, when executed by the processor 3101, cause the first node 3100 to perform the method 2300. For the sake of brevity, only the schematic structure of the first node according to an example embodiment of the present disclosure will be described herein, and the details described in the method 2300 as described above with reference to FIG. 23 are not repeated here.

The instructions, when executed by the processor 3101, cause the first node 3100 to perform the following operations:

receiving second scheduling related information reported by at least one second node and first scheduling related information reported by at least one user equipment (UE) that is connected to the at least one second node;

generating scheduling information used by the at least one second node for scheduling the connected UE; and transmitting the generated scheduling information to the at least one second node and/or the connected UE.

As described above, the first scheduling related information reported by the UE may include, for example, and without limitation, at least one of:

an ACK/NACK for downlink data transmitted to the UE from the second node connected to the UE;

channel quality related information (e.g., CQI) for a downlink from the second node connected to the UE to the UE;

an uplink BSR indicating a buffer status of uplink data which is to be transmitted by the UE at the UE side.

In an example embodiment, the second scheduling related information reported by the second node may include, for example, and without limitation, at least one of:

an ACK/NACK for uplink data transmitted to the second node from the UE connected to the second node;

channel quality related information (e.g., CQI) for an uplink from the UE connected to the second node to the second node;

a downlink BSR indicating a buffer status of downlink data which is to be transmitted from the second node to the connected UE at the second node side.

In an example embodiment, the scheduling information may include, for example, and without limitation, at least one of:

a time-frequency resource location where the second node and/or the UE connected to the second node receives or transmits data;

a time-frequency resource range in which the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data;

indication information of a receiving antenna of the second node and/or the UE connected to the second node;

indication information of a transmitting antenna of the second node and/or the UE connected to the second node.

In an example embodiment, the instructions, when executed by the processor 3101, further cause the first node 3100 to: transmit the first configuration information to the at least one second node prior to receiving second scheduling related information reported by at least one second node and first scheduling related information reported by at least one user equipment (UE) that is connected to the at least one second node, wherein the first configuration information may include, for example, and without limitation, at least one of:

configuration information of a second node group, configuration information of the cell group, configuration information of a reference signal, and configuration information of a wireless connection between the first node and the second node.

The configuration information of the second node group may include, for example, and without limitation, at least one of:

identification information of the second node itself, identification information of the second node group to which the second node belongs, identification information of the UE served by the second node, first indication information indicating that the second node joins a second node group, wherein the first indication information further indicates identification information of the second node group that the second node joins, second indication information indicating that the second node leaves a second node group, wherein the second indication information further indicates identification information of the second node group that the second node leaves, first identification information of a group to which a cell of the second node belongs, wherein the first identification information further includes identification information of the cell, second identification information of a user served by a cell of the second node, wherein the second identification information further includes identification information of the cell.

The configuration information of the cell group includes at least one of:

identification information of the cell group, identification information of the user served by the cell group, identification information of a cell added to the cell group, identification information of a cell removed from the cell group.

The configuration information of the reference signal includes at least one of:
an indication of a time-frequency resource location where the second node transmits the reference signal,
an indication of a precoding mechanism used by the second node to transmit the reference signal,
an indication of an antenna used by the second node to transmit a reference signal.

The configuration information of the wireless connection between the first node and the second node includes at least one of:
configuration information of a downlink synchronization signal,
configuration information of an uplink synchronization signal,
system information for access,
configuration information of the physical layer,
configuration information of the media access control (MAC) layer.

In an example embodiment, the first node receives the first scheduling related information via the first connection and receives the second scheduling related information via a second connection with a second node, and the operation of transmitting the generated scheduling information may include:
transmitting the generated scheduling information to the UE and the second node via the first connection and the second connection, respectively.

In an example embodiment, the first scheduling related information is forwarded to the first node via the second node, and the operation of transmitting the generated scheduling information may include:
transmitting the generated scheduling information to the second node via the second connection between the first node and the second node.

In an example embodiment, the instruction, when executed by the processor 3101, further causes the first node 3100 to: receive third scheduling related information reported by at least one third node; generate second configuration information related to the at least one third node according to the received third scheduling related information; and transmit the second configuration information to the at least one third node.

In an example embodiment, the third scheduling related information reported by the third node may include, for example, and without limitation, at least one of:
data amount information on data of a UE buffered at the third node;
information on a user bearer to which the data of the UE buffered at the third node belongs;
information on a UE to which the data of the UE buffered at the third node belongs.

In an example embodiment, the second configuration information may include, for example, and without limitation, at least one of:
identification information of a target second node to receive data transmitted by the third node;
address information of a target second node to receive data transmitted by the third node;
identification information of a UE to which the data transmitted by the third node belongs;
identification information of a bearer of a UE to which the data transmitted by the third node belongs;
indication information of an amount of data transmitted by the third node.

In an example embodiment, the first connection is a wireless connection, the second connection is at least one of a wired connection and a wireless connection, the third connection between the second node and the UE is a wireless connection, and the fourth connection between the first node and the third node is a wired connection.

In an example embodiment, the second connection uses an F1-C interface protocol.

In an example embodiment, the first, second and third connections that are wireless connections use the same frequency band or different frequency bands.

Figure 32:
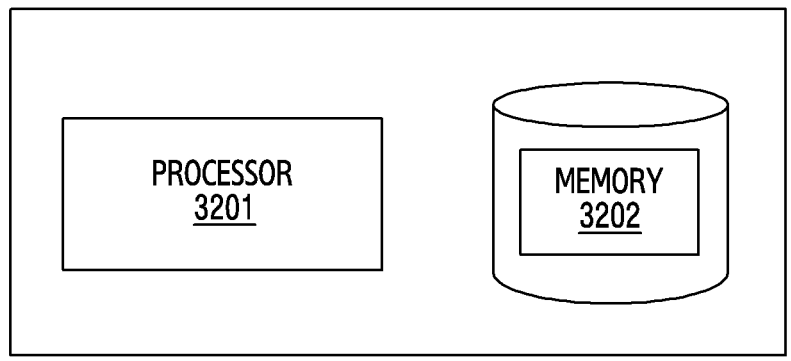
FIG. 32 is a block diagram illustrating an example DU node according to an embodiment of the disclosure.

FIG. 32 is a block diagram illustrating an example DU node (referred to herein as a "second node") according to an example embodiment of the present disclosure.

The second node 3200 may be used to perform the method 2400 as described above with reference to FIG. 24.

As shown in FIG. 32, the first node 3200 includes a processing unit or processor (e.g., including processing circuitry) 3201, which may be a single unit or a combination of a plurality of units for performing different steps of the method; a memory 3202 in which computer executable instructions are stored, which computer executable instructions, when executed by the processor 1201, cause the second node 3200 to perform the method 2400. For the sake of brevity, only the schematic structure of the second node according to an example embodiment of the present disclosure will be described herein, and the details described in the method 2400 as described above with reference to FIG. 24 are not repeated here.

The instructions, when executed by the processor 1201, cause the second node 3200 to perform the following operations:
reporting second scheduling related information to a first node; and
receiving scheduling information for scheduling a UE connected to the second node from the first node.

In an example embodiment, the second scheduling related information reported by the second node may include, for example, and without limitation, at least one of:
an ACK/NACK for uplink data transmitted to the second node from the UE connected to the second node;
channel quality related information (e.g., CQI) for an uplink from the UE connected to the second node to the second node;
a downlink BSR indicating a buffer status of downlink data which is to be transmitted from the second node to the connected UE at the second node side.

In an example embodiment, the scheduling information may include, for example, and without limitation, at least one of:
a time-frequency resource location where the second node and/or the UE connected to the second node receives or transmits data;
a time-frequency resource range in which the second node and/or the UE connected to the second node receives or transmits data;
a modulation and coding scheme used by the second node and/or the UE connected to the second node to receive or transmit data;
a precoding mechanism used by the second node and/or the UE connected to the second node to receive or transmit data;
identification information of a cell where the second node and/or the UE connected to the second node receives or transmits data;

identification information of a cell group where the second node and/or the UE connected to the second node receives or transmits data;

identification information of the second node used in receiving or transmitting data; indication information of a receiving antenna of the second node and/or the UE connected to the second node;

indication information of a transmitting antenna of the second node and/or the UE connected to the second node.

In an example embodiment, the method further includes: receiving first configuration information related to the second node from the first node prior to reporting the second scheduling related information to the first node, wherein the first configuration information may include, for example, and without limitation, at least one of:

configuration information of a second node group, configuration information of the cell group, configuration information of a reference signal, and configuration information of a wireless connection between the first node and the second node.

The configuration information of the second node group may include, for example, and without limitation, at least one of:

identification information of the second node itself, identification information of the second node group to which the second node belongs, identification information of the UE served by the second node, first indication information indicating that the second node joins a second node group, wherein the first indication information further indicates identification information of the second node group that the second node joins, second indication information indicating that the second node leaves a second node group, wherein the second indication information further indicates identification information of the second node group that the second node leaves, first identification information of a group to which a cell of the second node belongs, wherein the first identification information further includes identification information of the cell, second identification information of a user served by a cell of the second node, wherein the second identification information further includes identification information of the cell.

The configuration information of the cell group may include, for example, and without limitation, at least one of:

identification information of the cell group, identification information of the user served by the cell group, identification information of a cell added to the cell group, identification information of a cell removed from the cell group.

The configuration information of the reference signal may include, for example, and without limitation, at least one of:

an indication of a time-frequency resource location where the second node transmits the reference signal, an indication of a precoding mechanism used by the second node to transmit the reference signal, an indication of an antenna used by the second node to transmit a reference signal.

The configuration information of the wireless connection between the first node and the second node may include, for example, and without limitation, at least one of:

configuration information of a downlink synchronization signal, configuration information of an uplink synchronization signal, system information for access, configuration information of the physical layer, configuration information of the MAC layer.

In an example embodiment, the instruction, when executed by the processor 1201, further causes the second node 3200 to: receive first scheduling related information reported by the connected UE; and forward the first scheduling related information to the first node via a second connection between the first node and the second node.

In an example embodiment, the instructions, when executed by the processor 1201, further cause the second node 3200 to perform the following operations: forwarding the received scheduling information to the UE, or generating scheduling information for the connected UE according to the received scheduling information, and transmitting the generated scheduling information to the connected UE.

In an example embodiment, in the case that the scheduling information includes a time-frequency resource range in which the second node and/or the UE connected to the second node receives or transmits data, the method further includes: determining, from the time-frequency resource range, scheduling information used by the second node for scheduling the connected UE; and transmitting the determined scheduling information to the UE.

In an example embodiment, the instruction, when executed by the processor 1201, further causes the second node 1200 to: receive, from a third node, data that is transmitted by the third node according to the second configuration information, wherein the second configuration information may include, for example, and without limitation, at least one of:

identification information of a target second node to receive data transmitted by the third node;

address information of a target second node to receive data transmitted by the third node;

identification information of a UE to which the data transmitted by the third node belongs;

identification information of a bearer of a UE to which the data transmitted by the third node belongs;

indication information of an amount of data transmitted by the third node.

In an example embodiment, the first connection is a wireless connection, the second connection is at least one of a wired connection and a wireless connection, the third connection between the second node and the UE is a wireless connection, and the fourth connection between the first node and the third node is a wired connection.

In an example embodiment, the second connection uses an F1-C interface protocol.

In an example embodiment, the first, second and third connections that are wireless connections use the same frequency bands or different frequency bands.

Figure 33:
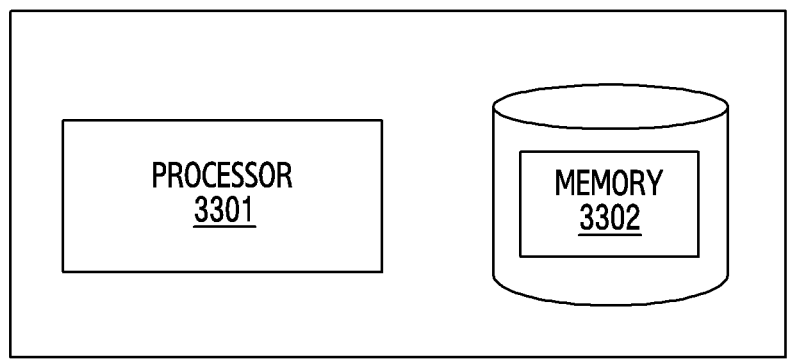
FIG. 33 is a block diagram illustrating an example CU-UP node according to an embodiment of the disclosure.

FIG. 33 is a block diagram illustrating an example CU-UP node (referred to herein as a "third node") according to an example embodiment of the present disclosure.

The third node 3300 can be used to perform the method 2500 as described above with reference to FIG. 25.

As shown in FIG. 33, the third node 3300 includes a processing unit or processor (e.g., including processing circuitry) 3301, which may be a single unit or a combination of a plurality of units for performing different steps of the method; a memory 3302 in which computer executable instructions are stored, which computer executable instructions, when executed by the processor 3301, cause the third node 3300 to perform the method 2500. For the sake of brevity, only the schematic structure of the third node according to an exemplary embodiment of the present disclosure will be described herein, and the details described in the method 2500 as described above with reference to FIG. 25 are not repeated here.

The instructions, when executed by the processor 3301, cause the third node 3300 to perform the following operations:

reporting third scheduling related information to the first node, wherein the third scheduling related information includes at least one of:

data amount information on data of a UE buffered at the third node;

information on a user bearer to which the data of the UE buffered at the third node belongs;

information on a user to which the data of the UE buffered at the third node belongs receiving second configuration information related to the third node from the first node; and transmitting data to the second node according to the second configuration information.

In an exemplary embodiment, the second configuration information includes at least one of:

identification information of a target second node to receive data transmitted by the third node;

address information of a target second node to receive data transmitted by the third node;

identification information of a UE to which the data transmitted by the third node belongs;

identification information of a bearer of a UE to which the data transmitted by the third node belongs;

indication information of an amount of data transmitted by the third node.

In an example embodiment, the fourth connection between the first node and the third node is a wired connection.

Figure 34:
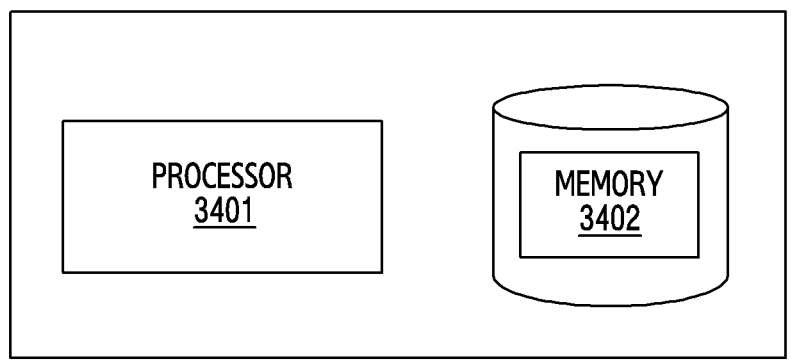
FIG. 34 is a block diagram illustrating an example UE according to an embodiment of the disclosure.

FIG. 34 is a block diagram illustrating an example UE according to an example embodiment of the present disclosure.

The UE 3400 can be used to perform the method 2600 as described above with reference to FIG. 26

As shown in FIG. 34, the UE 3400 includes a processing unit or processor (e.g., including processing circuitry) 3401, which may be a single unit or a combination of a plurality of units for performing different steps of the method; a memory 3402 in which computer executable instructions are stored, which computer executable instructions, when executed by the processor 3301, cause the UE 3400 to perform the method 2600. For the sake of brevity, only the schematic structure of the UE according to an exemplary embodiment of the present disclosure will be described herein, and the details described in the method 2600 as described above with reference to FIG. 26 are not repeated here.

The instructions, when executed by the processor 3401, cause the UE 3400 to perform the following operations:

reporting first scheduling related information to the first node, and receiving scheduling information used by a second node connected to the first node for scheduling the UE from the first node.

In an example embodiment, the first scheduling related information may include, for example, and without limitation, at least one of:

an ACK/NACK for downlink data transmitted to the UE from the second node connected to the UE;

channel quality related information (e.g., CQI), for a downlink from the second node connected to the UE to the UE;

an uplink BSR indicating a buffer status of uplink data which is to be transmitted by the UE at the UE side.

In an example embodiment, the second scheduling related information may include, for example, and without limitation, at least one of:

an ACK/NACK for uplink data transmitted to the second node from the UE connected to the second node;

channel quality related information (e.g., CQI) for an uplink from the UE connected to the second node to the second node;

a downlink BSR indicating a buffer status of downlink data which is to be transmitted from the second node to the connected UE at the second node side.

In an example embodiment, the scheduling information may include, for example, and without limitation, at least one of:

a time-frequency resource location where the second node and/or the UE connected to the second node receives or transmits data;

a modulation and coding scheme used by the second node and/or the UE connected to the second node to receive or transmit data;

a precoding mechanism used by the second node and/or the UE connected to the second node to receive or transmit data;

identification information of a cell where the second node and/or the UE connected to the second node receives or transmits data;

identification information of a cell group where the second node and/or the UE connected to the second node receives or transmits data;

identification information of the second node used in receiving or transmitting data; indication information of a receiving antenna of the second node and/or the UE connected to the second node;

indication information of a transmitting antenna of the second node and/or the UE connected to the second node.

In an example embodiment, reporting the first scheduling related information to the first node includes: transmitting, to a second node, the first scheduling related information to be reported to the first node, and forwarding, by the second node, the first scheduling related information to the first node via a second connection between the second node and the first node.

In an example embodiment, receiving the scheduling information includes: receiving from the second node the scheduling information transmitted by the first node.

In an example embodiment, in the case that the scheduling information includes a time-frequency resource range in which the second node and/or the UE connected to the second node receives or transmits data, the method further includes: receiving, from the second node, scheduling information that is determined by the second node, for scheduling the UE connected to the second node, from the time-frequency resource range.

In an example embodiment, the first connection is a wireless connection, the second connection is at least one of a wired connection and a wireless connection, and the third connection between the second node and the UE is a wireless connection.

In an example embodiment, the second connection uses an F1-C interface protocol.

In an example embodiment, the first, second and third connections that are wireless connections use the same frequency bands or different frequency bands.

The program running on the device according to the present disclosure may be a program that causes a computer to implement the functions of the embodiments of the present disclosure by controlling a central processing unit (CPU). The program or information processed by the program may be temporarily stored in a volatile memory (such as a random access memory RAM), a hard disk drive (HDD), a non-volatile memory (such as a flash memory), or other memory system.

A program for realizing the functions of the embodiments of the present disclosure may be recorded on a computer readable recording medium. The corresponding functions may be realized by causing a computer system to read programs recorded on the recording medium and execute the programs. The phrase "computer system" used herein may be a computer system embedded in the device, and may include an operating system or hardware (such as a peripheral device). The "computer readable recording medium" may be a semiconductor recording medium, an optical recording medium, a magnetic recording medium, a recording medium of a short-term dynamic storage program, or any other recording medium readable by a computer.

The various features or functional blocks used in the device in the above embodiments may be implemented or executed by circuitry (e.g., monolithic or multi-chip integrated circuits). Circuitry designed to perform the functions described in this disclosure may include general purpose processors, digital signal processors (DSPs), application specific integrated circuits (ASICs), field programmable gate arrays (FPGAs), or other programmable logic devices, discrete gates or transistor logic, discrete hardware components, or any combination of the above. A general purpose processor may be a microprocessor or any existing processor, controller, microcontroller, or state machine. The above circuit may be a digital circuit or an analog circuit. One or more embodiments of the present disclosure may also be implemented using new integrated circuit technologies in the context of the new integrated circuit technologies that replace existing integrated circuits due to advances in semiconductor technology.

As above, the embodiments of the present disclosure have been described in detail with reference to the accompanying drawings. However, the specific structure is not limited to the above embodiments, and the present disclosure also includes any design modifications not departing from the spirit of the present disclosure. In addition, various modifications may be made to the disclosure within the scope of the claims, and the embodiments obtained by appropriately combining the technical means disclosed in the different embodiments are also included in the scope of the present disclosure. Further, the components having the same effects described in the above embodiments may be substituted for each other.

It should be understood by those skilled in the art that the scope of the disclosure is not limited to technical features formed by specifically combining the above technical features, and should also cover other technical features formed by arbitrarily combining the above technical features and their equivalent features, for example, a technical solution formed by replacing the technical features with those having similar functions disclosed (but not limited to) in the disclosure.

What is claimed is:

1. A method performed by a first node in a communication network, the method comprising:
    establishing, by a mobile termination (MT) of the first node, dual-connectivity with a second node and a third node;
    transmitting, to the second node, an uplink (UL) radio resource control (RRC) message including information indicating that the first node is an integrated access and backhaul (IAB) node;
    receiving, from the second node, a downlink (DL) RRC message including configuration information on at least one internet protocol (IP) address for the first node;
    transmitting, from the MT of the first node to a distributed unit (DU) of the second node, an UL message including information on an IP address for a DU of the first node, based on the configuration information;
    receiving, via a cell of the second node, an RRC message including information associated with the cell, wherein the information associated with the cell indicates that the cell supporting an access of the first node allows the access of the first node;
    establishing an F1 connection between the DU of the first node and a central unit (CU) of the second node, based on the IP address for the DU of the first node and the information associated with the cell.

2. The method of claim 1, wherein the DL RRC message includes configuration information on a list including the IP address for the DU of the first node.

3. The method of claim 1, wherein the information on the IP address for the DU of first node is used when the first node accesses the second node.

4. A method performed by a central unit (CU) of a second node, the method comprising:
    receiving, from a first node, an uplink (UL) radio resource control (RRC) message including information indicating that the first node is an integrated access and backhaul (IAB) node;
    transmitting, to the first node, a downlink (DL) RRC message including configuration information on at least one internet protocol (IP) address for the first node;
    receiving, from a mobile termination (MT) of the first node, a UL message including information on an IP address for a distributed unit (DU) of the first node, based on the configuration information;
    transmitting, on a cell of the second node to the first node, an RRC message including information associated with the cell, wherein the information associated with the cell indicates that the cell supporting an access of the first node allows the access of the first node; and
    establishing a F1 connection between the DU of the first node and the CU of the second node, based on the IP address for the DU of the first node and the information associated with the cell.

5. The method of claim 4, further comprising:
    receiving, from a third node, the information on the IP address for the DU of the first node,
    wherein the information on the IP address for the DU of the first node is transmitted from the MT of the first node to the third node via a message, and the second node is operated as an evolved-universal terrestrial radio access network-new radio (en)—gNodeB (gNB).

6. The method of claim 4, wherein the DL RRC message includes configuration information on a list including the IP address for the DU of the first node.

7. The method of claim 4, wherein the information on the IP address for the DU of the first node is used when the first node accesses the second node.

8. The method of claim 1, further comprising:
    transmitting, from the MT of the first node to the third node, the information on the IP address for the DU of the first node, wherein the information on the IP address for the DU of the first node is transmitted from the third node to the CU of the second node via a message, and the second node is operated as an evolved-universal terrestrial radio access network-new radio (en)—gNodeB (gNB).

9. The method of claim 5, wherein the
wherein the second node is an IAB donor node, and
wherein the third node is a master base station (BS).

10. The method of claim 8,
wherein the second node is an IAB donor node, and
wherein the third node is a master base station (BS).

11. A first node comprising:
at least one transceiver; and
at least one processor operably coupled with the at least one transceiver,
wherein the at least one processor is configured to:
   establish, via a mobile termination (MT) of the first node, dual-connectivity with a second node and a third node;
control to transmit, to the second node, an uplink (UL) radio resource control (RRC) message including information indicating that the first node is an integrated access and backhaul (IAB) node;
receive, from the second node, a downlink (DL) RRC message including configuration information on at least one an internet protocol (IP) address for the first node;
control to transmit, from the MT of the first node to a distributed unit (DU) of the second node, an UL message including information on an IP address for a distributed unit (DU) of the first node, based on the configuration information;
receive, via a cell of the second node, an RRC message including information associated with the cell, wherein the information associated with the cell indicates that the cell supporting an access of the first node allows the access of the first node; and
establish a F1 connection between the DU of the first node and a central unit (CU) of the second node, based on the IP address for the DU of the first node and the information associated with the cell.

12. A central unit (CU) of a second node comprising:
at least one transceiver; and
at least one processor operably coupled with the at least one transceiver,
wherein the at least one processor is configured to:
receive, from a first node, an uplink (UL) radio resource control (RRC) message including information indicating that the first node is an integrated access and backhaul (IAB) node;
control to transmit, to the first node, a downlink (DL) RRC message including configuration information on at least one an internet protocol (IP) address for the first node;
receive, from a mobile termination (MT) of the first node, an UL message including information on an IP address for a distributed unit (DU) of the first node, based on the configuration information;
control to transmit, on a cell of the second node to the first node, an RRC message including information associated with the cell, wherein the information associated with the cell indicates that the cell supporting an access of the first node allows the access of the first node; and
establish a F1 connection between the DU of the first node and the CU of the second node, based on the IP address for the DU of the first node and the information associated with the cell.

\* \* \* \* \*